US011539123B2

(12) United States Patent
Hu et al.

(10) Patent No.: US 11,539,123 B2
(45) Date of Patent: Dec. 27, 2022

(54) ANTENNA SYSTEM FOR A PORTABLE DEVICE

(71) Applicant: Smart Antenna Technologies Ltd., Birmingham (GB)

(72) Inventors: Sampson Hu, Birmingham (GB); Qing Liu, Birmingham (GB); Jinsong Song, Birmingham (GB); Jiechen Chen, Birmingham (GB)

(73) Assignee: Novocomms Ltd, Birmingham (GB)

( * ) Notice: Subject to any disclaimer, the term of this patent is extended or adjusted under 35 U.S.C. 154(b) by 271 days.

(21) Appl. No.: 16/307,772

(22) PCT Filed: Jun. 9, 2017

(86) PCT No.: PCT/GB2017/051685

§ 371 (c)(1),
(2) Date: Dec. 6, 2018

(87) PCT Pub. No.: WO2017/212287

PCT Pub. Date: Dec. 14, 2017

(65) Prior Publication Data

US 2019/0214721 A1 Jul. 11, 2019

(30) Foreign Application Priority Data

Jun. 9, 2016 (GB) ...................................... 1610113
Aug. 8, 2016 (GB) ...................................... 1613591

(51) Int. Cl.
*H01Q 1/52* (2006.01)
*H01Q 1/22* (2006.01)
(Continued)

(52) U.S. Cl.
CPC ........... *H01Q 1/523* (2013.01); *H01Q 1/2266* (2013.01); *H01Q 1/521* (2013.01); *H01Q 5/328* (2015.01);
(Continued)

(58) Field of Classification Search
CPC ........ H01Q 1/523; H01Q 1/521; H01Q 21/28; H01Q 5/328; H01Q 5/385; H01Q 1/2266; H01Q 9/42; H01Q 1/52
See application file for complete search history.

(56) References Cited

U.S. PATENT DOCUMENTS

2007/0069960 A1* 3/2007 Moon .................. H01Q 21/065 343/700 MS
2010/0053022 A1* 3/2010 Mak ..................... H01Q 1/2283 343/893

(Continued)

FOREIGN PATENT DOCUMENTS

GB 2551212 A 12/2017

OTHER PUBLICATIONS

Combined Search and Examination Report under Sections 17 and 18(3) for corresponding GB Application No. 1613591.5, dated Jan. 18, 2017, 9 pgs.

(Continued)

*Primary Examiner* — Hoang V Nguyen
(74) *Attorney, Agent, or Firm* — Shumaker & Sieffert, P.A.

(57) ABSTRACT

There is disclosed an antenna system comprising: i) first and second antennas, the second antenna being disposed laterally from the first along a longitudinal axis, and ii) an isolation structure disposed between the first and second antennas. The isolation structure comprises a first resonator element having a first arm with upper and lower ends, the first arm connected to ground at its lower end, and a lateral second arm connected to the upper end of the first arm. At least a portion of the first resonator element is disposed adjacent to a portion of the first antenna such that the first resonator element is strongly coupled to the first antenna.

29 Claims, 39 Drawing Sheets

(51) Int. Cl.

| | |
|---|---|
| ***H01Q 9/42*** | (2006.01) |
| ***H01Q 21/28*** | (2006.01) |
| ***H01Q 5/328*** | (2015.01) |
| ***H01Q 5/385*** | (2015.01) |

(52) U.S. Cl.

CPC ............... *H01Q 5/385* (2015.01); *H01Q 9/42* (2013.01); *H01Q 21/28* (2013.01)

(56) References Cited

U.S. PATENT DOCUMENTS

| | | | | |
|---|---|---|---|---|
| 2012/0068893 | A1 | 3/2012 | Guterman et al. | |
| 2012/0194391 | A1 | 8/2012 | Liu et al. | |
| 2012/0287012 | A1* | 11/2012 | Aizawa | H01Q 1/243 343/853 |
| 2013/0050027 | A1 | 2/2013 | Kim et al. | |
| 2013/0099980 | A1 | 4/2013 | Hayashi | |
| 2014/0043202 | A1 | 2/2014 | Wong et al. | |
| 2014/0139392 | A1* | 5/2014 | Wong | H01Q 1/523 343/841 |
| 2015/0155623 | A1 | 6/2015 | Shamblin et al. | |
| 2015/0171916 | A1* | 6/2015 | Asrani | H04M 1/0202 455/575.7 |
| 2015/0244411 | A1* | 8/2015 | Harper | H04B 1/401 455/77 |
| 2015/0244441 | A1 | 8/2015 | Harper | |
| 2015/0288061 | A1 | 10/2015 | Liu | |
| 2015/0372397 | A1* | 12/2015 | Jonsson | H01Q 21/26 343/835 |
| 2016/0093949 | A1 | 3/2016 | Chang et al. | |
| 2016/0111777 | A1 | 4/2016 | Yang | |

OTHER PUBLICATIONS

International Search Report and Written Opinion for corresponding PCT Application No. PCT/GB2017/051685, dated Aug. 25, 2017, 21 pp.

* cited by examiner

ANTENNA SYSTEM FOR A PORTABLE DEVICE

This application is a national stage application under 35 U.S.C. § 371 of PCT Application No. PCT/GB2017/051685, filed Jun. 9, 2017, which claims the benefit of Great Britain Application No. 1610113.1, filed Jun. 9, 2016 and Great Britain Application No. 1613591.5, filed Aug. 8, 2016. The entire contents of each of PCT Application No. PCT/GB2017/051685, Great Britain Application No. 1610113.1, and Great Britain Application No. 1613591.5 are incorporated herein by reference in their entirety.

This invention relates to a reconfigurable antenna system. Particularly, but not exclusively, the invention relates to a reconfigurable multiple-input multiple-output (MIMO) antenna system for use in a portable electronic device such as a laptop, a tablet or a smartphone.

BACKGROUND

Portable devices such as smartphones and laptops need a number of antennas to be positioned close together while avoiding coupling between them. A variety of isolation means are known in the art, including resonators positioned between a first and a second antenna to increase the isolation between the two antennas. The resonators typically comprise a conductor having a length tuned to the frequency band in which isolation is required, which may take a variety of forms, such an inverted L shape, grounded at the end of one of the arms, such as the free end of the longer arm, positioned between the first and the second antennas. Further structures are known, such as ground planes that, when positioned between a first and second antennas, will provide isolation between them. Typically, however, such structures operate well only in a limited frequency band, outside which isolation is significantly reduced. This is a significant obstacle in the design of compact multi-frequency band antenna systems, such as MIMO antenna systems to cover multi global wireless standards.

The use of metal monocoque ('unibody') chassis for portable devices such as laptop computers restricts the positioning of antennas to regions behind non-metallic components, such as polymer inserts into the chassis, or polymer components used as part of the hinge between the keyboard and screen part of the chassis. Multi-band MIMO antenna systems for laptops operating in the LTE low band, mid band and WLAN band comprising radiators placed in the hinge region of the laptop are known, as disclosed for example in WO2013060683 (Krewski et al.). These prior art designs are limited in the need for a conductive coupling between the two parts of the chassis formed by the hinges, which is an undesirable design constraint, and by the positioning of the hinges, which sensitively affects the operation of the antenna system. Such design constraints render the prior art designs too narrow in scope to accommodate the range of design concepts required by manufacturers. Additionally, the feed ports in the prior art design require a first connection to the keyboard part of the chassis, and a second connection to the screen part of the chassis, which requires a cumbersome RF electrical connection between the two parts.

A further challenge is to provide a multi-band MIMO antenna system that is compact enough to fit within the hinge region of a laptop, comprising two WLAN antennas and two LTE cellular antennas, each capable of independent operation in different frequency bands, with sufficient isolation between the antennas. In particular, the hinge presents a constrained length, and the antennas need to be disposed within the length while being isolated one from another. Conventionally, isolation is achieved by providing a first WLAN antenna and a first LTE antenna within the hinge region, and a second WLAN antenna and a second LTE antenna within either the keyboard or the screen part of the chassis. The use of metallic monocoque chassis however means that all four antennas need to be provided within the hinge region.

Accordingly, embodiments of the present disclosure seek to provide improved antenna systems comprising multiple antennas and one or more isolation structures to provide isolation between the antennas. Certain embodiments of the disclosure provide an improved 4 port or 5 port multi-band MIMO antenna system for use in laptops, in which the radiating elements are provided within the hinge region of the laptop, without the need for electrical connection between the two parts of the laptop chassis.

Additionally, present reconfigurable antenna systems suffer from losses in the matching network used to couple an RF port, for example a combined transmit/receive RF port, to the antenna, such as parasitic losses in the switches typically used in prior art matching networks. It is a further aim of certain embodiments of the present disclosure to provide an improved reconfigurable antenna system that reduces or avoids such drawbacks.

BRIEF SUMMARY OF THE DISCLOSURE

Viewed from a first aspect there is provided an antenna system comprising first and second antennas, the second antenna being disposed laterally from the first along a longitudinal axis, and further comprising an isolation structure disposed between the first and second antennas, the isolation structure comprising a first resonator element having a first arm with first and second ends, the first arm connected to ground at its first end and extending across the longitudinal axis, and a lateral second arm connected to the second end of the first arm, wherein at least a portion of the of the first resonator element is disposed adjacent to a portion of the first antenna such that the first resonator is strongly coupled to the first antenna.

In some embodiments, components of the antenna system may be disposed or arranged on an elongate substrate comprising a dielectric material, the elongate substrate defining the longitudinal axis and a lateral extent or direction. The substrate may be generally rail- or bar-like in shape, and be adapted or configured for incorporation into a hinge mechanism between a screen and a keyboard of a laptop computer.

Herein for clarity a lateral direction is between the left and right sides along the longer length of the substrate, and a vertical direction is substantially perpendicular to the lateral direction. The substrate may be substantially planar and may have a thickness, or may be a three dimensional body having front and rear faces joined by an upper and a lower surface. The antennas and resonator elements may be disposed on one of both of the front and rear faces and may extend over the upper or lower faces, according to the embodiment.

In other embodiments, at least one of the first and second antennas and the isolation structure may be self-supporting, for example being cut or stamped from a metal sheet. Alternatively or in addition, at least one of the first and second antennas may be formed on a casing or frame of a mobile handset or other communications device, for example on an inner surface of the casing, or forming part of a metal frame.

The first arm of the first resonator element may be connected to ground via a short circuit. Alternatively, the first arm may be connected to ground via an impedance, optionally via a selectable impedance. The selectable impedance may be one or more of: an open circuit, a short circuit, a series capacitance, a series inductance, a series LC impedance and a parallel LC impedance.

The arms of the resonator element may be generally rectilinear, or may have other shapes, for example being tapered.

Preferably a portion of the said second arm is located adjacent to a portion of the first antenna and spaced apart therefrom, such that the coupling is achieved between the said portion of the second arm and the said portion of the first antenna. The portion of the second arm adjacent to the portion of the first antenna may be widened or flared outwardly towards the first antenna so as to enhance the coupling. In some embodiments, an end portion of the second arm may be substantially parallel to the portion of the first antenna; in other embodiments, the end portion of the second arm may be angled relative to the portion of the first antenna.

In some embodiments the first resonator element comprises a third arm connected to the lateral second arm at the end of the lateral second arm distal from the first arm and oriented at an angle (for example a right angle) to the second arm, at least a portion of the third arm being aligned substantially parallel to a portion of the first antenna and spaced apart therefrom, such that coupling is achieved between the said portion of the third arm and the said portion of the first antenna. In other embodiments, the third arm may be angled relative to the portion of the first antenna. The third arm may be arranged to extend in either or both directions alongside the portion of the first antenna.

In some embodiments the antenna system is configured to be mounted adjacent to a ground plane such that the second arm of the resonator structure is aligned with and spaced apart from an edge of the ground plane. In some embodiments the antenna system comprises a ground plane, the substrate (where provided) being mounted adjacent to the edge of the ground plane. In a typical embodiment, the ground plane may be part of a portable device, such as a ground plane on a main PCB of the device or a conducting chassis component, such as a monocoque chassis. The ground plane may take any suitable shape or configuration, and in some embodiments may be split into two or more separate ground plane components.

Strong coupling between first and second elements, such as between an antenna and a resonator element or between first and second resonator elements, has the sense herein that an electrical excitation in a first element creates an electrical excitation in a second element, such that the position and configuration of the first element relative to the second influences the strength of the excitation, as known in the art. Means to achieve strong coupling will be known to the skilled person, but in a range of embodiments strong coupling may be said to exist when one or more of the following are true: the first element is close to the second element, such as having a separation less than 10 mm; a portion of the boundary of the first element is adjacent to, and spaced apart from a portion of the boundary of the second element, for example the boundary portions being parallel; the first and second elements have a similar geometrical layout on a surface, such as comprising one or more linear portions adjacent to and spaced apart from one another; the first and second elements are separated by a distance through a material, such as a substrate, such as being on a first and second opposing faces of a common substrate; the first and second elements are spaced apart on from another on two separate substrates, the elements facing one another across a gap between the substrates.

Strong coupling may be said to exist if a resonant condition may be excited between the first and second elements. The strength of the resonance may be indicative of the strength of the coupling. A first and a second element may be coupled strongly in a first frequency band and less strongly, or coupled weakly, in a different frequency band.

A first element being adjacent to a second means herein that no further element lies between them and the distance between the two portions is less than a distance selected in order to achieve strong coupling between the first resonator element and the antenna. The distance may be selected to be 10 mm or less, such as 8 mm, 6 mm, 5 mm, 4 mm, 3 mm, 2 mm, 1 mm or less. The distance will typically by greater than a minimum distance defined by the fabrication process for providing the elements, or the maximum degree of coupling required in a given design, such as greater than 0.01 mm or greater than 0.1 mm.

In some embodiments a portion of the first resonator element is located adjacent to a portion of the first antenna. In some embodiments a portion of the first resonator element has a boundary substantially parallel to a portion of the antenna, such as of a radiating element forming part of the antenna, the two parallel portions being adjacent, that is separated by a distance selected as above. The degree of coupling may be increased by increasing the length of the adjacent portions, and decreasing the distance between them.

In this way the antenna system of certain embodiments provides an effective isolation structure located between the first and second antennas, which is strongly coupled to the antenna, so providing a path to ground for radiated energy that would otherwise excite an undesirable current in the second antenna.

The specific lengths and shapes of the resonator elements can be used to optimise the coupling so that the resonator element influences the properties of the antenna, achieving improved characteristics at certain frequencies. This property uses the coupling effect between the antenna and the resonator element(s) to create other paths for the surface currents. For example, a quasi-loop antenna can be formed through appropriate coupling, with surface currents following a path from the antenna, through the resonator element (s), and back to the ground-plane. This contrasts with configurations where the surface currents simply reside in the antenna, or affect other antenna elements located nearby. This principle of the simultaneous resonator coupling and isolating property, derived from the optimisation of lengths and positions of the resonator element(s), is an important feature of embodiments.

It will be appreciated that, while in some embodiments a resonator element may be located adjacent to its associated antenna element on the same face of a substrate, other embodiments may locate the resonator element on one face of a substrate and the associated antenna on an opposed face of the substrate, or even on a separate substrate, or with one of both of the resonator element and the antenna being self-supporting. What is important is that the resonator element and the associated antenna are mutually arranged in such a way that effective coupling can take place.

Preferably the antenna system further comprises a second isolation structure having the same or similar features as the first, located between the first isolation structure and the second antenna. In a preferred embodiment the first and second isolation structures are substantially mirror images of each other.

In some embodiments there is provided an antenna system comprising:

i) first and second antennas, the second antenna being disposed laterally from the first along a longitudinal axis, and ii) an isolation structure disposed between the first and second antennas, comprising:

a first resonator element having a first arm with first and second ends, the first arm connected to ground at its first end and extending across the longitudinal axis, and a lateral second arm connected to the second end of the first arm, and a second resonator element comprising a lateral elongated element located between the first antenna and the first arm of the first resonator element.

Preferably the antenna system further comprises a second isolation structure located between the first isolation structure and the second antenna, the second isolation structure comprising:

a third resonator element having a first arm with first and second ends, the first arm connected to ground at its first end and extending across the longitudinal axis, and a lateral second arm connected to the second end of the first arm, and a fourth resonator element comprising a lateral elongated element located between the second antenna and the first arm of the third resonator element.

Preferably the first and second isolation structures are substantially mirror images of each other.

In some embodiments the first and second resonator elements are located adjacent one to another, and/or adjacent to the first antenna, in order to achieve strong coupling between the said resonator elements or between a resonator element and the antenna.

In some embodiments the second resonator element is connected to ground. In some embodiments the fourth element is connected to ground. In some embodiments the second and/or the fourth resonator are connected via an impedance to ground, such as a fixed or a variable impedance.

In some embodiments the antenna system further comprises a matching network connected to the second resonator element, the matching network being configured to provide a selectable impedance between the second resonator element and ground. In such embodiments the impedance may be selectable between an open circuit, a short circuit to ground, a series capacitance, a series inductance, a series LC impedance and a parallel LC impedance. The matching network may be configured to be controllable using switches or a data input to select the said impedance.

In embodiments comprising a second isolation structure, the antenna system may comprise a second matching network connected to the fourth resonator element, the second matching network being configured to provide a second selectable impedance between the fourth resonator element and ground. In such embodiments the second impedance may be selectable between an open circuit, a short circuit to ground, a series capacitance, a series inductance, a series LC impedance and a parallel LC impedance. The second matching network may be configured to be controllable using switches or a data input to select the said impedance.

The first and second matching networks may be substantially identical and may form part of a common matching network, configured such that the first and second impedances are controllable to be the same, to be different, to be controlled together or to be controlled independently, by means of switches or a data input.

In some embodiments the second resonator element is disposed such that the second resonator element is strongly coupled to the first resonator element. For example, at least a portion of the said second resonator element may be located adjacent to a portion of the first resonator element and spaced apart from it, such that the said strong coupling is primarily between the said portion of the second resonator element and the said portion of the first resonator element. The said portion of the second resonator element may be located within a distance of 10 mm of the said portion of the first resonator element, or within a distance such as 8 mm, 6 mm, 5 mm, 4 mm, 3 mm, 2 mm, 1 mm or less.

In this way, certain embodiments may provide one or more actively matched isolation structures between the first and second antennas, in which the isolation structures may be tuned to isolate the antennas in a selected frequency band when the antennas are operating in the said frequency band. Tuning may be achieved by means of selecting the impedance between the second and/or, where present, the fourth resonator elements, and ground, by means of the first and, where present, the second matching network, the impedance being selected by a control setting of a switch forming part of the matching network or a data signal received by the matching network, which may operate a switch electronically. This active impedance matching allows certain embodiments to provide a reconfigurable antenna system.

The antennas may be monopole antennas, dipole antennas, PIFAs, IFAs, PILAs, chassis antennas, loop antennas or other antennas as known in the art.

In some embodiments the first and second antennas are LTE antennas, so operating in one or more frequency bands in which the spacing of the LTE antennas is close enough to cause coupling between them. The isolation structure isolates the two LTE antennas even though they are closely spaced together. The selectable impedance between the second resonator element and ground allows the isolation structure to be tuned to isolate the two antennas in the selected frequency band(s).

The second and/or fourth resonators may comprise a connection point adjacent to the feed point of the first and/or second antennas respectively. The feed point of the first and/or second antennas may be towards the bottom side of the substrate (where provided), and the connection point(s) of the second and/or fourth resonators may similarly be located towards the bottom side of the substrate (where provided), spaced a distance apart from the said feed point (s).

In some embodiments the first resonator element comprises a third arm connected to the lateral second arm at the end of the lateral second arm distal from the first arm, the third arm being aligned substantially parallel to the first arm and spaced apart from it.

In some embodiments the end of the said third arm is adjacent to the centre of the second resonator element.

In such embodiments the first resonator element forms an inverted L-shaped resonator with a third arm extending back from the second, lateral arm of the L, parallel to the first arm. The presence of the third arm on the L shaped resonator so formed allows the length of the first resonator element to be adjusted within the spatial constraints of the system so as to allow isolation at one or a number of operating frequency bands while maintaining a narrow footprint in a direction perpendicular to the longitudinal axis. The presence of the second resonator element in proximity to the first allows the first resonator to be coupled to ground via a selectable impedance. The end of the third arm of the first resonator is separated from the second resonator by a gap dimensioned to provide a selected degree of coupling. The said end of the third arm is preferably located adjacent to a centre of the lateral extent of the second resonator element.

In some embodiments the first resonator element comprises a fourth lateral arm connected to the base of the first arm, the first resonator element being grounded at the end of the fourth arm distal from the first arm. This may provide space for a third antenna, for example a WLAN antenna, to be located above the fourth arm (for example, on an opposed surface of a main substrate), while the fourth arm allows the first resonator element to be long enough to isolate in the LTE frequency band. In this way the length of the first resonator element may be selected to provide isolation in the selected frequency band of operation of the antennas, while disposing the first resonator element conveniently to allow the third antenna to be disposed close to the isolation structure, while the fourth arm of the first resonator is tracked past the third antenna to a central ground point. The advantage of this arrangement will be seen in the embodiments described below.

The preferred configurations of the various resonators help to promote different radiation directionality for each antenna, thus promoting isolation between the antennas.

In some embodiments the antenna system further comprises a third antenna located such that the first isolation structure is disposed between the first and third antennas. A third antenna may be located between the first isolation structure and the second isolation structure.

In some embodiments the antenna system comprises the first and second antennas, first and second isolation structures disposed between the first and second antennas, and third and fourth antennas located between the first and the second isolation structures.

The antenna system may further comprise a third isolation structure, at least a portion of the third isolation structure being disposed between the third and fourth antennas. The said third isolation structure may comprise a ground plane, a portion of the ground plane being disposed between the third and fourth antennas. The third isolation structure may comprise a protrusion from a main ground plane that extends between the third and fourth antennas. The protrusion may be a protrusion, or may comprise two (or more) protrusions. In embodiments where two, substantially symmetrically arranged ground plane protrusions are disposed between the third and fourth antennas, the protrusions can be relatively thin. In particular, the total area of the two ground plane protrusions may be less than the area of a single, centrally-disposed ground plane protrusion that provides the same isolation. This can help to reduce material costs and reduce the size of the antenna system. In other embodiments, the ground plane may be configured as two (or more) separate ground planes.

In some embodiments the third and fourth antennas are WLAN antennas, operating in the 2.4 GHz and/or 5.5 GHz frequency bands, and so being effectively isolated from the first and second antennas (which may operate in different frequency bands) but requiring isolation from each other. This is provided by the third isolation structure and the ground plane forming part thereof.

The third isolation structure may further comprise a grounded meander resonator structure, comprising:

i) a first resonator arm, located substantially parallel to a radiating element of the third antenna and spaced apart therefrom, and coupled to ground at a first end of the resonator arm, and ii) a meander resonator structure having first and second ends, coupled at its first end to the first end of the resonator arm and coupled at its second end to a portion of the ground plane, wherein at least a portion of the meander resonator structure lies substantially parallel to a radiator element of the third antenna.

The third isolation structure may comprise first and second grounded meander resonator structures, the first adjacent to the third antenna and between the third antenna and the ground plane, and the second adjacent to the fourth antenna and between the fourth antenna and the ground plane.

The antenna system of certain embodiments may be provided as part of a device adapted to be used for communication by a portable device such as a laptop computer or a tablet computer or mobile handset. Accordingly, the antenna system may form part of an antenna device comprising the antenna system and one or more further antennas. The antenna system may form part of an antenna device comprising two or more antenna systems as described herein, disposed on a common substrate or on a separate substrates mounted together on the portable device.

In a preferred embodiment, the antenna system comprises, disposed from left to right on a common substrate, the first antenna, being a first LTE antenna; the first isolation structure; the third antenna, being a first WLAN antenna; the third isolation structure, comprising a ground plane with a grounded meander resonator structure provided to either side thereof and connected thereto; the fourth antenna, being a second WLAN antenna; the second isolation structure; and the second antenna, being a second LTE antenna.

The antenna system as above may be substantially or wholly symmetrical about a vertical centre line of the substrate.

In this way, first and second LTE antennas are isolated from each other by means of the first and second isolation structures, and the third and fourth WLAN antennas are located between the first and second isolation structures and isolated from each other by the third isolation structure. This embodiment therefore provides a compact four port antenna system having two LTE antennas, isolated from each other, and two WLAN antennas, also isolated from each other.

The antennas and isolation structures may be formed as self-supporting metal components or as conductive tracks on the surface of a substrate as known in the art. The substrate may comprise a single contiguous insulating material element on which all the conductive resonator and antenna elements are formed, or may comprise an assembly of a plurality of sub-components, each having one or more of the antennas, isolation structures, or resonator elements formed or mounted thereon. It is envisaged that in typical embodiments the antennas and isolation structures may be formed on a common substrate by a metal deposition process such as printing, electroplating or electroless plating, though embodiments are not limited to the method of fabrication, and antenna systems in which one or more free standing conductive elements are disposed to form the features of the inventive system are included in scope. The substrate may be a 3D substrate with the antennas and isolator structure elements formed on the 3D surface such that they are adjacent to and spaced apart from each other. In this way coupling can be provided between portions of the antennas and isolator structure elements, and between multiple isolator structure elements, so as to provide the desired isolation between the antennas. Such coupling and isolation may be derived from the 3D structure using methods known in the art, allowing the 3D structure to be designed and optimised.

The antenna system may be formed on a 3D substrate comprising a first vertical face, a second vertical face and an upper face joining the two vertical faces, wherein the first and second antennas and the one or more isolation structures are provided on the first vertical face and the third and fourth antennas and at least a portion of the ground plane between them are provided on the second vertical face. The ground plane and meander isolation structure may extend from the first vertical face over the upper face to the second vertical face.

In some embodiments the antenna system comprises a first conductive sheet component located adjacent to the top side of the substrate and a second conductive sheet component located adjacent to the bottom side of the substrate, the conductive sheet components being for example part of a case of a portable device such as a laptop. The antenna system is preferably designed and optimised for operation when mounted in the vicinity of the first and second sheet components.

The antenna system may form part of a portable device having a conductive first and second case components hinged together, the antenna system being located in a gap between the first and second case components, such as in the hinge region. The antenna system may form part of a hinge component that attaches the two case components.

Viewed from a second aspect there is provided a reconfigurable antenna system comprising:

i) a first antenna;

ii) a first resonator element having a first arm with first and second ends, the first arm connected to ground at its first end and a second arm connected to the first arm at its second end distal from the first end, the second arm being at an angle to the first, wherein at least a portion of the first resonator element is disposed adjacent to a portion of the first antenna such that the first resonator element is strongly coupled to the first antenna;

iii) a second resonator element disposed adjacent to the first resonator element such that the second resonator element is strongly coupled to the first resonator element; and iv) a first matching network connected to the second resonator element, the matching network being configured to provide a selectable impedance between the second resonator element and ground.

In some embodiments, components of the antenna system may be disposed or arranged on an elongate substrate comprising a dielectric material, the elongate substrate defining a longitudinal axis and a lateral extent or direction. The substrate may be generally rail- or bar-like in shape, and be adapted or configured for incorporation into a hinge mechanism between a screen and a keyboard of a laptop computer.

In other embodiments, at least one of the first antenna and the first and second resonator elements may be self-supporting, for example being cut or stamped from a metal sheet. Alternatively or in addition, at least the first antenna may be formed on a casing or frame of a mobile handset or other communications device, for example on an inner surface of the casing, or forming part of a metal frame.

The first and second resonator elements together form a resonator structure, portions of which are strongly coupled to the antenna.

Preferably a portion of the said second arm of the first resonator element is located adjacent to and substantially parallel to a portion of the first antenna and spaced apart therefrom, such that the coupling is primarily between the said portion of the second arm and the said portion of the first antenna.

Strong coupling between the first resonator element and the antenna, and between the first resonator element and the second resonator element, is defined as described above and may be achieved by means of features as described above.

The first arm of the first resonator element may be connected to ground via a short circuit. Alternatively, the first arm may be connected to ground via an impedance, optionally via a selectable impedance. The selectable impedance may be one or more of: an open circuit, a short circuit, a series capacitance, a series inductance, a series LC impedance and a parallel LC impedance.

The arms of the first and/or second resonator element may be generally rectilinear, or may have other shapes, for example being tapered.

In some embodiments the first resonator element comprises a third arm connected to the second arm at the end of the second arm distal from the first arm, and oriented at an angle to the second arm such as a right angle, at least a portion of the third arm being aligned substantially parallel to a portion of the first antenna and spaced apart therefrom, such that the coupling is primarily between the said portion of the third arm and the said portion of the first antenna.

The said portion of the first resonator element may be located adjacent to the said portion of the first antenna, such as within a distance of 10 mm of it, thereby achieving strong coupling between the resonator element and the antenna.

The said portion of the second resonator element may be located adjacent to a portion of the first resonator element, such as within a distance of 10 mm of it, thereby achieving strong coupling between the resonator elements.

At least a portion of the second resonator element may be substantially parallel to and spaced apart from a portion of the first resonator element.

In some embodiments the second resonator element comprises an elongated element aligned substantially parallel to the second arm of the first resonator element, and is located between the first antenna and the first arm of the first resonator element.

In some embodiments the first resonator element comprises a third arm connected to its second arm, and the end of the said third arm is adjacent to the centre of the second resonator element to achieve strong coupling between the said third arm and the central portion of the second resonator element.

In some embodiments the antenna system comprises an antenna matching network and the antenna is connected via the matching network to a port, for example a port for one or both of transmitting and receiving functions.

In some embodiments the first antenna is connected directly to a port without an intervening matching network.

The said selectable impedance may be selectable between an open circuit, a short circuit, a series capacitance, a series inductance, a series LC impedance and a parallel LC impedance.

In this way, certain embodiments provide a reconfigurable antenna operable over a wide frequency band or in a range of frequency bands that may be selected by means of the matching network connected to the second resonator element, which determines the frequency band in which strong coupling occurs between the antenna and the resonator structure comprising the first and second resonator elements, in which the antenna may be coupled directly to a port and hence to one of a receiver, a transmitter or a combined transmitter/receiver, without passing through an antenna matching network as is typical in the prior art. Antenna matching networks are known to have losses, such as due to parasitic capacitance from the switches that are connected to the antenna to control the matching characteristics of the network. Certain embodiments avoid these losses by allowing direct coupling to the port without an intervening matching network. Additionally, prior art matching networks typically comprise a first multi-way switch connected to the antenna, and a second multiway switch connected to the port, to provide a plurality of signal pathways through the network. The matching network coupled to the second resonator element needs only one multi-way switch, so reducing component count and cost.

In some embodiments the antenna system further comprises a second antenna disposed such that the first and second resonator elements are located between the first and the second antennas.

In some embodiment the antenna system comprises:

a first antenna having adjacent to it a first resonator structure comprising a first resonator element and a second resonator element, a second antenna having adjacent to it a second resonator structure comprising a third resonator element and a fourth resonator element, wherein the second and fourth resonator elements are each connected to ground via a short circuit or via an impedance, such as a selectable impedance.

Preferably the first and second resonator structures are substantially mirror images of each other.

In some embodiments the antenna system comprises a first matching network connected to the second resonator element, the matching network being configured to provide a selectable impedance between the second resonator element and ground, and a second matching network connected to the fourth resonator element, the second matching network being configured to provide a second selectable impedance between the fourth resonator element and ground.

The first and second matching networks may be identical and may form part of a common matching network, configured such that the first and second impedance are controllable to be the same, to be different, to be controlled together or to be controlled independently, by means of switches or a data input.

In some embodiments the antenna is a monopole antenna. In other embodiments, the antenna may be a dipole antenna, a PIFA, IFA, PILA, chassis antenna, loop antenna or other suitable antenna. The antenna may be an LTE antenna or a WLAN antenna.

In some embodiments the antenna system forms part of a hinge component for a portable device having a conductive first and second case components hinged together, the antenna system being located in the gap between the first and second case components.

In some embodiments, first and second antenna systems of this aspect may be implemented together, one at each end of a main PCB of a mobile handset or tablet. The first and second antenna systems may have substantially the same configuration as each other such that the PCB with attached antennas will display $2^{nd}$ order rotational symmetry, at least with respect to the antennas. In other words, if the main PCB is rotated in its plane about 180°, the arrangement of the antennas and resonator elements will look the same. The main PCB may include a groundplane and the matching networks may be located on the main PCB. The antenna or antennas may be formed on or as part of a casing or frame of the mobile handset or tablet, or may be configured as self-supporting structures, or may be formed on a substrate.

The first and/or second resonators may be self-supporting or formed on a substrate. In some embodiments, at least a portion of the first and/or second resonator remote from an end connected to ground (for example to the groundplane of the main PCB) may be formed on or as part of the casing or frame of the mobile handset or tablet.

It has been found for some embodiments that good isolation between the antenna(s) of the first antenna system and the antenna(s) of the second antenna system is obtained when there is strong coupling between the first and second resonator elements in each respective antenna system, and strong coupling between the first antenna and the first resonator element in each respective antenna system. It has surprisingly been found that the antenna system still works well even if there is little or no coupling between the first antenna and the second resonator element.

In further embodiments, the antenna system of both the first and second aspects may further be provided with an additional antenna configured to operate in a 60 GHz frequency band.

The 60 GHz band is used by the 802.11ad or WiGig® communications standard. WiGig® antennas may make use of directional beam steering capabilities, and are ideally suited for very fast data transfer over short distances.

The additional 60 GHz antenna may be located substantially centrally on the elongate substrate. In embodiments comprising, for example, first and second LTE antennas and optionally third and fourth WLAN antennas, the additional 60 GHz antenna is disposed centrally on the substrate between the first and second LTE antennas and, where provided, the third and fourth WLAN antennas.

The additional 60 GHz antenna may be provided with its own substrate, which may be conformed to or disposed on the substrate of the antenna system as a whole. The additional 60 GHz antenna may be driven against a groundplane, for example the same groundplane as used by the other antennas.

Advantageously, first and second additional isolation structures or resonator elements are provided, one on either side of the 60 GHz antenna, for example between the 60 GHz antenna and the first and second LTE antennas. The additional isolation structures or resonator elements may be inverted-L type elements, connected to the groundplane.

In embodiments comprising first and second LTE antennas and third and fourth WLAN antennas, the first and second additional isolation structures or resonator elements may respectively be located between the first and third antennas and the fourth and second antennas.

Viewed from a third aspect, there is provided an antenna system comprising a first antenna disposed at a first end of a circuit board of a mobile device, a second antenna disposed at a second end of the circuit board opposed to the first, each antenna being provided with a feed, a first resonator element disposed adjacent to the first antenna at the first end of the circuit board, and a second resonator element disposed adjacent to the second antenna at the second end of the circuit board, wherein each resonator element is strongly coupled at one end to its respective antenna, and connected at its other end to ground.

The first and second resonator elements may be directly connected to ground by a short circuit. Alternatively, one or other or both of the first and second resonator elements are connected to ground by way of respective impedances. In some embodiments, the impedances are variable impedances, and the antennas may be tuneable by adjusting the variable impedances.

Viewed from a fourth aspect there is provided a portable device comprising an antenna system as described hereinabove. The portable device may further comprise first and second conductive case components hinged together, the antenna system being disposed in the hinge region between the adjacent edges of the first and second case components. Alternatively, the portable device may comprise a mobile handset or tablet.

BRIEF DESCRIPTION OF THE DRAWINGS

Embodiments of the invention are further described hereinafter with reference to the accompanying drawings, in which.

DETAILED DESCRIPTION

Figure 1:
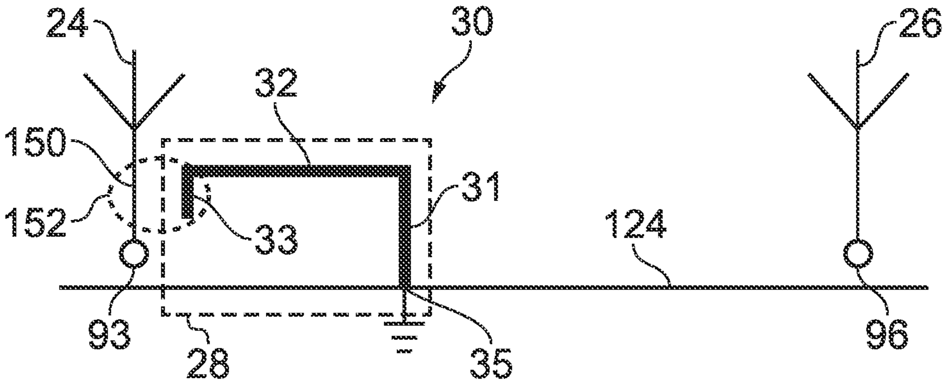
FIG. 1 shows an embodiment of an antenna system according to the invention comprising a first and second antennas and an isolation structure adjacent to the first antenna.

Referring to FIGS. 1 to 5, a reconfigurable antenna system comprises:

i) a first antenna 24 and a second antenna 26, the second antenna being spaced apart laterally from the first, and ii) an isolation structure 28 disposed on the substrate between the first and second antennas, comprising a first resonator element 30 having a vertical first arm 31 connected to ground at its lower end 35 and a lateral second arm 32 connected to the upper end of the vertical first arm, wherein at least a portion 33 of the first resonator element is disposed adjacent to a portion 150 of the first antenna such that the first resonator element is strongly coupled to the first antenna, the coupling region in which coupling will be strong being indicated as 152.

The first and second antennas have feed points 93, 96, and may be mounted adjacent to a ground plane 124, such as forming part of a portable device.

In this embodiment the first resonator element 30 comprises a third arm 33 connected to the lateral second arm at the end of the lateral second arm distal from the vertical first arm and oriented at a right angle to it, at least a portion of the third arm being arranged alongside a portion 150 of the first antenna and spaced apart from it, such that the coupling is primarily between the said portion of the third arm and the said portion of the first antenna, as indicated by the region 152. The third arm 33 may be directed upwardly away from the edge of the groundplane 124, or may be directed downwardly as shown, towards the edge of the groundplane 124. The third arm 33 may be aligned substantially parallel to at least a portion 150 of the first antenna 24, or may be angled relative thereto.

In some embodiments the third arm 33 is omitted and a portion of the second arm 32 is located adjacent to and parallel to a portion of the first antenna and spaced apart from it, such that the coupling is primarily between the said portion of the second arm and the said portion of the first antenna. The second arm 32 may be widened or flared outwardly towards the portion 150 of the first antenna 24.

The first resonator element 30 may include additional meanders or sections angled relative to each other, for example to allow the first resonator element 30 to take a desired pathway across the substrate without interfering with other structures on the substrate.

The distance between the coupling portion of the first resonator element and the antenna may be selected according to the frequency band and the electrical properties of the materials used to form the antenna system, and may be 10 mm or less, such as 8 mm, 6 mm, 5 mm, 4 mm, 3 mm, 2 mm, 1 mm or less.

Figure 2:
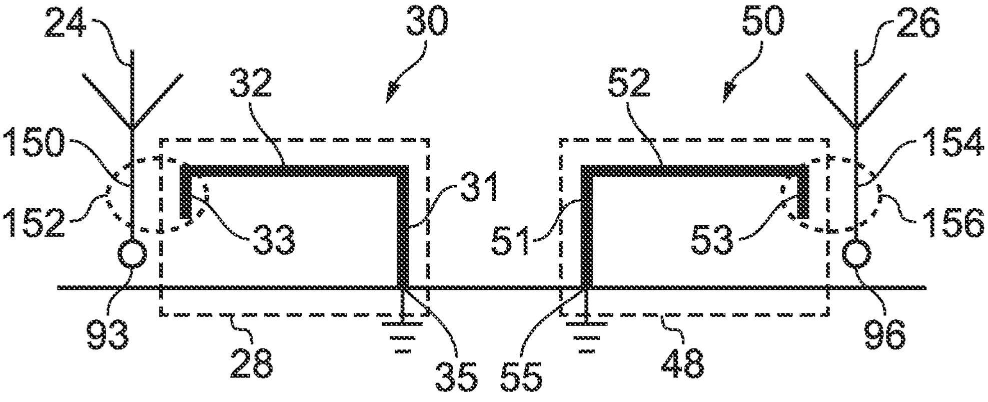
FIG. 2 shows an embodiment comprising a first and second mirror image isolation structures between the first and second antennas.

Referring to FIG. 2, in another embodiment the antenna system further comprises a second isolation structure 48 having the same features as the first, located between the first isolation structure 28 and the second antenna 26, the first and second isolation structures being substantially mirror images of each other.

Figure 3:
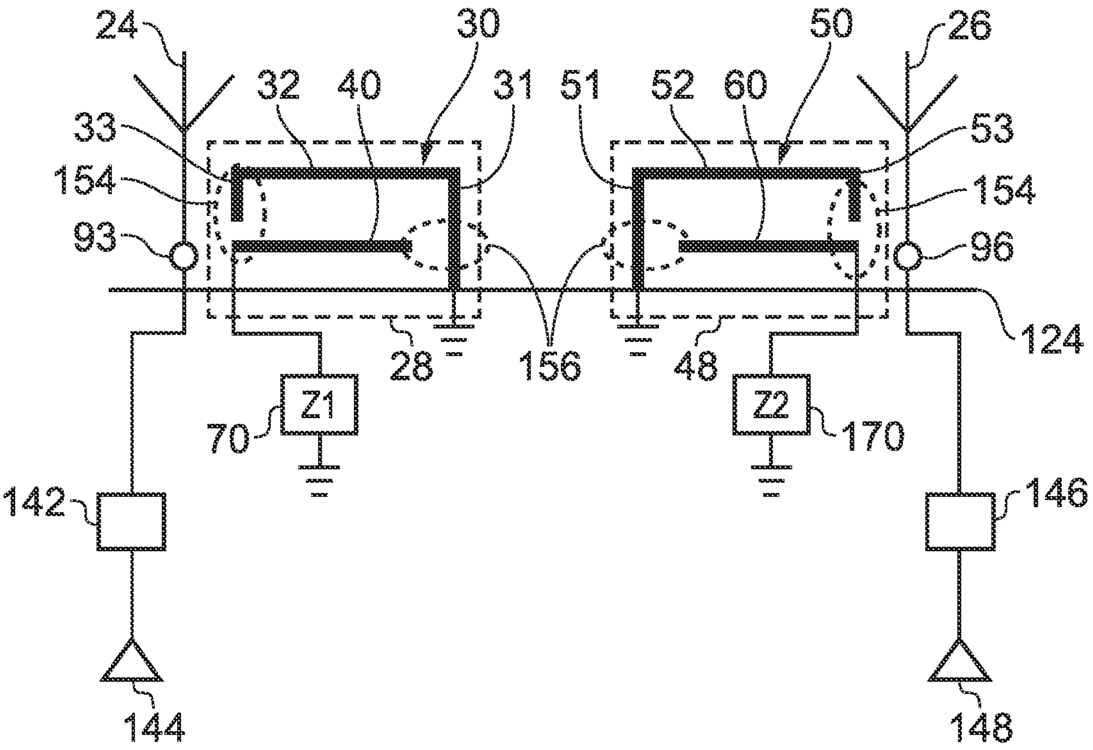
FIG. 3 shows an embodiment comprising a first and second isolation structures illustrating regions of strong coupling between the antenna and the first resonator element and between the first and second resonator elements.

Referring to FIG. 3, an embodiment of a reconfigurable antenna system comprises:

i) a first antenna 24 and a second antenna 26, the second antenna being spaced apart laterally from the first, and ii) a first isolation structure 28 disposed on the substrate between the first and second antennas, comprising:

a first resonator element 30 having a vertical first arm 31 connected to ground at its lower end 35 and a lateral second arm 32 connected to the upper end of the vertical first arm, and a third arm 33 connected to the lateral second arm 32 at the end of the lateral arm distal from the vertical arm 31, the third arm 33 being aligned substantially parallel to the vertical arm and spaced apart from it, and a second resonator element 40 comprising a lateral elongated element located adjacent to portions of the first resonator element.

In this embodiment the first resonator element 30 is strongly coupled to the first antenna as before, and also strongly coupled to the second resonator element 40 in the region 154 and also, optionally, in the region 156 also. The degree of coupling between the first and second resonator elements may be chosen by selecting the spacing of the first and second resonator elements in these regions.

The antenna system may further comprise a second isolation structure 48 located between the first isolation structure and the second antenna, the second isolation structure comprising:

a third resonator element 50 having a vertical first arm 51 connected to ground at its lower end 55 and a lateral second arm 52 connected to the upper end of the vertical first arm, and a third arm 53 connected to the lateral second arm 52 at the end of the lateral arm distal from the vertical arm 51, the third arm 53 being aligned substantially parallel to the vertical arm and spaced apart from it, and a fourth resonator element 60 comprising a lateral elongated element located adjacent to portions of the third resonator element.

In this embodiment the first 28 and second 48 isolation structures are substantially mirror images of each other.

The second and fourth resonator elements are each connected via an impedance Z1, Z2 to ground, by means of a first and second matching networks 70, 170 connected to the second and fourth resonator elements 40, 60 and configured to provide a selectable impedance between the respective resonator elements and ground. The selectable impedance may comprise two or more capacitors selectable by way of an RF switch, for example an SP4T switch. Optionally, one switch position may consist of an “open” position, or direct connection to ground. In one exemplary embodiment, an SP4T switch may be used to switch between three capacitors: 68 pF, 2.4 pF and 0.5 pF, as well as to a direct connection to ground. This allows switching between four modes, and enables the antenna to cover a low-band LTE frequency range of 700 to 960 MHz. The matching networks are described in more detail in reference to FIG. 18 below.

The isolation structures 28, 48 together with matching networks 70, 170 each form an isolation system 140. The first antenna 24 may be connected via an antenna matching network 142 to a first TX and/or RX port 144. The second antenna 26 may be connected via an antenna matching network 146 to a second TX and/or RX port 148.

In these embodiments, the electrical length of the respective antenna 24, 26 and the tuning is being changed by the coupling with the respective second resonator 40, 60 so as to optimise or at least improve performance in the LTE low band (or other bands as appropriate). As such, the isolation structures 28, 48 act both as isolators and also as antenna elements.

Figure 4:
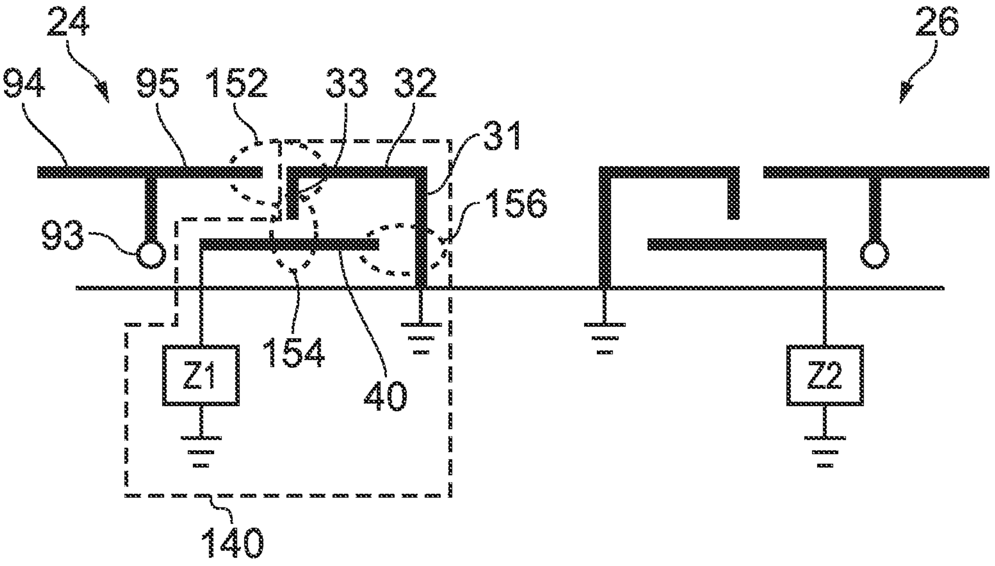
FIG. 4 shows an embodiment comprising first and second monopole antennas and mirror image isolation structures between them.

Referring to FIG. 4, a further embodiment comprises features as described for FIG. 3, in which the first and second antennas are monopole antennas each having a first arm 94 and second arm 95 on each side of a feed point 93.

The first resonator element is disposed adjacent to the arm 95 of the antenna to achieve strong coupling in the region 152, and close to the centre of the second resonator element 40 to achieve strong coupling in the region adjacent to the said centre, indicated by 154. Further, one end of the second resonator element may optionally be disposed adjacent to the first arm of the first resonator element, to achieve coupling as indicated by 156. The other end of the second resonator element may be disposed adjacent to the antenna 24, to achieve coupling at that end region also.

Figure 5:
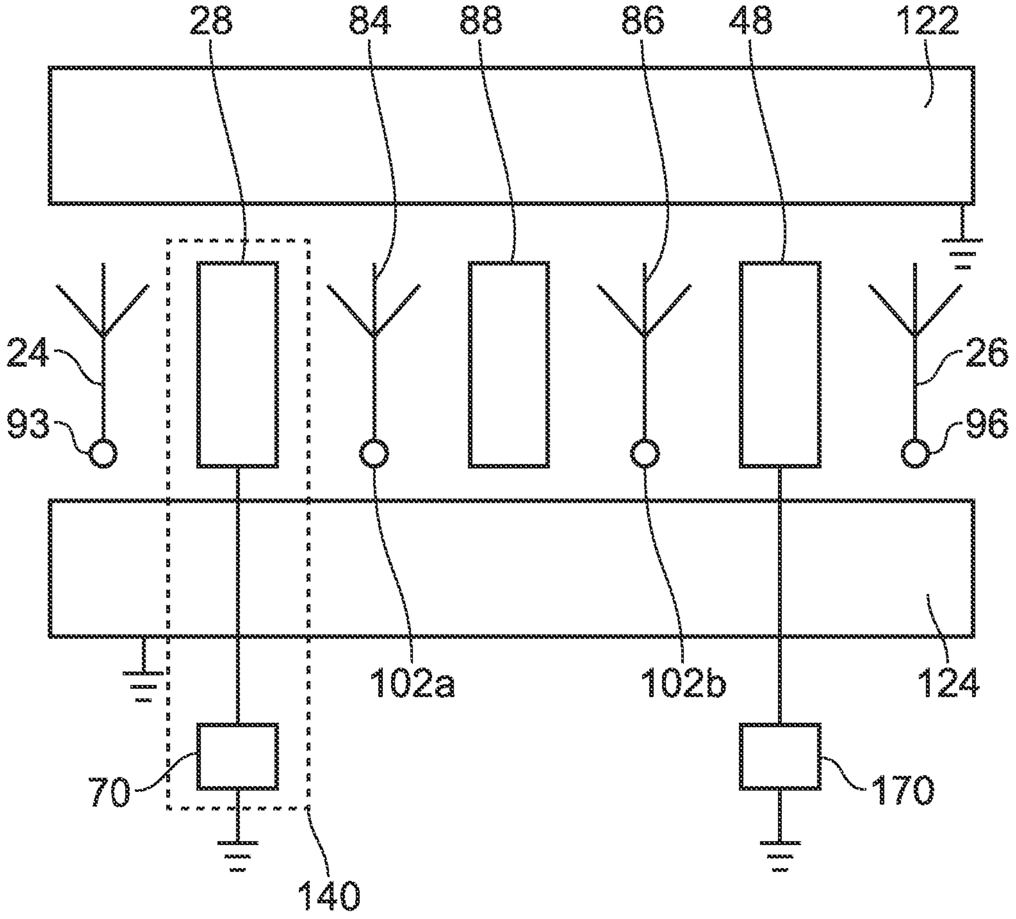
FIG. 5 shows an embodiment of an antenna system configured to be disposed between a first and second ground planes, such as the keyboard and screen components of a portable device case, comprising four antennas, each separated from its neighbour by an isolation structure.

Referring to FIG. 5, a schematic diagram is shown of the placement of multiple antennas and isolation structures between two ground planes 122, 124, in which the antennas are isolated from each other by the isolation structures 28, 48. First and second antennas 24, 26 are isolated from each other by isolation structures 28 and 48, which are tuned by means of matching networks 70, 170. The antenna system comprises a third 84 and a fourth 86 antennas located between the first and second isolation structures, and a third isolation structure 88, located between the third and fourth antennas, the third isolation structure comprising a ground plane.

Figure 6:
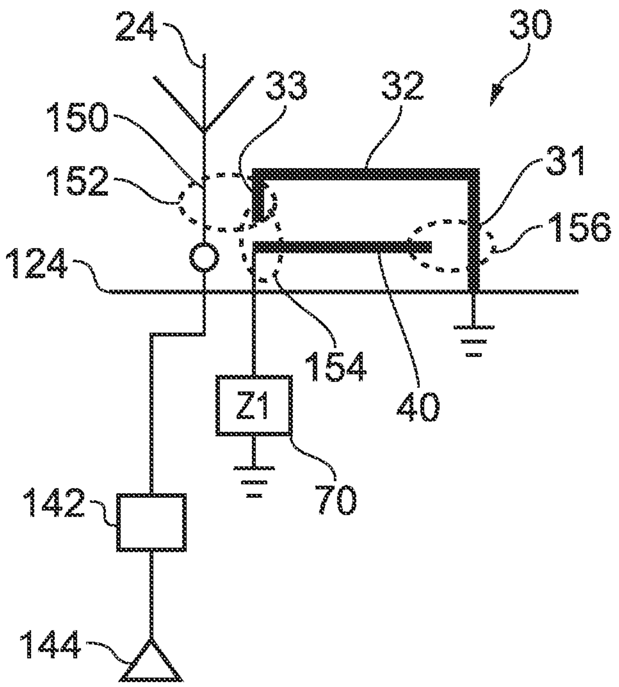
FIG. 6 shows an embodiment of an antenna system comprising a reconfigurable antenna strongly coupled to a resonator structure, the resonator structure being tuneable by means of a matching network.

Referring to FIG. 6, an embodiment of a reconfigurable antenna system comprises i) a first antenna 24, ii) a first resonator element 30, having a first arm 31 connected to ground at its first end and a second arm 32 connected to the first arm at its second end distal from the first end, the second arm being at an angle to the first, such as a right angle, wherein at least a portion of the first resonator element, here a third arm 33 connected to the second arm and parallel to the first arm, is disposed adjacent to a portion 150 of the first antenna such that the first resonator element is strongly coupled to the first antenna as indicated in the region 152, iii) a second resonator element 40 disposed adjacent to the first resonator element such that the second resonator element is strongly coupled to the first resonator element, as indicated in the region 154, and iv) a first matching network 70 connected to the second resonator element, the matching network being configured to provide a selectable impedance between the second resonator element and ground.

The first and second resonator elements together form a resonator structure, portions of which are strongly coupled to the antenna.

Strong coupling between the first resonator element and the antenna, and between the first resonator element and the second resonator element, is defined as described above and may be achieved by means of the dimensions of the resonator elements and their disposition adjacent to one another and spaced a suitable distance from one another.

The said portion of the first resonator element is located within a distance of 10 mm of the said portion of the first antenna, or a lesser distance, as described above.

The said portion of the second resonator element is located within a distance of 10 mm of a portion of the first resonator element, thereby achieving strong coupling between the resonator elements.

Figure 7:
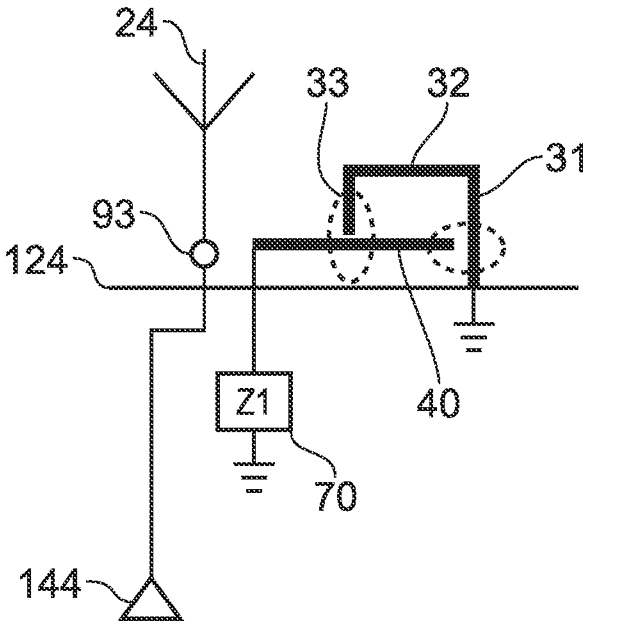
FIG. 7 shows an embodiment of an antenna system comprising a reconfigurable antenna strongly coupled to a resonator structure, the resonator structure being tuneable by means of a matching network, wherein the antenna is coupled directly to a port.
Figure 8:
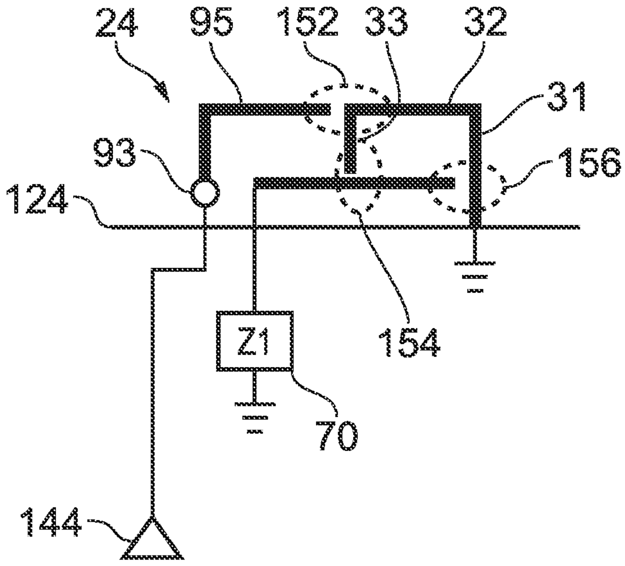
FIG. 8 shows a further embodiment of an antenna system comprising a reconfigurable antenna, wherein the antenna is coupled directly to a port.

Referring to FIGS. 6 to 8, in these embodiments the second resonator element comprises an elongated element aligned substantially parallel to the second arm 32 of the first resonator element, and is located between the first antenna and the first arm 31 of the first resonator element.

Referring to FIG. 7 and FIG. 8, in these embodiments the first resonator element comprises a third arm 33 connected to its second arm, and the end of the said third arm is adjacent to the centre of the second resonator element 40 to achieve strong coupling between the said third arm and the central portion of the second resonator element. The coupling may be defined by the distance between the end of the third arm and the second resonator element. This distance may be made smaller than the width of the third arm, as shown in FIGS. 7 and 8.

Figure 9:
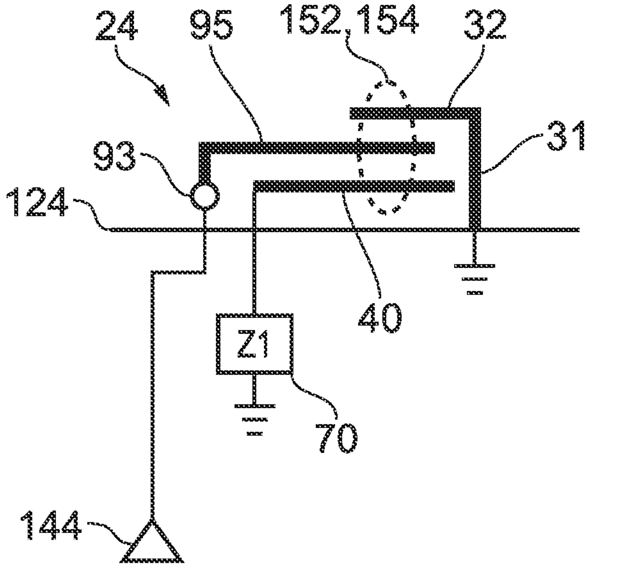
FIG. 9 shows a further embodiment of an antenna system comprising a reconfigurable antenna, wherein the antenna is coupled directly to a port.

Referring to FIG. 9, in a further embodiment at least a portion of the second resonator element 40 is substantially parallel to and spaced apart from a portion of the first resonator element 30, and further is substantially parallel to and spaced apart from a portion of the antenna 24. The arrangement in FIG. 9 promotes strong coupling between the arm 95 of the antenna and both of the first and the second resonators. The total length along the conductive portion of the antenna, that along the first resonator element and that along the second resonator element may each be selected to suit the frequency band in which the antenna is configured to operate.

Referring to FIG. 6, in some embodiments the antenna system comprises an antenna matching network 142 and the antenna is connected via the matching network to a port 144, for example a port for one or both of transmitting and receiving functions.

Referring to FIGS. 7 to 9, in some embodiments the first antenna is connected directly to a port without an intervening matching network.

The said selectable impedance in the matching network 70 may be selectable between an open circuit, a short circuit, a series capacitance, a series inductance, a series LC impedance and a parallel LC impedance. An example of a matching network is described with reference to FIG. 18.

In this way the embodiments in FIGS. 7 to 9 provide a reconfigurable antenna operable over a wide frequency band or in a range of frequency bands that may be selected by means of the matching network 70 connected to the second resonator element 40, which determines the frequency band in which strong coupling occurs between the antenna and the resonator structure comprising the first and second resonator elements, in which the antenna may be coupled directly to a port and hence to one of a receiver, a transmitter or a combined transmitter/receiver, without passing through an antenna matching network as is typical in the prior art.

In some embodiments the antenna system further comprises a second antenna disposed such that the first and second resonator elements are located between the first and the second antennas, the antennas and first and second resonator elements being as shown in the embodiments in FIGS. 6 to 9.

In some embodiments the said antenna system comprises:

a first antenna having adjacent to it a first resonator structure comprising a first resonator element and a second resonator element, a second antenna having adjacent to it a second resonator structure comprising a third resonator element and a fourth resonator element, wherein the second and fourth resonator elements are connected to ground via an impedance, such as a selectable impedance, and wherein each antenna is connected directly to a port without an antenna matching network between the antenna and the port.

In this way the configurable antenna systems of the invention may be combined together to provide MIMO functionality with tuneable frequency band for each antenna, together with isolation between the first and second antennas.

Referring to FIGS. 10 to 16, an embodiment of a reconfigurable antenna system 10 is disposed on an elongated substrate 11 having a first face 12, a second face 14, elongated top 16 and bottom 18 sides, and left 20 and right sides 22, the antenna system comprising:

i) first 24 and second 26 antennas, the second antenna 26 being spaced apart laterally from the first 24, and ii) an isolation structure 28 disposed on the substrate between the first and second antennas, comprising:

a first resonator element 30 having a vertical first arm 31 connected to ground at its lower end 35 and a lateral second arm 32 connected to the upper end of the vertical first arm, and a second resonator element 40 comprising a lateral elongated element located between the first antenna and the vertical arm of the first resonator element.

In this embodiment, the antenna system further comprises a second isolation structure 48 located between the first isolation structure and the second antenna, the second isolation structure comprising:

a third resonator element 50 having a vertical first arm 51 connected to ground at its lower end 55 and a lateral second arm 52 connected to the upper end of the vertical first arm, and a fourth resonator element 60 comprising a lateral elongated element located between the second antenna and the vertical arm of the third resonator element.

In this embodiment the first 28 and second 48 isolation structures are substantially mirror images of each other.

Figure 18:
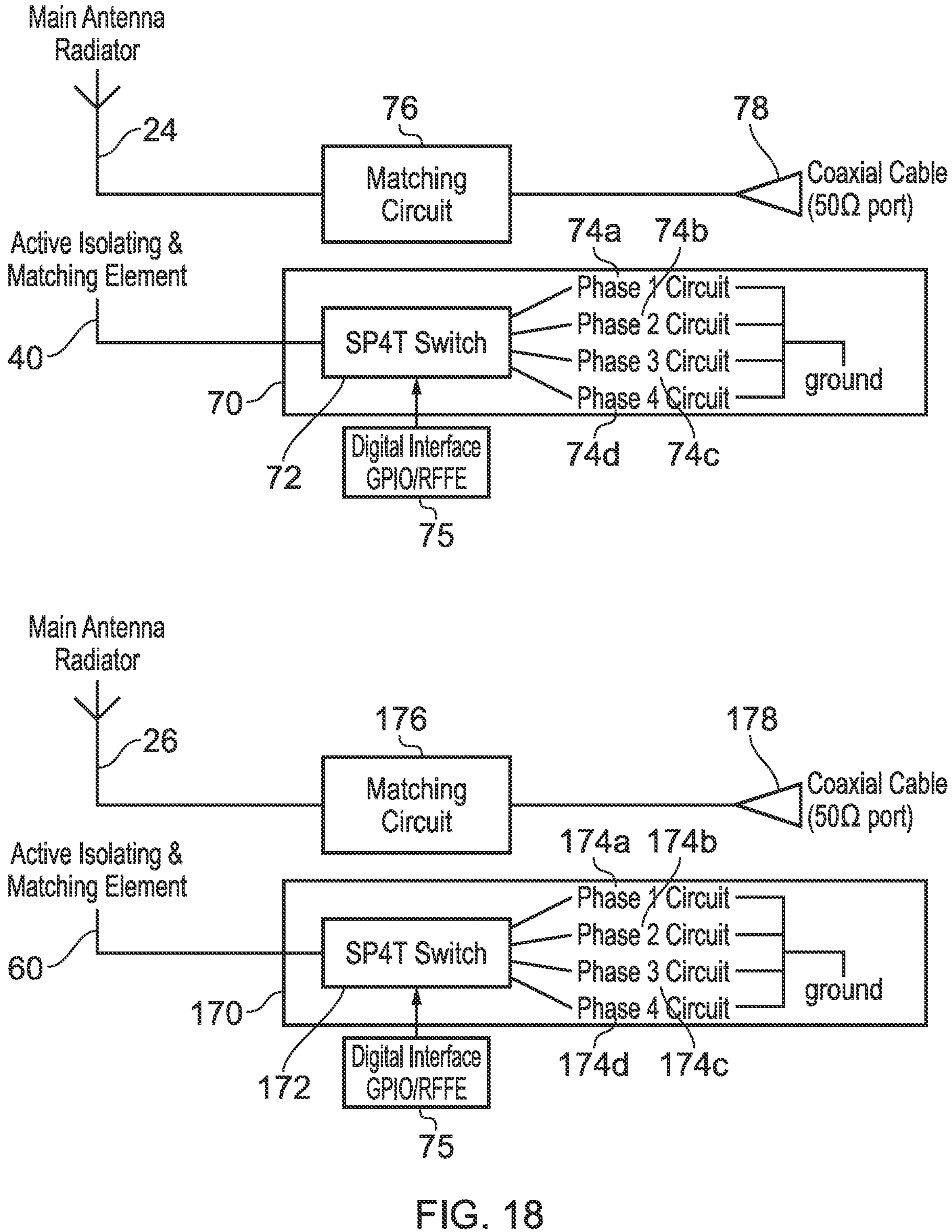
FIG. 18 shows a network diagram of the antenna system including the matching network for the first and second isolation structures.

Referring to FIG. 18, the second resonator elements is connected via an impedance to ground, by means of a first matching network 70 connected to the second resonator element 40 and configured to provide a selectable impedance between the respective second resonator element and ground. The matching network 70 comprises a switch 72 operable to connect the second resonator to ground via four circuits 74*a*-74*d*, each comprising an impedance, such as an open circuit, a short circuit, a series capacitance, a series inductance, a series LC impedance or a parallel LC impedance. Preferably each of the four circuits 74*a*-74*d* comprises a different impedance. The circuits each comprise a first port, connected to the switch 72 as shown, and a second port, connected to ground. The switch 72 is configured to be operated by a digital input from a digital interface 75 forming part of, and/or controlled by, the portable device. The first antenna 24 may be connected via an antenna matching network 76 to a first port 78.

Where present, the fourth resonator element 60 forming part of the second isolation structure 50 may be connected to a second matching network 170 having the same configuration as the first matching network 70. Preferably the second matching network 170 comprises a switch 172 and circuits 174*a*-174*d* as for the first matching network, the impedance in each circuit 174*a*-174*d* being the same as that in the corresponding circuit 74*a*-74*d*, the switches 72, 172 being operable together by the digital interface 75 to select the same impedance between the second resonator element 40 and ground as between the fourth resonator elements 60 and ground. The second antenna 26 may be connected via an antenna matching network 176 to a second port 178.

In this embodiment the first matching network is connected to the second resonator element at a connection point 42 adjacent to the first antenna 26, and the second matching network is connected to the fourth resonator element at a connection point 62 adjacent to the first antenna 26.

In this embodiment the first resonator element 30 comprises a third arm 33 connected to the lateral second arm 32 at the end of the lateral arm distal from the vertical arm 31, the third arm 33 being aligned substantially parallel to the vertical arm and spaced apart from it, and the end 36 of the said third arm 33 is adjacent to the centre of the second resonator element 40.

In this embodiment the first resonator element 30 comprises a fourth lateral arm 34 connected to the base 35 of the vertical arm 31, the first resonator element being grounded at the end 37 of the fourth arm distal from the vertical arm. It will be noted that the shape of the first resonator element 30 allows a WLAN antenna, for example, to be placed on the substrate above the fourth arm, while the fourth arm allows the first resonator element to be long enough to isolate in, for example, the LTE frequency band>>

Figure 10A:
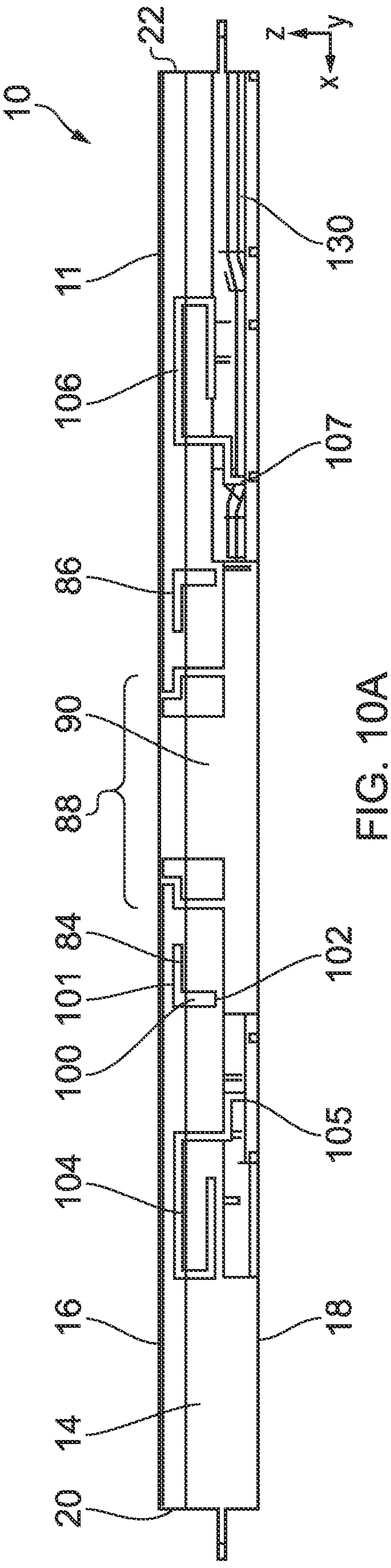
FIG. 10A shows a front view of an embodiment of the invention in which a four antenna system is implemented on a 3D substrate adapted to mount in the hinge region of a laptop.
Figure 10B:
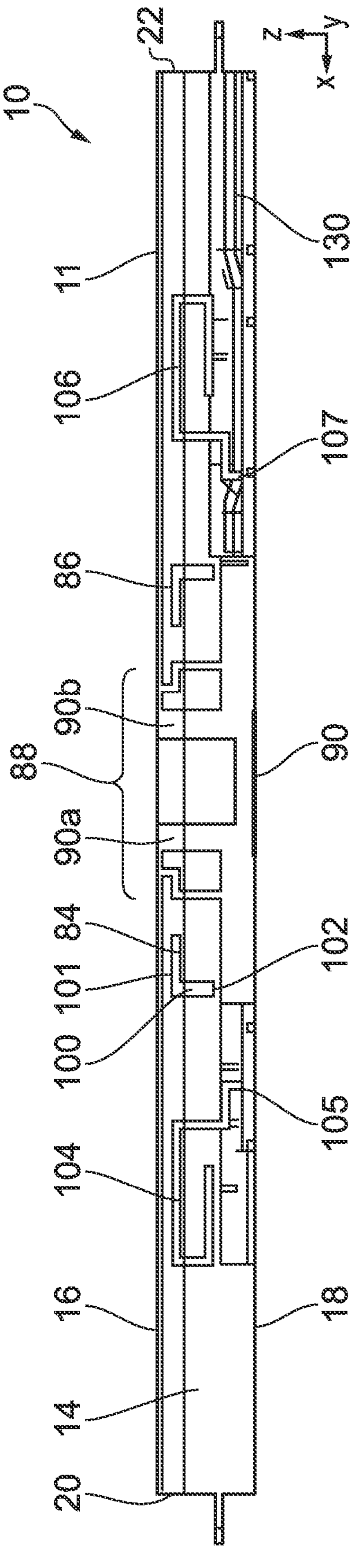
FIG. 10B shows a variation of the embodiment of FIG. 10A.
Figure 12:
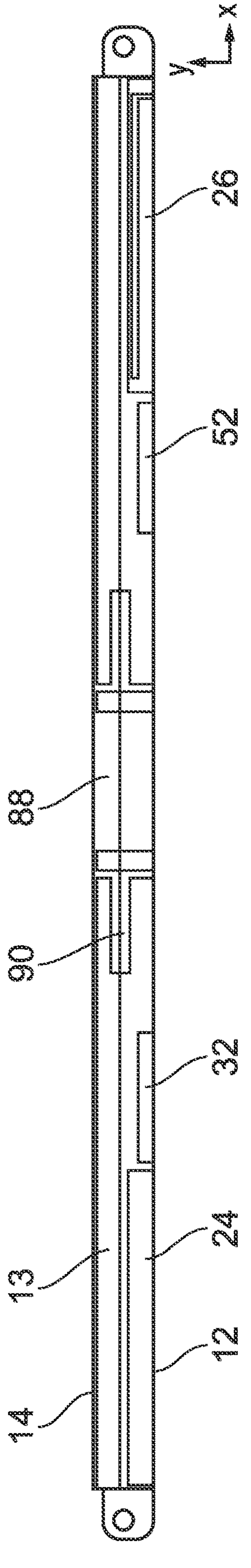
FIG. 12 is a top view of the embodiment of FIG. 10A.
Figure 13:
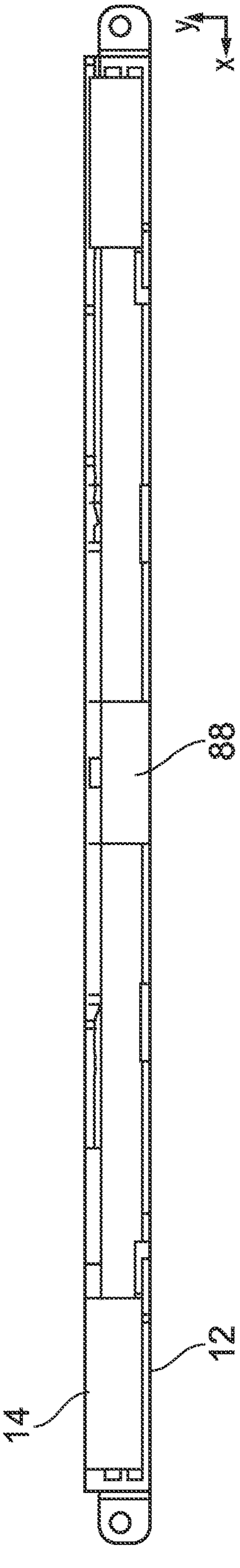
FIG. 13 is a bottom view of the embodiment of FIG. 10A.

In this embodiment the antenna system comprises third 84 and a fourth 86 antennas located between the first 28 and second 48 isolation structures, and a third isolation structure 88, located between the third and fourth antennas, the third isolation structure comprising a ground plane 90, at least a portion of the ground plane being located between the third and fourth antennas. The said third isolation structure further comprises meander isolation structures 92 located between the third and fourth antennas 84, 86 and the ground plane 90. Instead of a single, wide ground plane 90 as shown in FIG. 10A, the third isolation structure may be formed as two relatively narrow ground plane strips 90*a*, 90*b* extending upwardly and generally parallel to each other between the third 84 and fourth 86 antennas. This is shown in FIG. 10B. The ground plane strips 90*a*, 90*b* may extend from a common ground plane 90, or the ground plane 90 may be split into two (or more) separate ground plane components.

In this embodiment the first and second antennas are configured as LTE antennas, operable to transmit and/or receive in frequency bands between 0.73 GHz and 2.35 GHz. The antennas may be substantially identical and may be mirror images of each other, or they have minor differences, which may help to improve bandwidth. The first antenna 24 comprises a first arm 94, and a second arm 95, extending to either side of a feed point 93. The second antenna 26 comprises a first arm 97, a second arm 98, extending to either side of a feed point 96, and a slot 99 formed in the first arm.

In this embodiment the third and/or fourth antennas are WLAN antennas configured to operate in the WiFi frequency bands of 2.4 GHz and 5.5 GHz. Each antenna comprises an inverted L, having a vertical arm 100, a lateral arm 101, and a feed point 102 at the base of the vertical arm.

The antenna system may comprise further antennas, for example first and second GPS antennas 104, 106, having a folded shape and feed points 105, 107.

Figure 14:
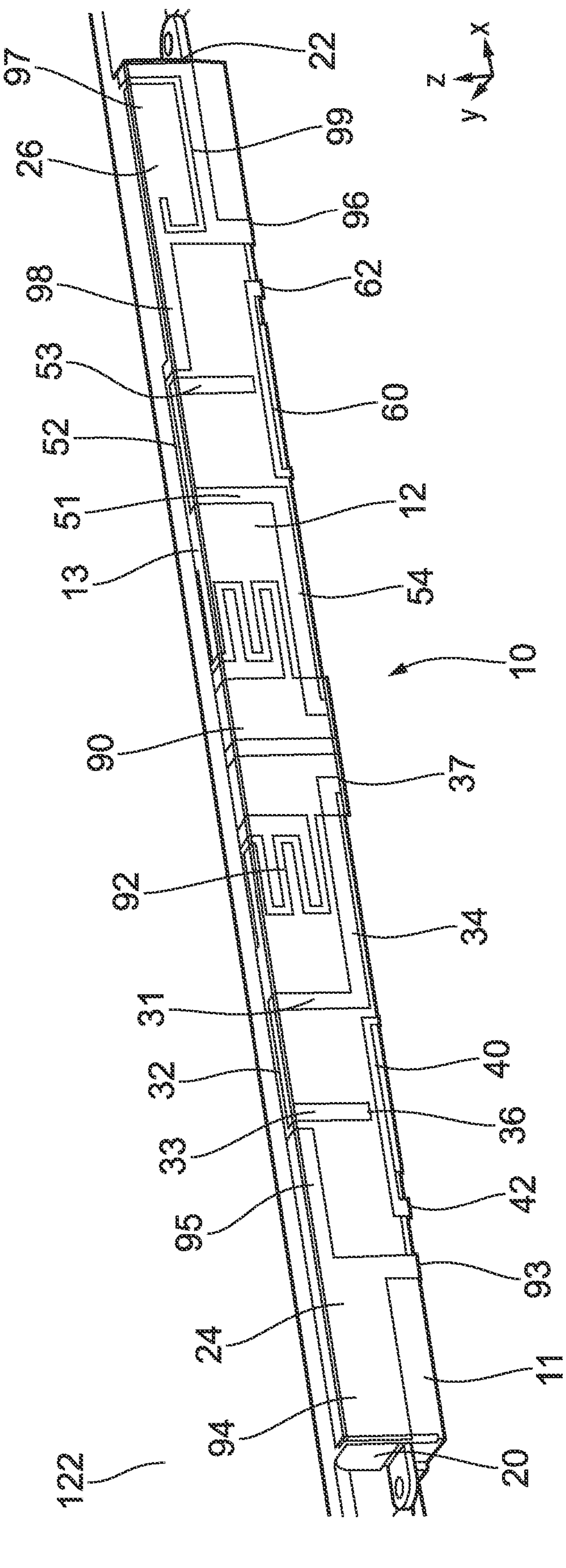
FIG. 14 is a rear isometric view of the embodiment of FIG. 10A, as mounted between the base and top of a laptop case.
Figure 15:
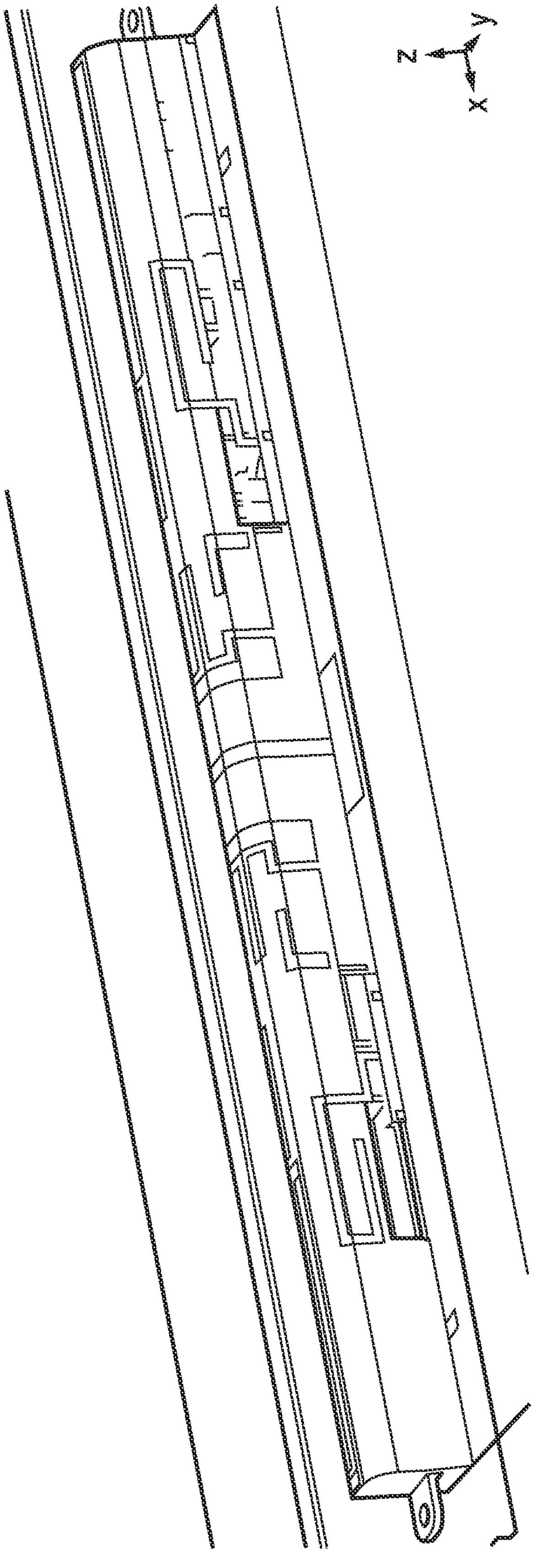
FIG. 15 is a front isometric view of the embodiment as shown in FIG. 14.
Figure 16:
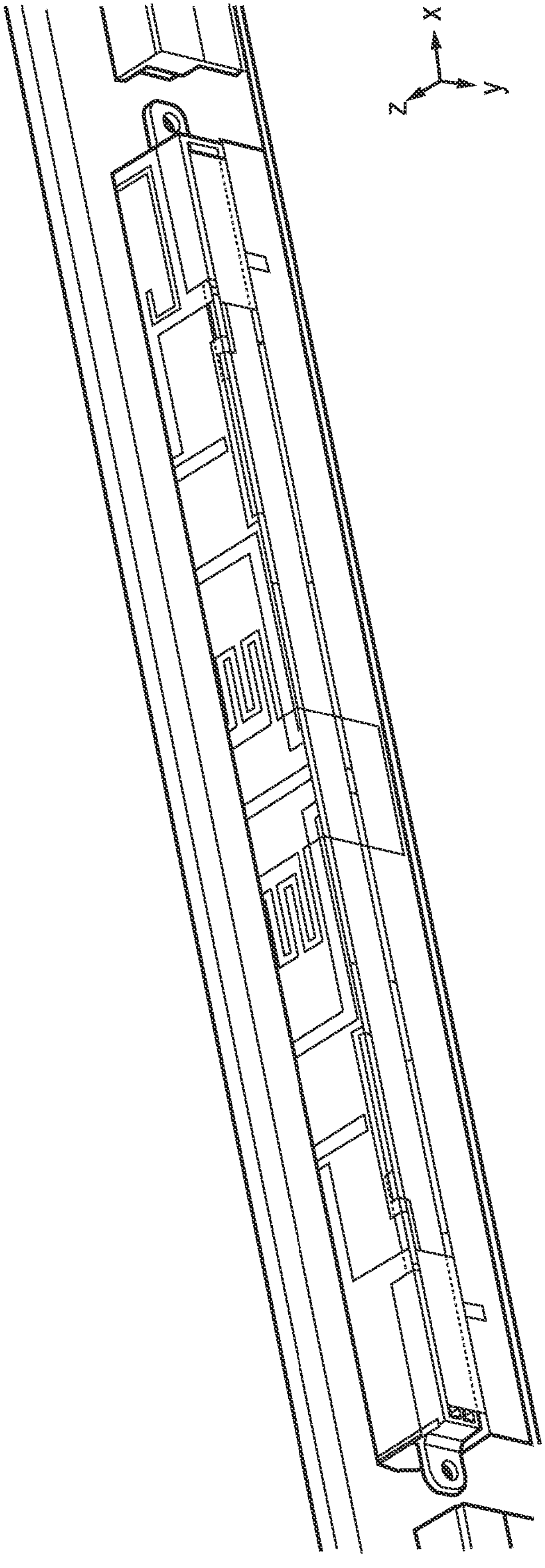
FIG. 16 is a rear and lower isometric view of the embodiment as shown in FIG. 14.
Figure 17:
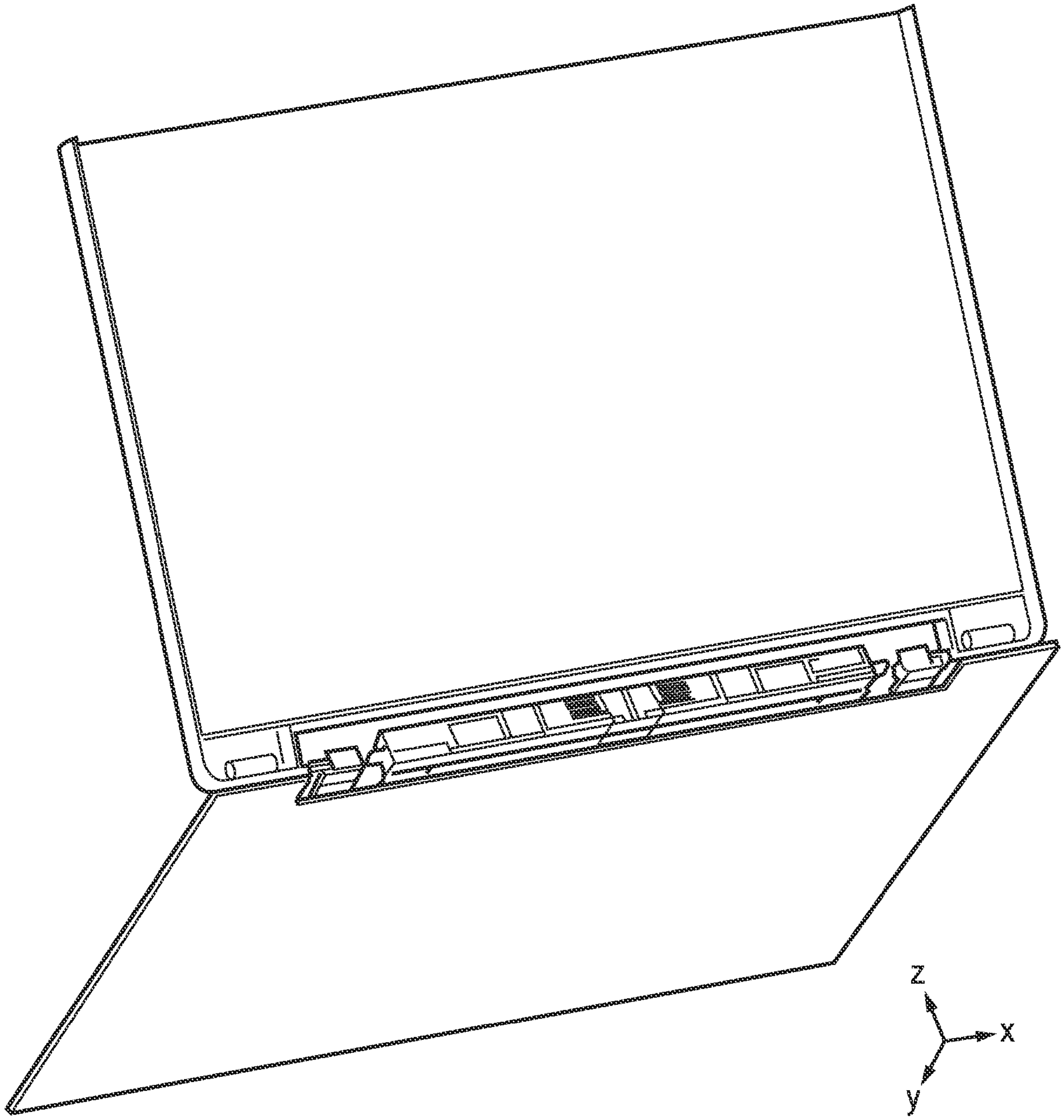
FIG. 17 shows the disposition of the antenna system in the hinge region of a laptop computer.

As seen most clearly in FIGS. 14 to 16, the embodiment is formed on a 3D substrate 11 comprising a first vertical face 12, a second vertical face 14 and an upper face 13 joining the two vertical faces, wherein the first and second antennas 24, 26 and the one or more isolation structures 28, 48 are provided on the first vertical face 12 and the third and fourth antennas 84, 86 are provided on the second vertical face 14. The first and second antennas are wrapped over the top surface 13 to provide the correct dimensions on a limited height of the first face. The isolation structures are also wrapped from the first face, over the top face, to the second face. In particular, the first and second resonator elements, 30, 50 are wrapped such that the second arm 32, 52 is located on the upper face 13. The third isolation structure 88 extends over both the first and second faces, and the upper face.

FIGS. 14 to 16 show the disposition of the antenna system in the hinge region 120 of a laptop computer that comprises a first conductive sheet component 122 (a metallic screen case) located adjacent to the top side of the substrate and a second conductive sheet component 124 (a metallic base) located adjacent to the bottom side of the substrate.

The antenna system may form part of a portable device having a conductive first and second case components hinged together, the antenna system being located in the gap between the first and second case components, such as in the hinge region. The antenna system may form part of a hinge component that attaches the two case components.

It is a feature of the antenna system of the invention that no conductive connections are needed between the screen and base parts of the mobile device cover, and hence the hinges do not have to be conductive. Further, no electrical connections need to be made to the mobile device cover. The electrical connections to the antenna system 10 are made by RF coaxial cables 130, which may be routed conveniently from the side of the substrate as shown in FIG. 14. This is a great advantage of the antenna system of the invention over the prior art, and allows the system to be mounted between two hinges placed close to the edges of the mobile device, as shown in FIG. 8.

FIGS. 19 to 22 show the radiation characteristics of the antennas in certain embodiments, showing radiative efficiency in desired frequency bands and good isolation between them, in particular between the first and second LTE antennas and the third and fourth WLAN antennas. The good isolation is in part owing to a degree of directionality of the radiation pattern caused by the isolation structures: the left hand LTE antenna (the first antenna) having a degree of directionality to the left and the right hand LTE antenna to the right, and the left hand WLAN antenna (the third antenna) having a more pronounced degree of directionality to the left and the right hand WLAN antenna (the fourth antenna) to the right, as directed by the efficient isolation structures between them.

Figure 19:
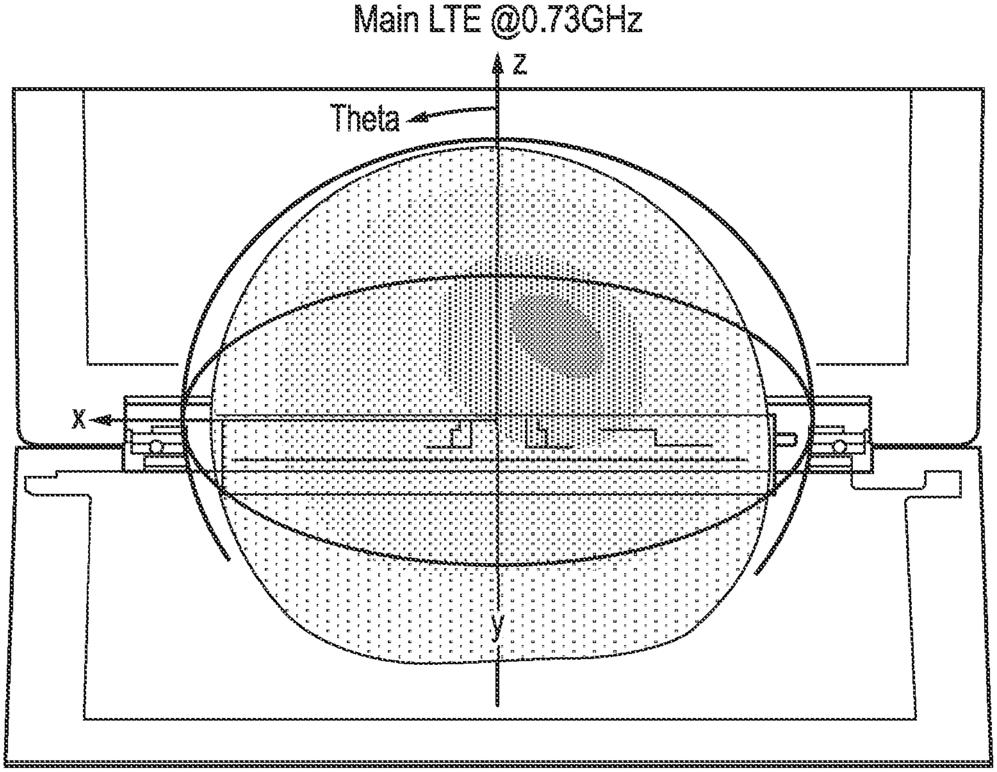
FIG. 19 shows the radiation characteristics of the first and second LTE antennas at 0.73 GHz.
Figure 19:
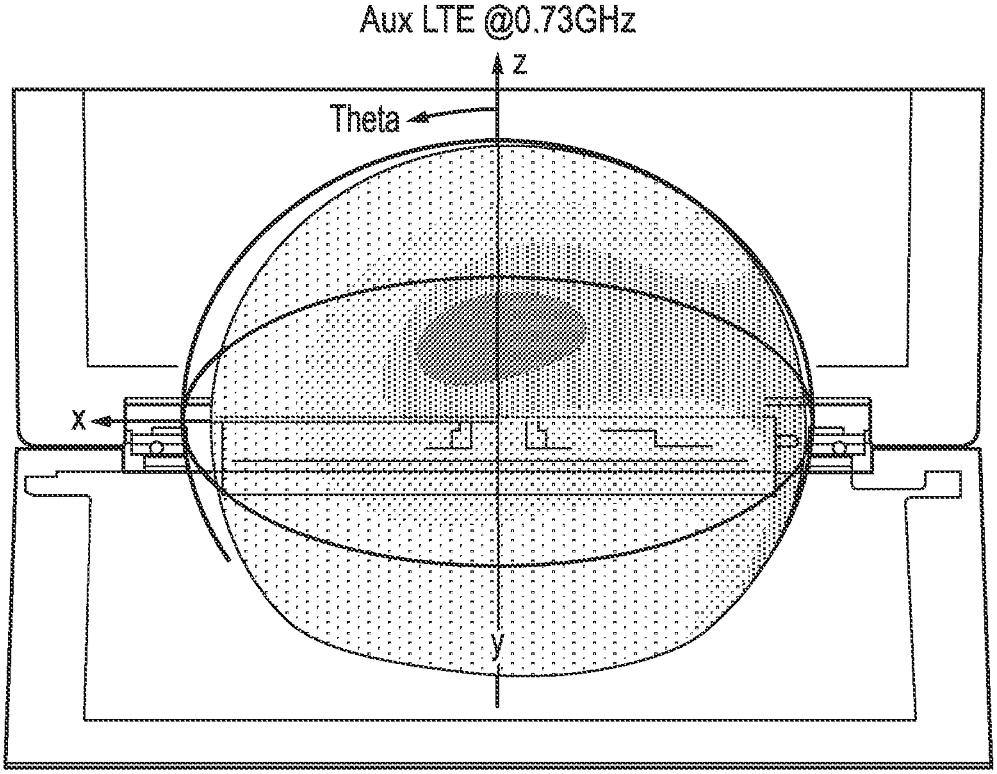
Figure 20:
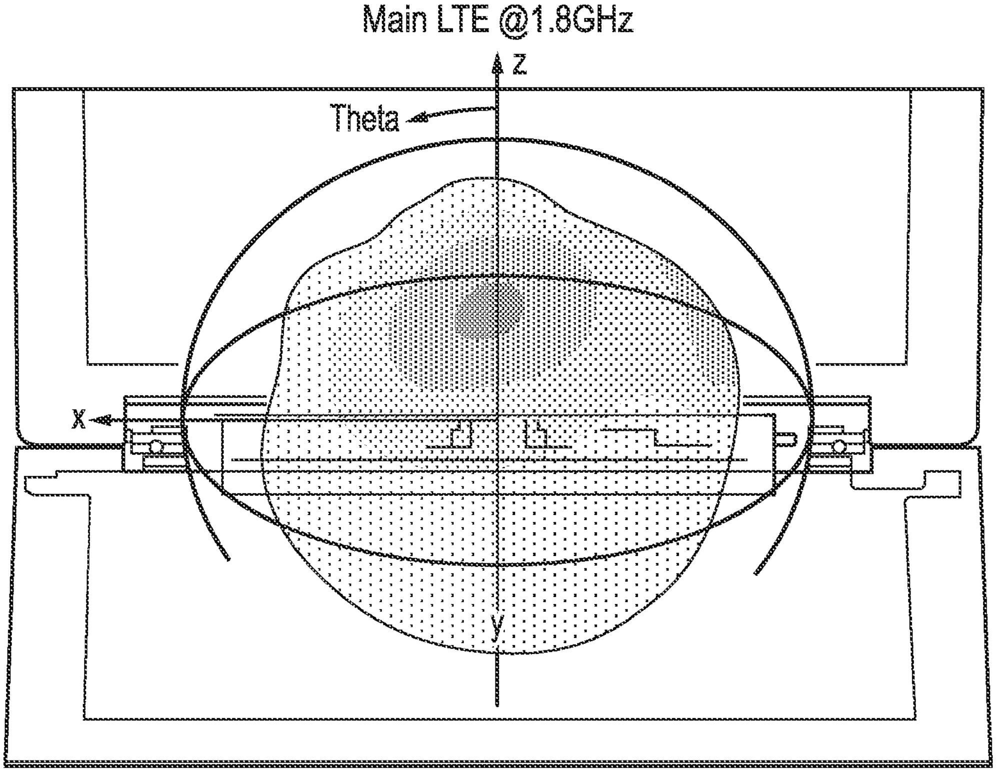
FIG. 20 shows the radiation characteristics of the first and second LTE antennas at 1.8 GHz.
Figure 20:
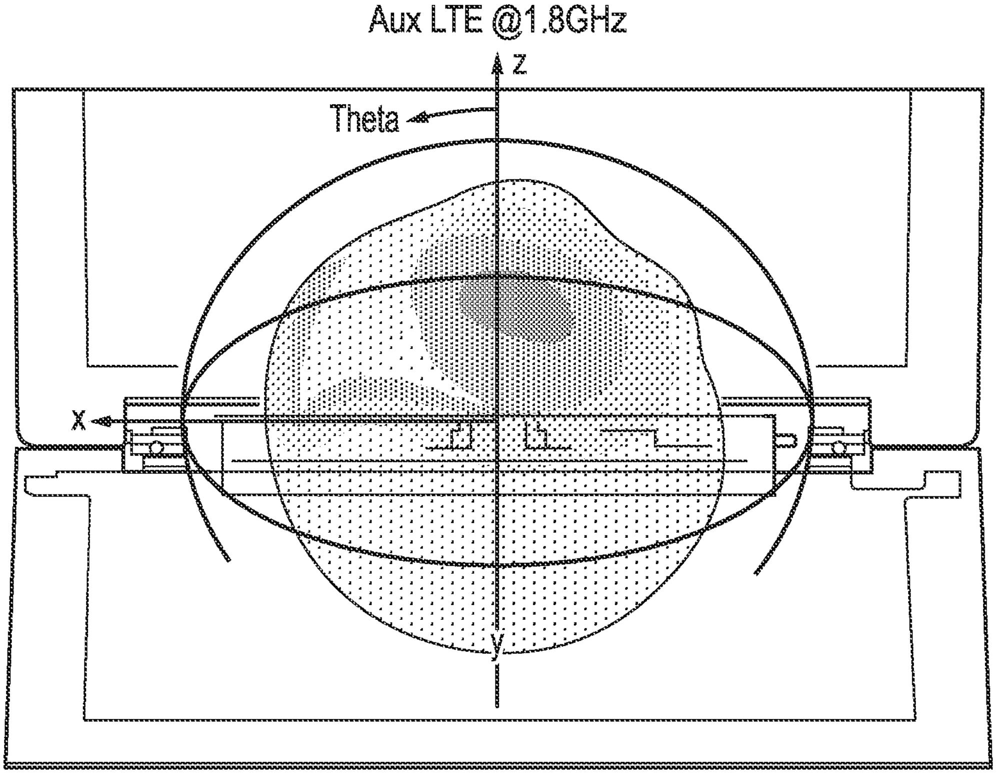
Figure 21:
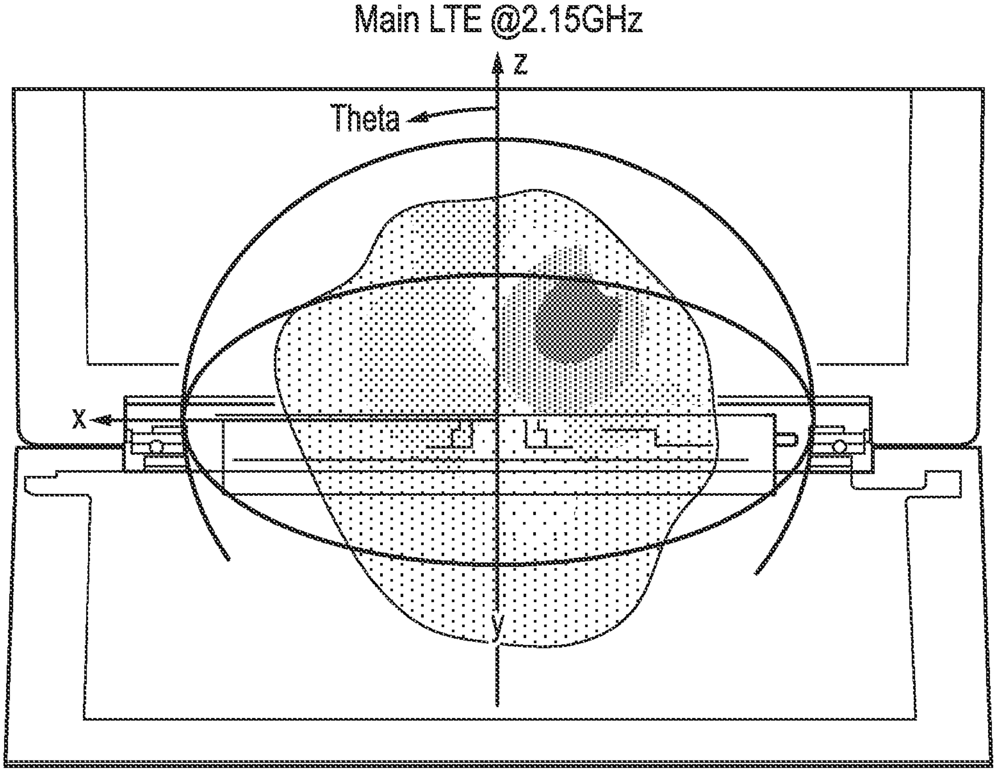
FIG. 21 shows the radiation characteristics of the first and second LTE antennas at 2.15 GHz.
Figure 21:
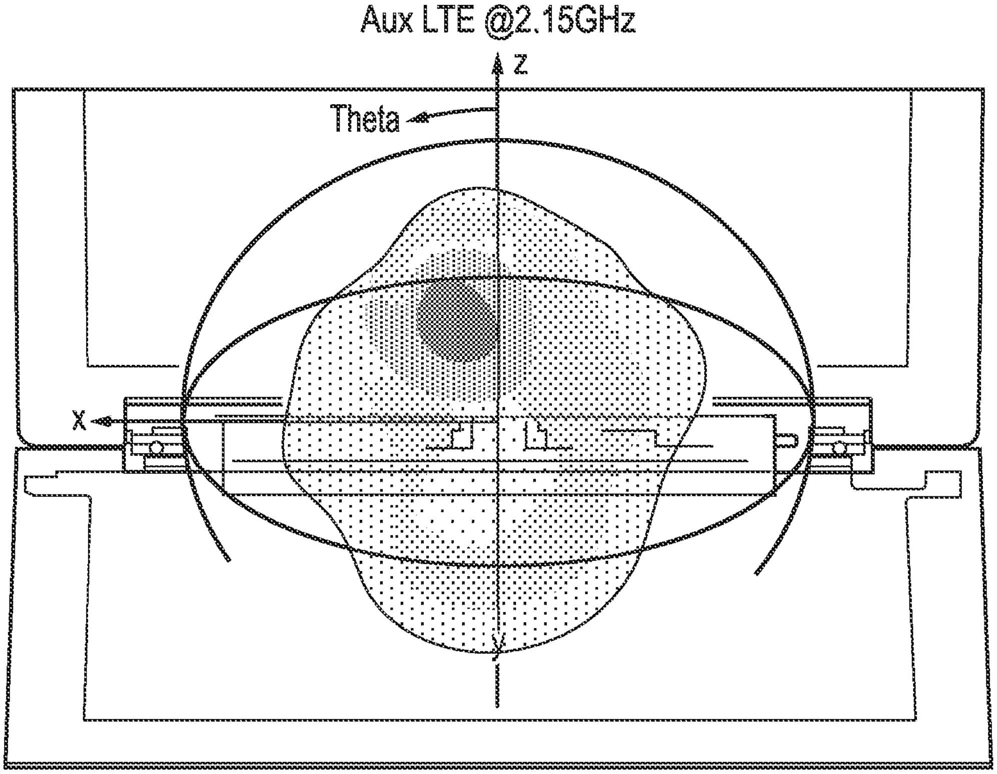
Figure 22:
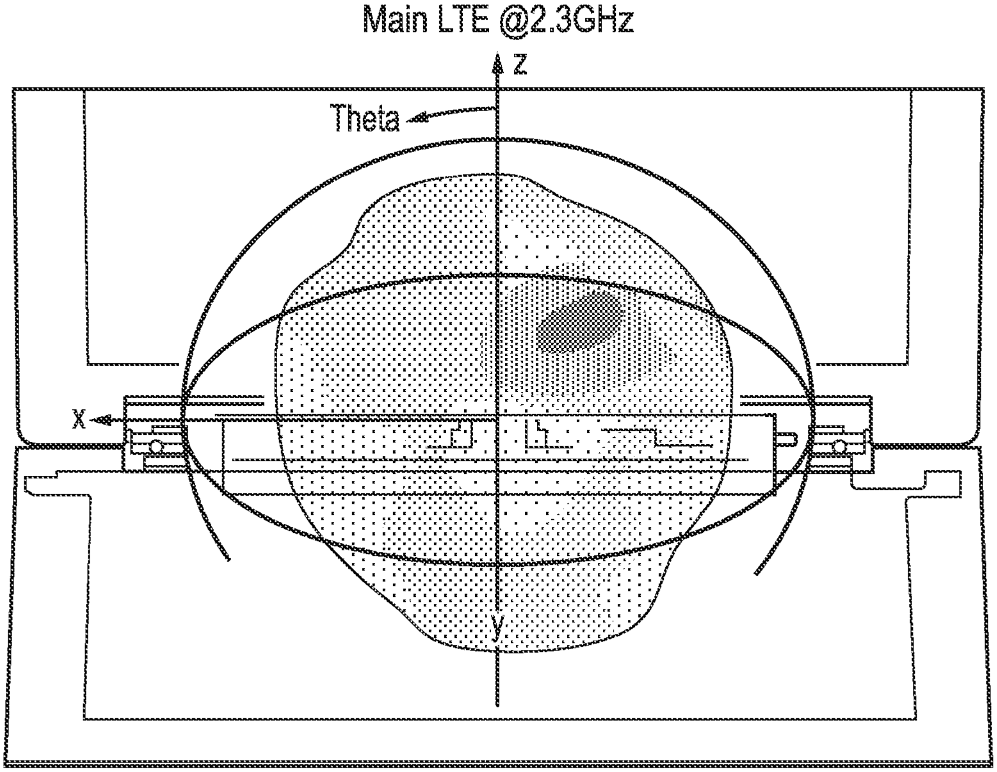
FIG. 22 shows the radiation characteristics of the first and second LTE antennas at 2.3 GHz.
Figure 22:
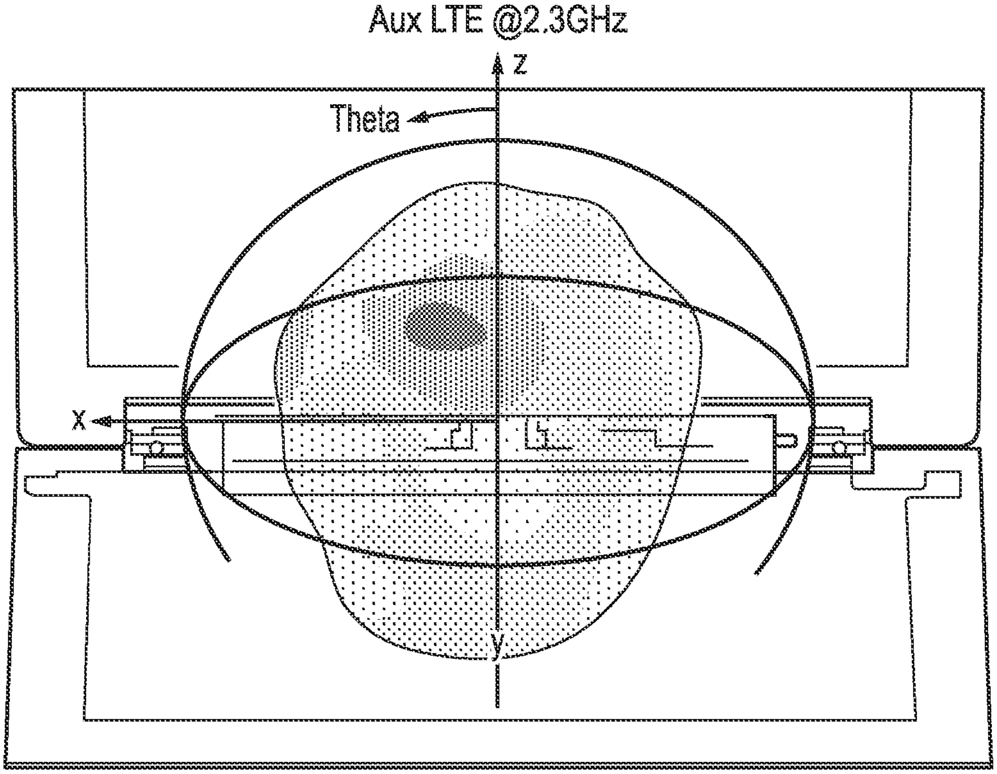
Figure 23:
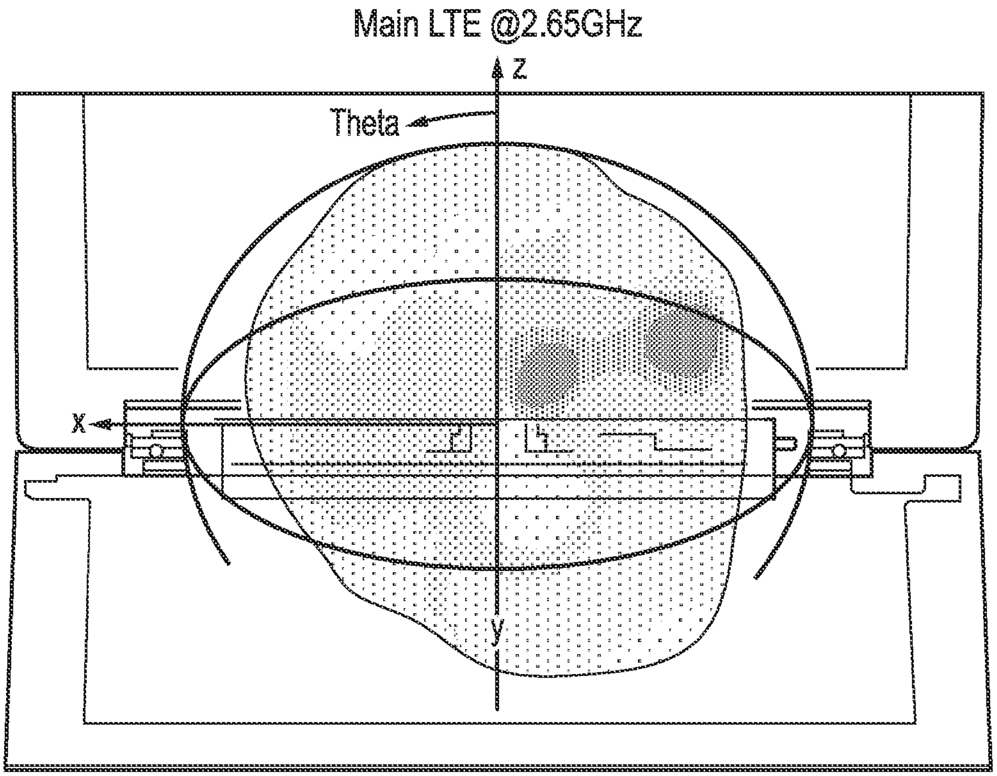
FIG. 23 shows the radiation characteristics of the first and second LTE antennas at 2.65 GHz.
Figure 23:
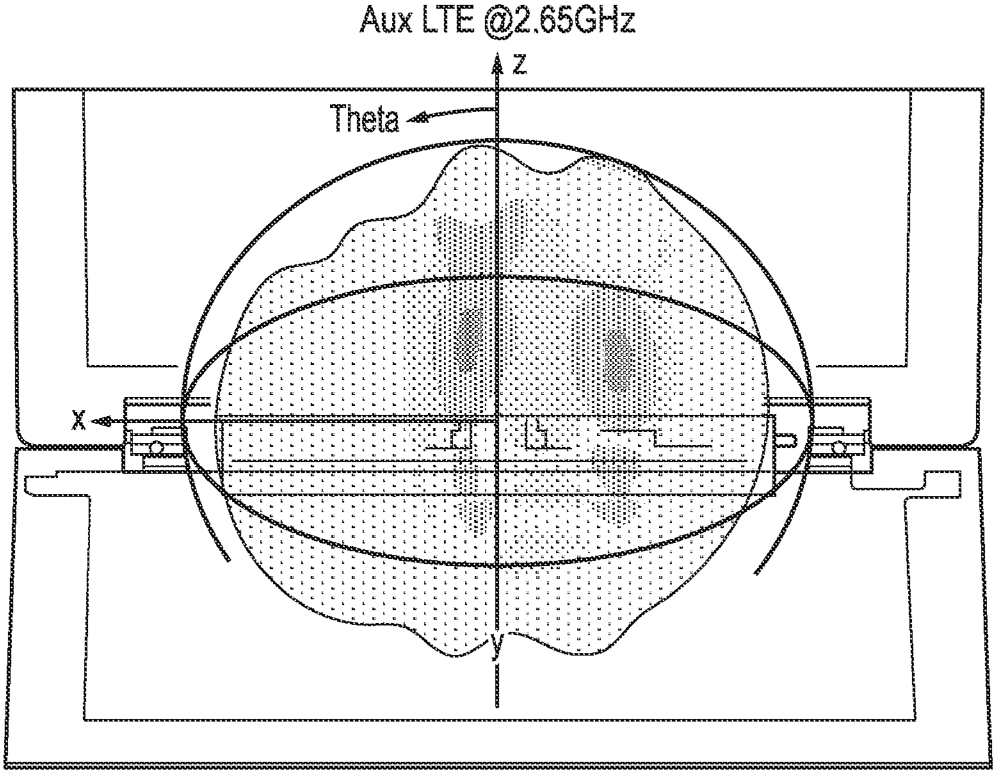
Figure 24:
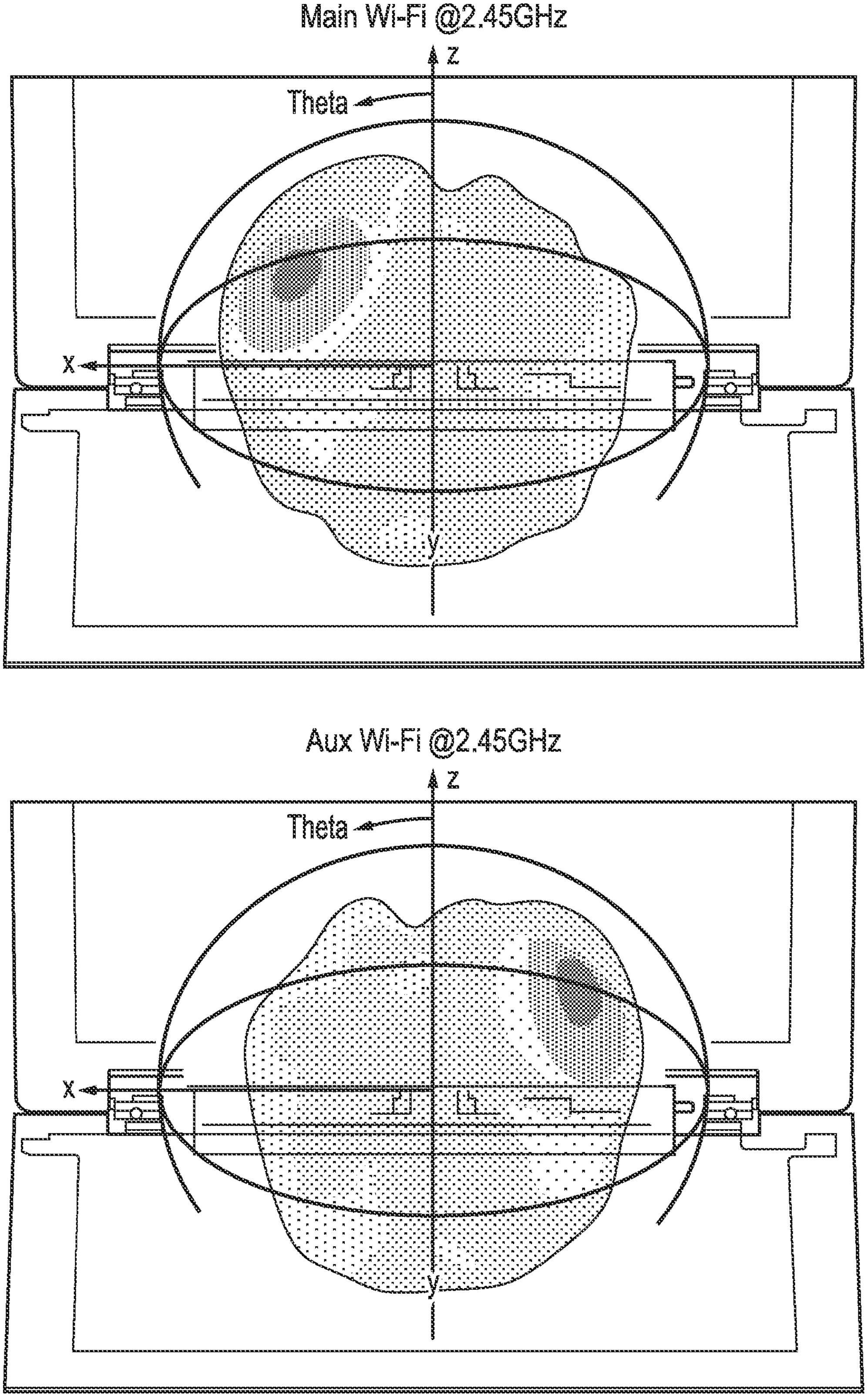
FIG. 24 shows the radiation characteristics of the first and second WLAN antennas at 2.45 GHz.
Figure 25:
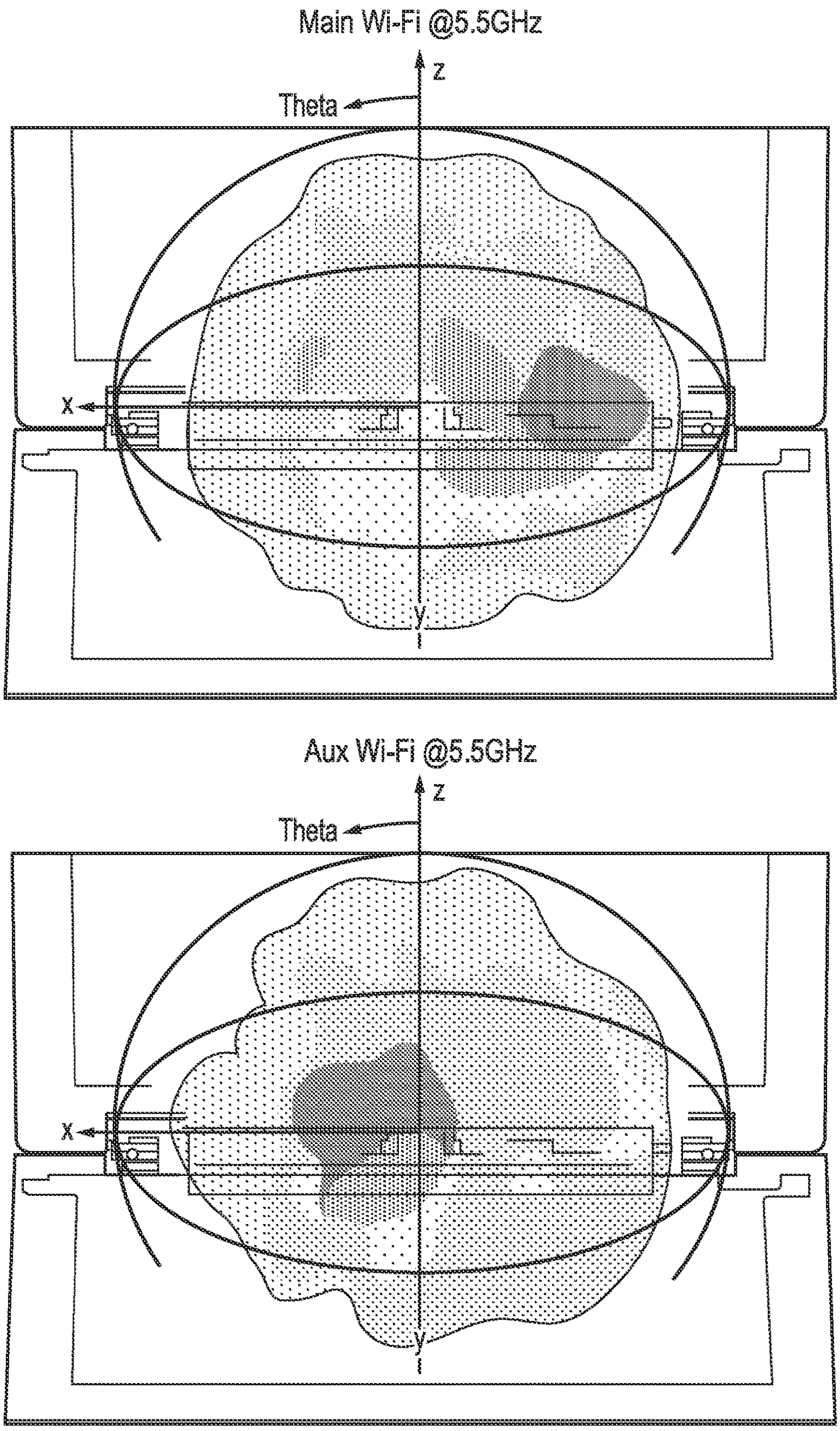
FIG. 25 shows the radiation characteristics of the first and second WLAN antennas at 5.5 GHz.

FIG. 19 shows the radiation characteristics of the first and second LTE antennas at 0.73 GHz; FIG. 20 shows the radiation characteristics of the first and second LTE antennas at 1.8 GHz; FIG. 21 shows the radiation characteristics of the first and second LTE antennas at 2.15 GHz; FIG. 22 shows the radiation characteristics of the first and second LTE antennas at 2.3 GHz, FIG. 23 shows the radiation characteristics of the first and second LTE antennas at 2.65 GHz, FIG. 24 shows the radiation characteristics of the first and second WLAN antennas at 2.45 GHz and FIG. 25 shows the radiation characteristics of the first and second WLAN antennas at 5.5 GHz.

Figure 26:
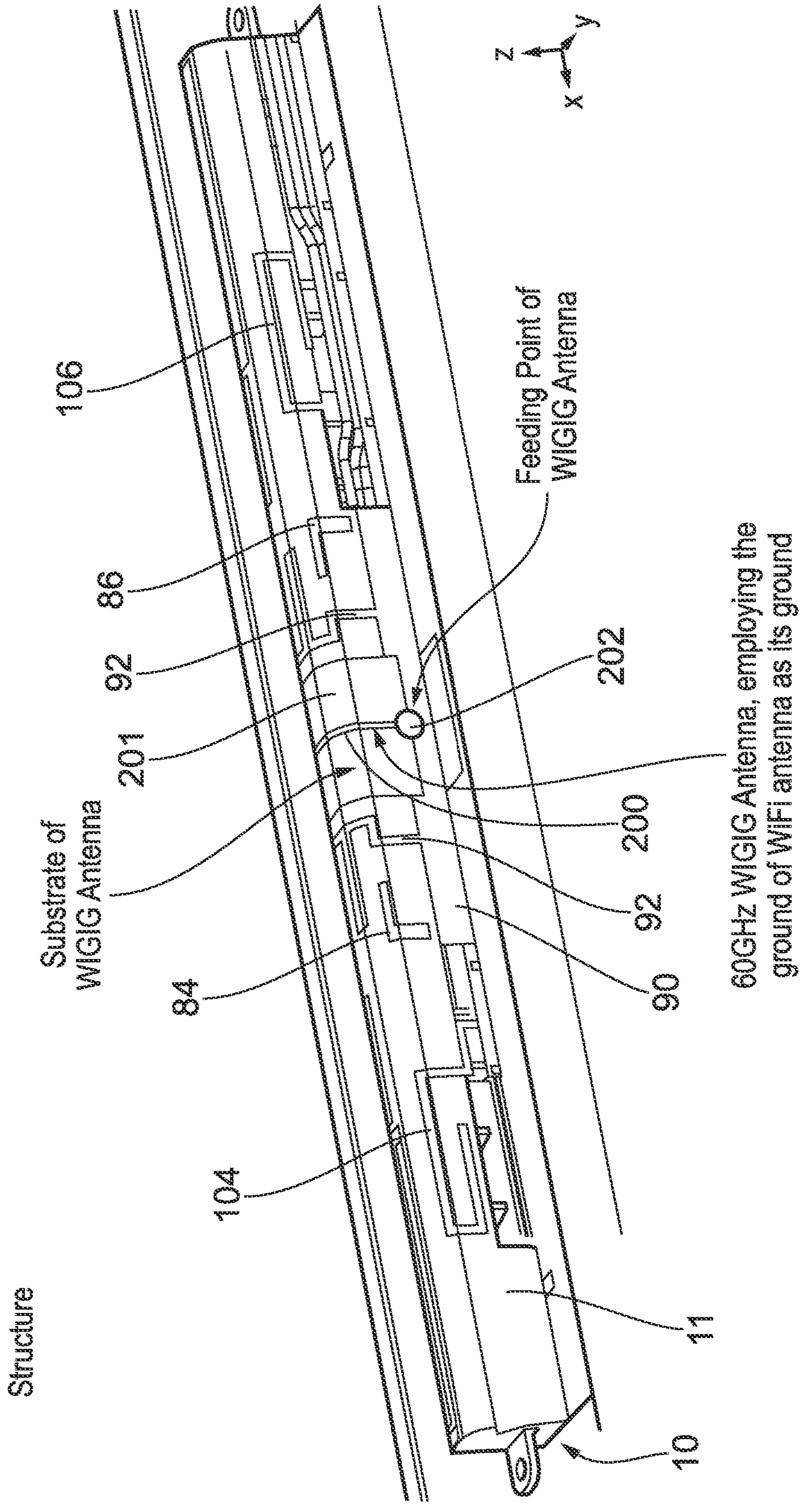
FIG. 26 shows a variation of the embodiment of FIGS. 10 to 16 with an additional 60 GHz WiGig® antenna.

FIG. 26 shows a further development of the embodiment of FIGS. 10 to 16, with an additional 60 GHz WiGig® antenna 200 mounted on its own substrate 201 which is conformed to the surface of the main substrate 11 and located at a central part of the main substrate 11 between WLAN antennas 84 and 86. The 60 GHz antenna 200 has a feed point 202, and is driven against the groundplane 90. Also shown in FIG. 26 are GPS antennas 104, 106.

Figure 27:
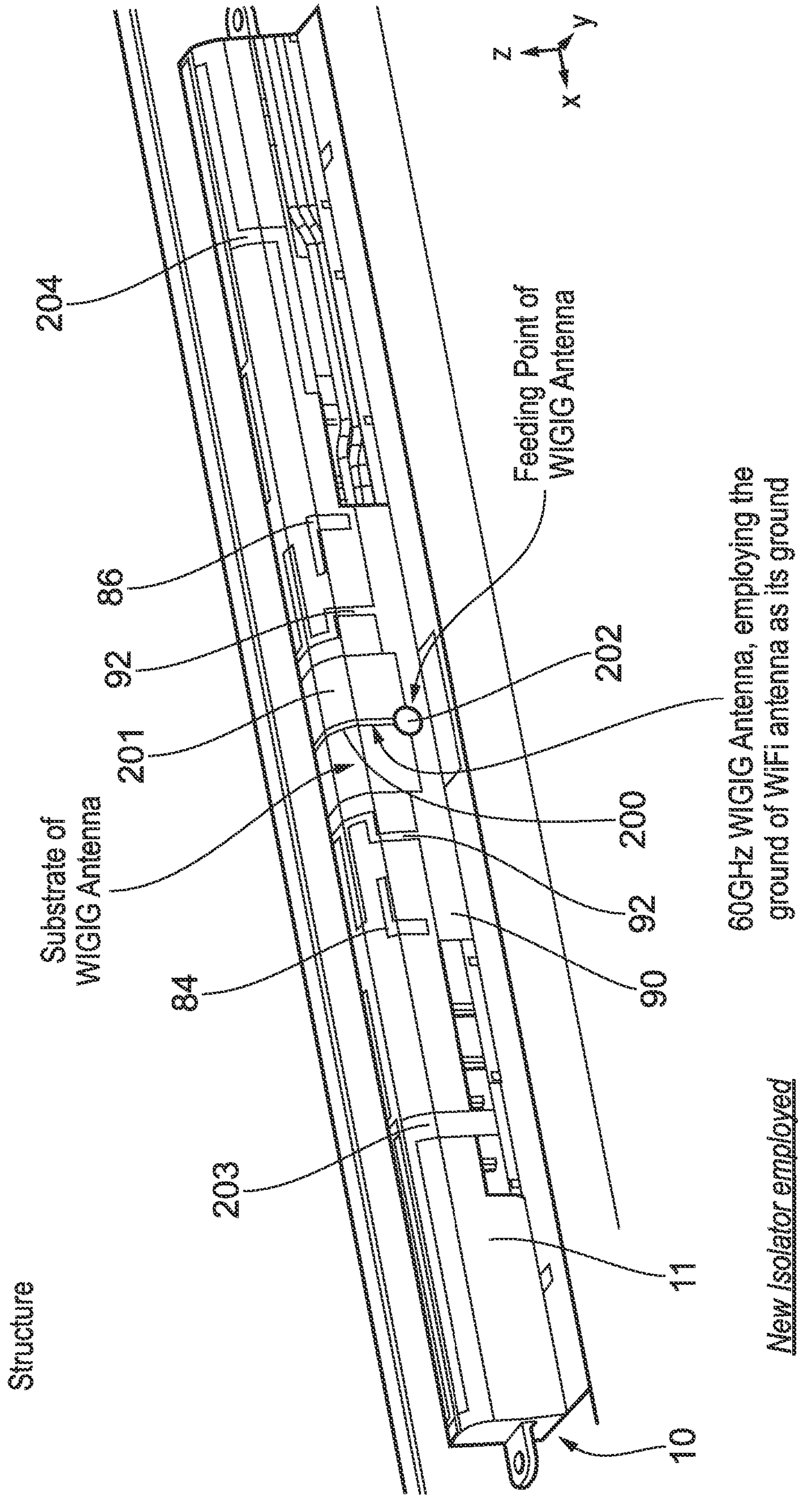
FIG. 27 shows a further variation of the embodiment of FIGS. 10 to 16 with an additional 60 GHz WiGig® antenna and additional isolation structures.

FIG. 27 shows a variation of the FIG. 26 embodiment in which the GPS antennas 104, 106 are replaced by additional isolation structures 203, 204 in the form of L or inverted-L shaped resonators connected to the groundplane 90. The additional isolation structures 203, 204 help to isolate the 60 GHz antenna 200 from the first and second LTE antennas which are not visible in FIGS. 26 and 27, being disposed on the other side of the substrate 11.

Figure 28:
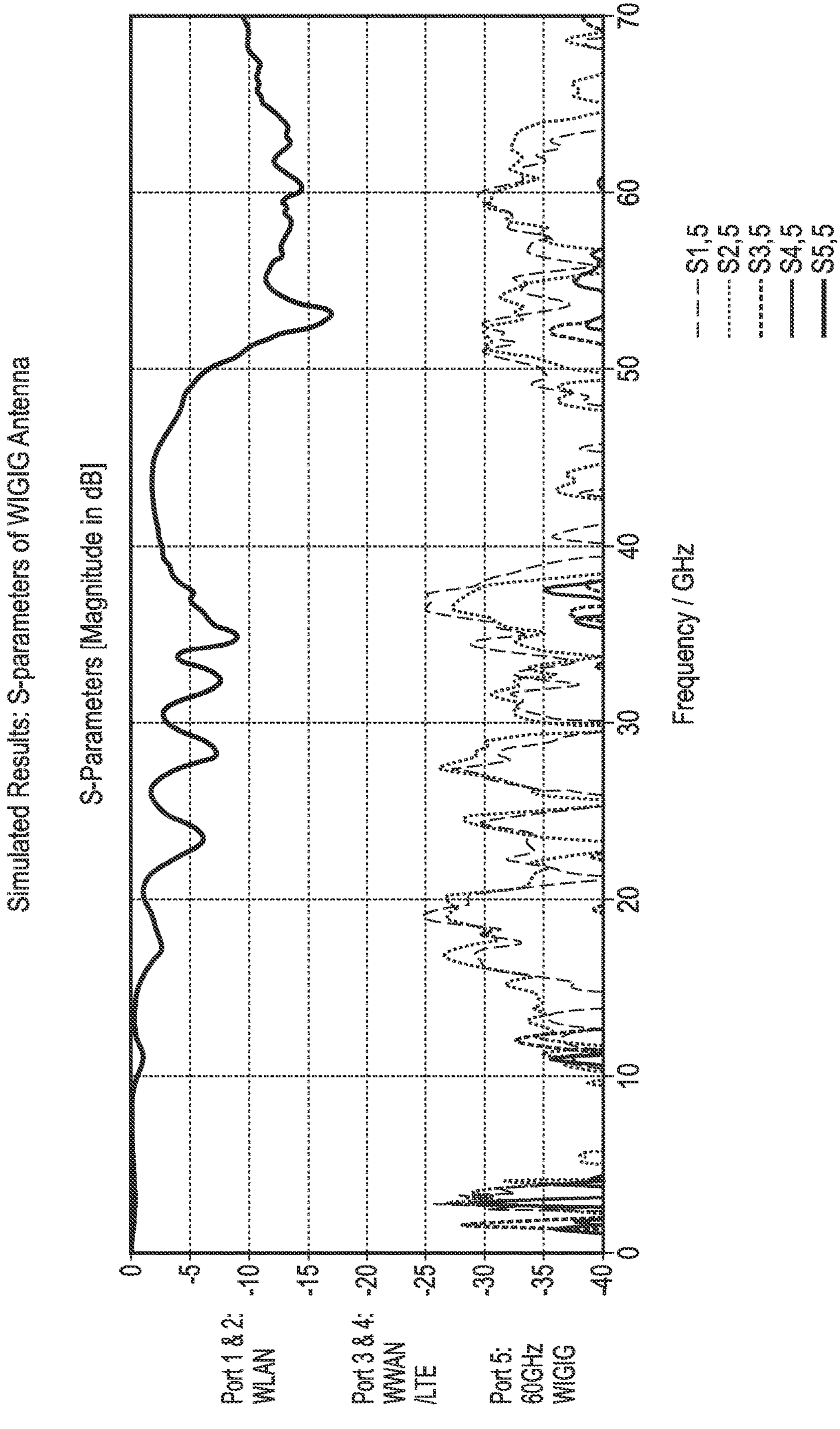
FIG. 28 shows the simulated return loss and isolation characteristics in terms of S-parameters for the embodiment of FIG. 27.

FIG. 28 shows the simulated return loss and isolation characteristics in terms of S-parameters for the embodiment of FIG. 27. It can be seen that the embodiment of FIG. 27 is in effect a five port antenna system, with ports 1 and 2 for the first and second LTE antennas, ports 3 and 4 for the first and second WLAN antennas, and port 5 for the 60 GHz WiGig® antenna.

Figure 29:
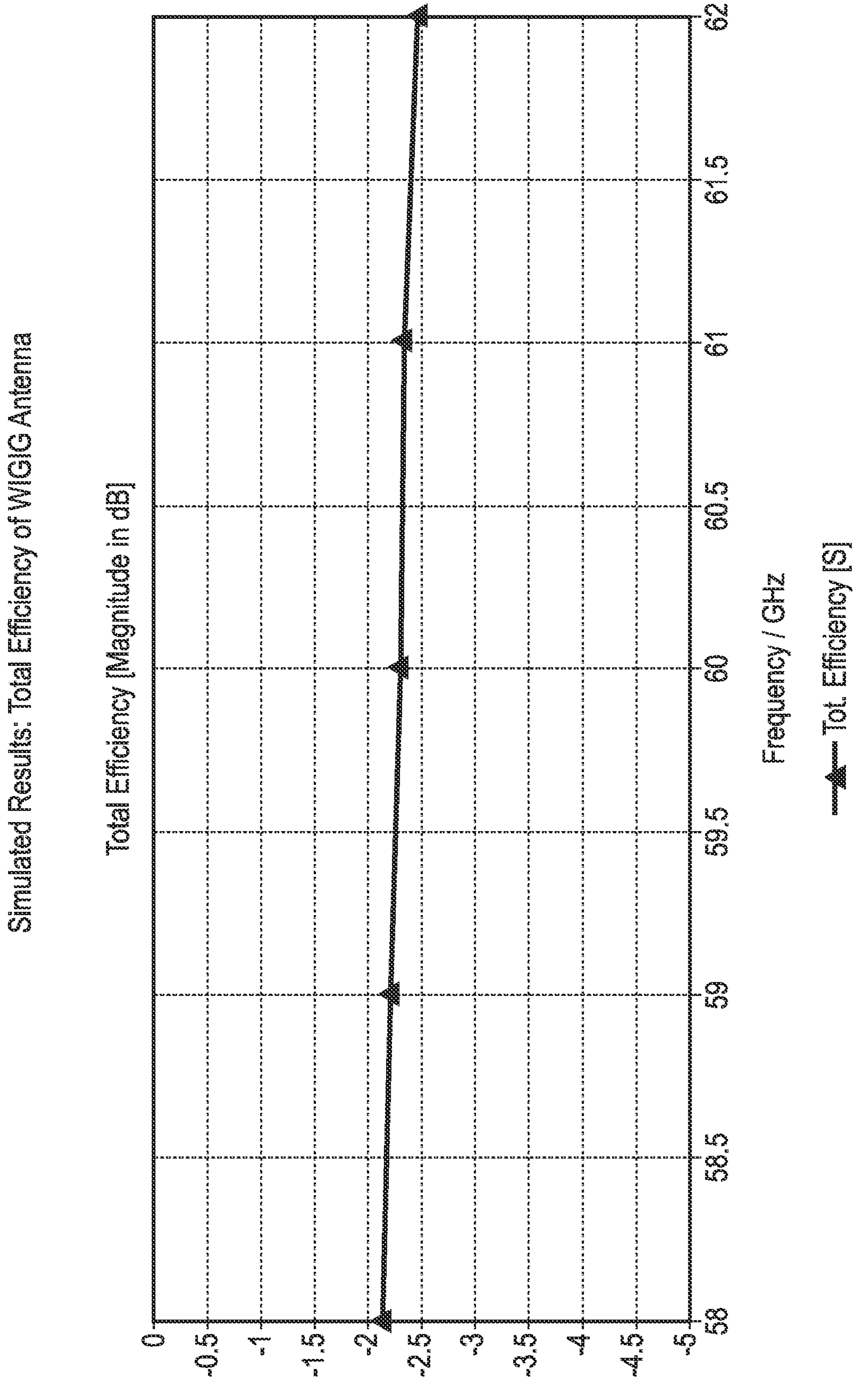
FIG. 29 is a plot showing the total efficiency of the 60 GHz WiGig® antenna of the embodiment of FIG. 27.

FIG. 29 is a plot showing the total efficiency of the 60 GHz WiGig® antenna of the embodiment of FIG. 27.

Figure 30:
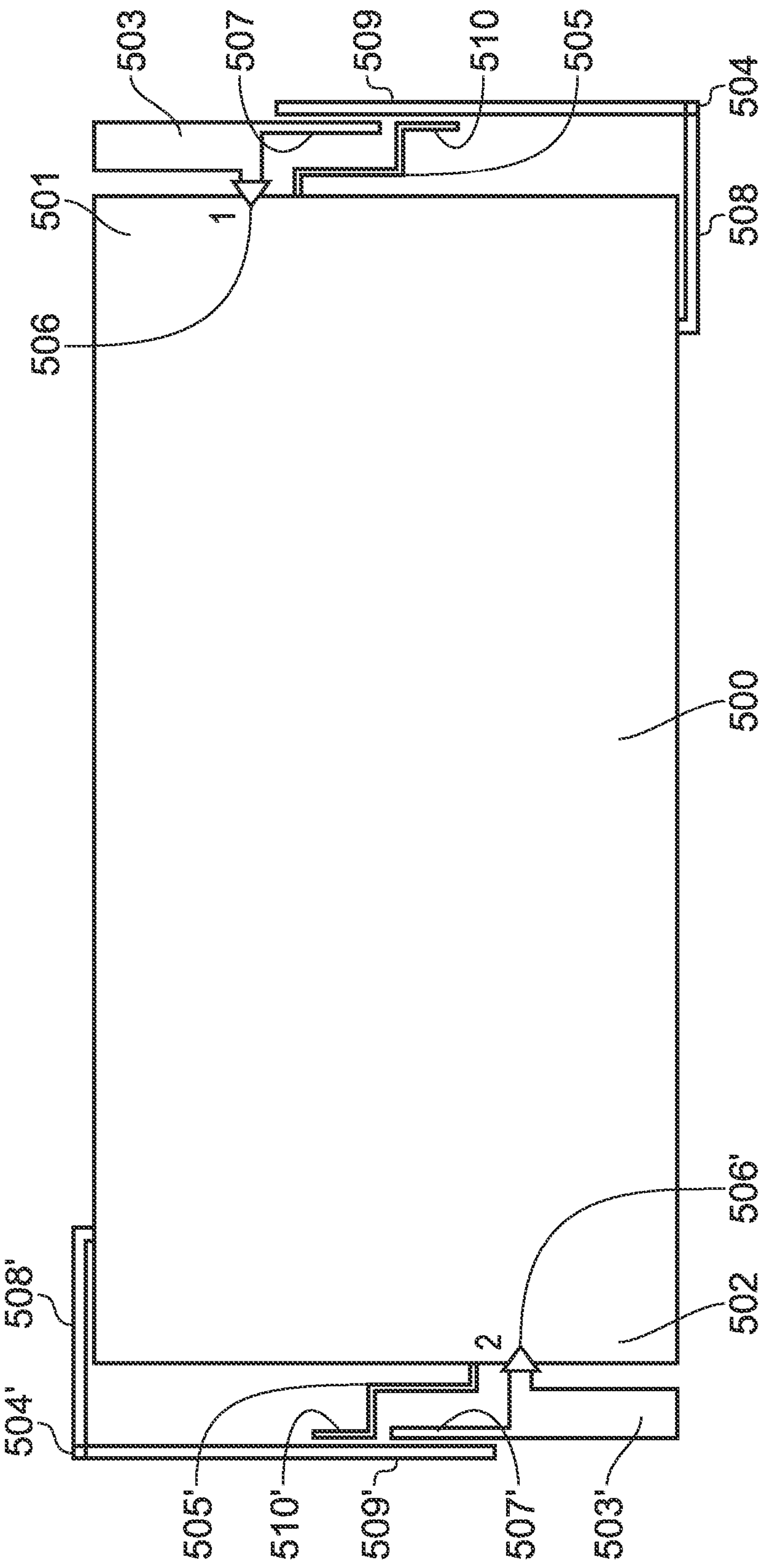
FIG. 30 is a schematic view of a further embodiment comprising first and second antenna systems arranged at opposite ends of a main PCB of a mobile handset.

FIG. 30 shows a main PCB 500 of a mobile handset. The main PCB 500 includes a groundplane (not shown) and serves as a platform for various electronic components of the handset. The main PCB 500 is of generally rectangular shape, and has first and second opposed ends 501, 502. A first antenna system comprising a first antenna 503, a first resonator element 504 and a second resonator element 505 is arranged at the first end 501 of the PCB 500. In this particular example, the first antenna 503 is configured as a monopole antenna, but other types of antennas may be employed. The first antenna 503 is driven against the groundplane of the PCB 500 by a feed 506. In this embodiment, the first antenna 503 is shown as a self-supporting structure, for example stamped or cut from a sheet of metal. The first antenna 503 is positioned generally at the left of the first end 501 of the PCB 500, and extends laterally generally parallel to the edge of the first end 501. The first antenna 503 includes a lateral portion 507 that extends towards the right of the first end 501 of the PCB 500. The first resonator element 504 comprises a generally L shaped self-supporting conductive component with a first arm 508 connected to the groundplane on the right hand side of the PCB 500, and a second arm 509 extending generally parallel to the edge of the first end 501 of the PCB 500. The distal end of the second arm 509 is located parallel to and adjacent to the lateral portion 507 of the first antenna 503 so as to allow strong coupling therebetween. The second resonator element 505 is located between the first antenna 503 and the first resonator element 504 on the first end of the PCB 500. The second resonator element is connected to ground, for example by way of a selectable impedance, such as a short circuit, an open circuit, a fixed or variable capacitance, or a fixed or variable impedance. The second resonator element 505 is a self-supporting conductive component shaped so that its distal end portion 510 is located adjacent and generally parallel to the second arm 509 of the first resonator element 504 so as to couple strongly therewith.

A second antenna system, essentially similar or identical to the first antenna system, is arranged at the second end 502 of the main PCB 500, with like parts being labelled as for the first antenna system with the addition of a prime. It can be seen that the first and second antenna systems are arranged about the main PCB 500 with $2^{nd}$ order rotational symmetry—the main PCB 500 can be rotated through 180° in its plane and the first and second antenna systems will be swapped and look similar or identical.

Figure 31:
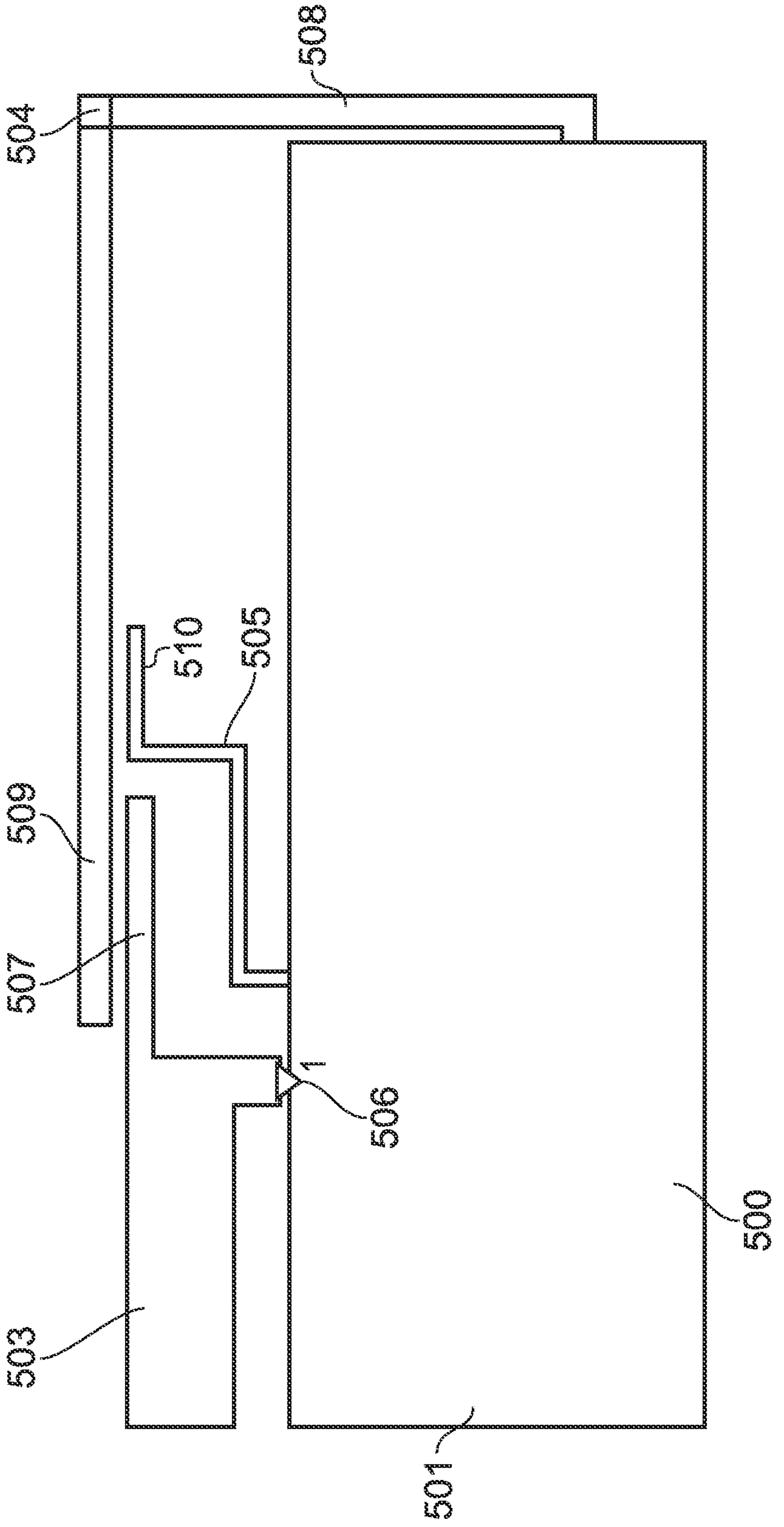
FIG. 31 shows an antenna system at one end of the main PCB of the FIG. 30 embodiment.

FIG. 31 shows the first antenna system at the first end 501 of the main PCB 500 in close-up. It can be seen how the components are arranged to promote strong coupling between the lateral portion 507 of the first antenna 503 and the distal end of the second arm 509 of the first resonator element 504, and between the distal end portion 510 of the second resonator element 505 and the distal end of the second arm 509 of the first resonator element 504.

Figure 33:
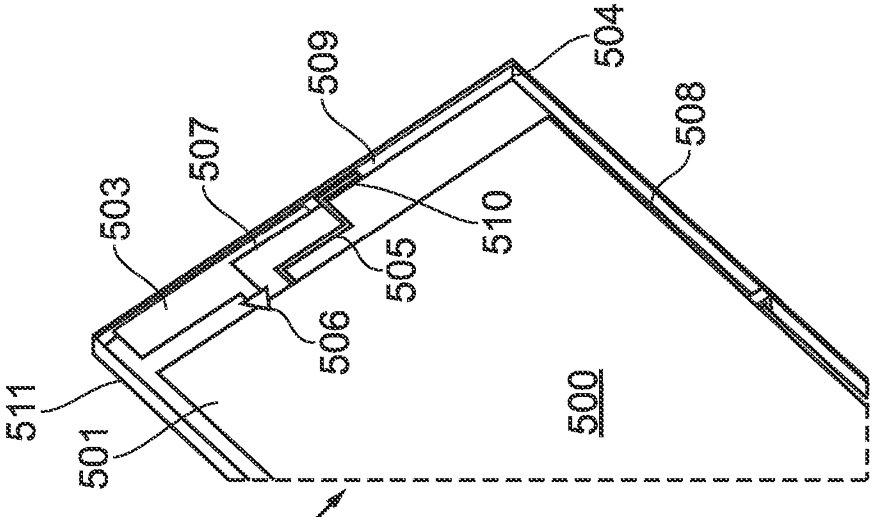
FIGS. 32 and 33 show a variation of the FIG. 30 embodiment with a first resonator element formed as part of a frame or casing of the mobile handset.
Figure 32:
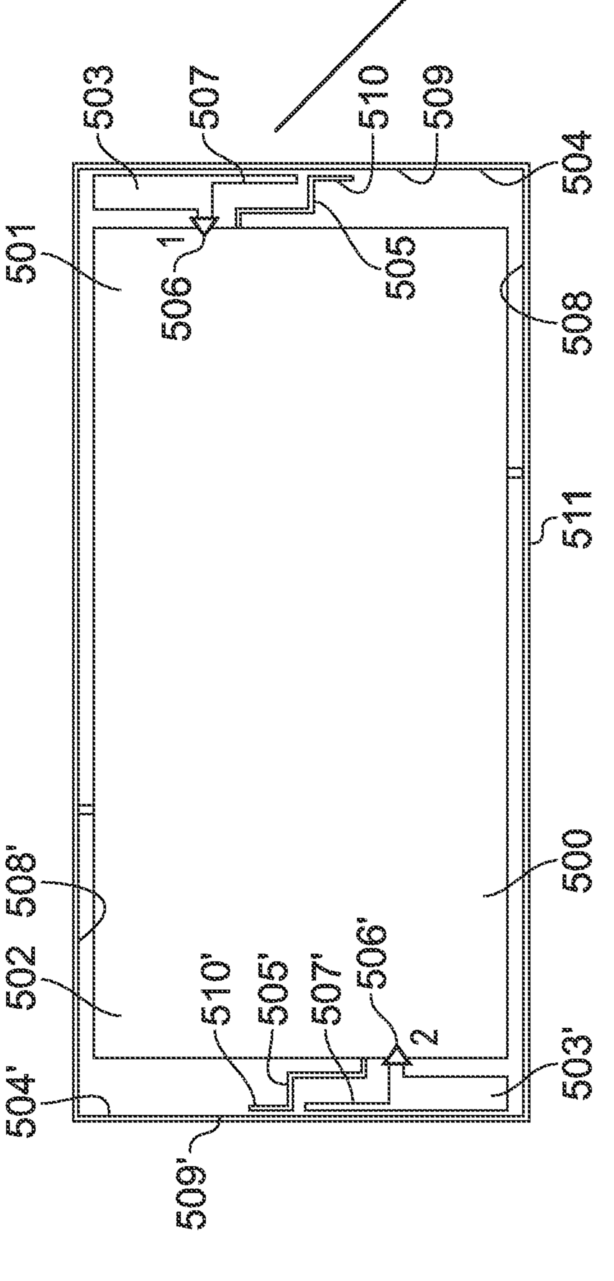

FIGS. 32 and 33 show an alternative configuration of the general embodiment of FIGS. 30 and 31. In this embodiment, a frame 511 surrounds the main PCB 500. The frame 511 may be a part of the casing or housing of a mobile handset, and conveniently serves as a substrate for the first resonator element 504.

Figure 34:
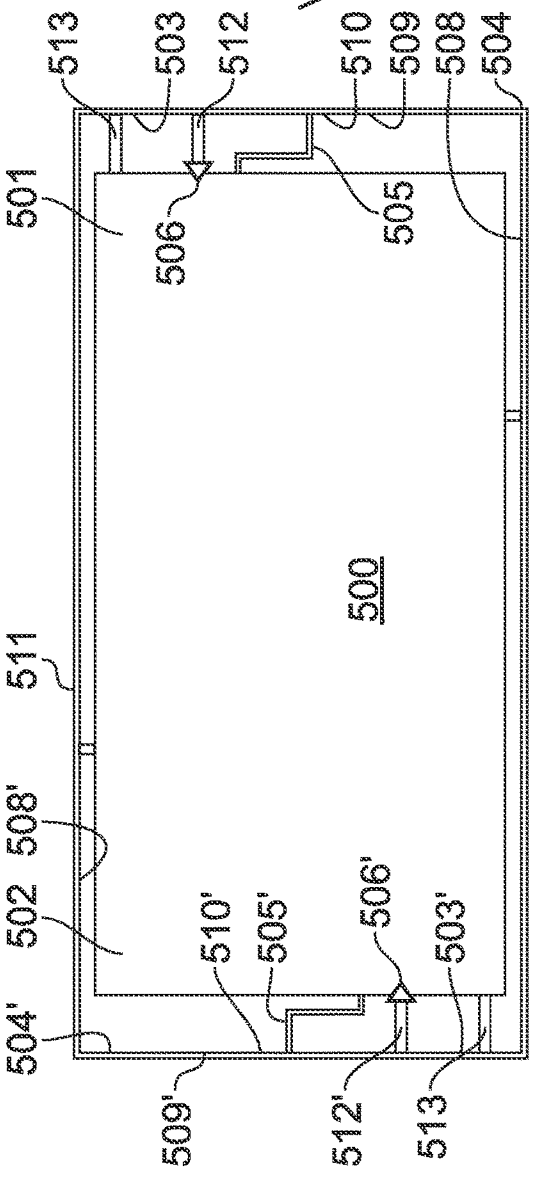
FIGS. 34 and 35 show another variation of the FIG. 30 embodiment with parts of an antenna and a second resonator element formed as part of a frame or casing, as well as the first resonator element.
Figure 35:
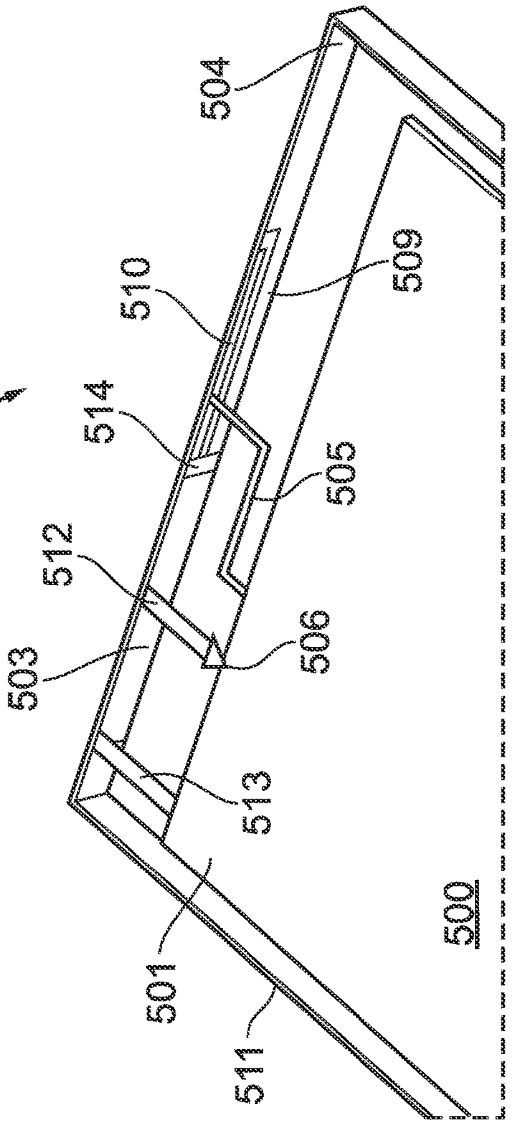

A further variation is shown in FIGS. 34 and 35. Here, the frame 511 serves as a substrate not just for the first resonator element 504, but also for the antenna 503 and for the distal end portion 510 of the second resonator element 505. In the particular embodiment shown in FIGS. 34 and 35, the antenna 503 is configured as a PIFA, with a feed pin 512 connected to the feed 506 and a shorting pin 513 connected to ground. The antenna 503 and the second arm 509 of the first resonator element 504 may be disposed in different planes on the frame 511, for example being parallel to each other but spaced apart by a thin dielectric separation layer 514. This allows strong coupling to be maintained between the antenna 503 and the first resonator element 504. The distal end portion 510 of the second resonator element 505 runs parallel to the second arm 509 of the first resonator element 504 on the frame 511, allowing strong coupling therebetween.

Figure 36:
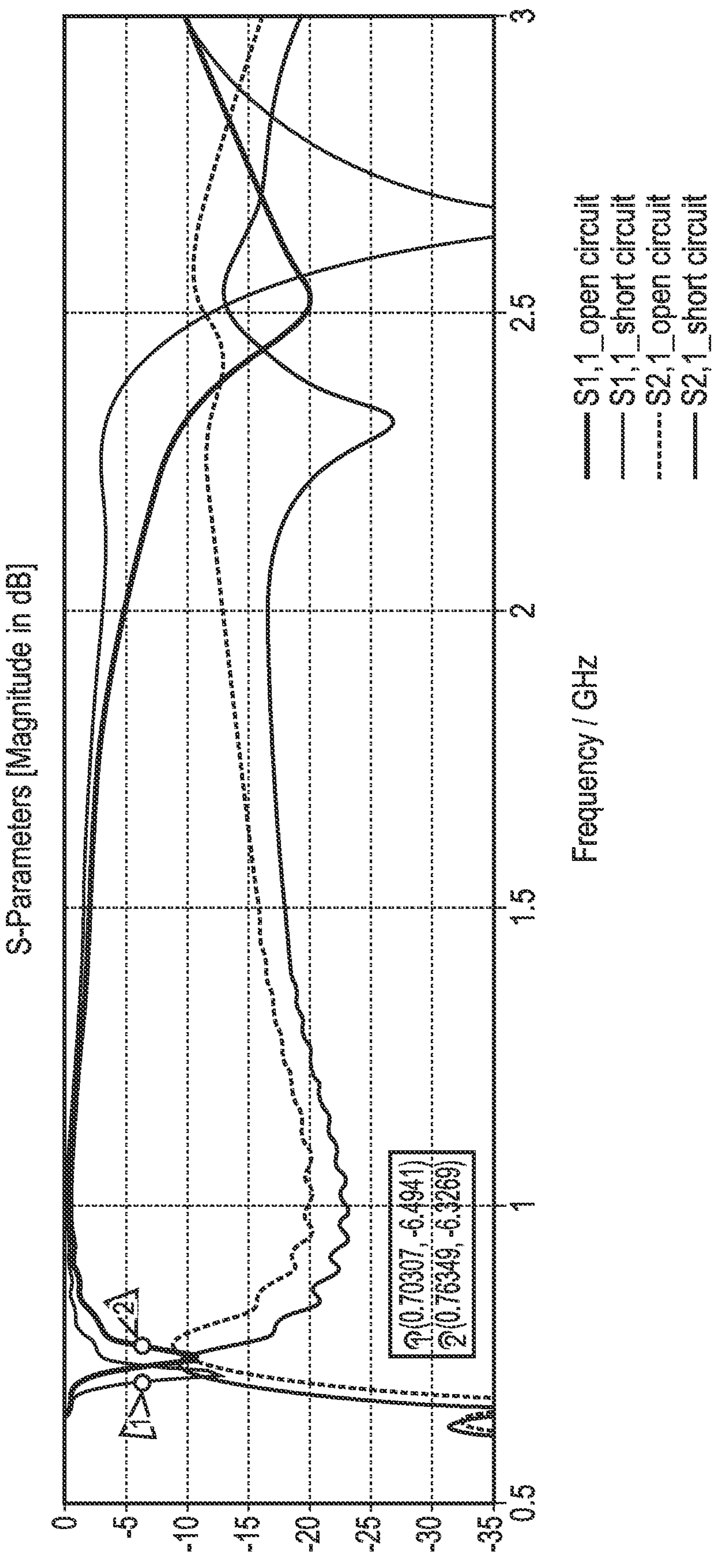
FIG. 36 is an S-parameter simulation plot for the embodiment of FIG. 30.

FIG. 36 is an S-parameter plot for the embodiment of FIG. 30, showing the S11 return loss for both an open circuit and a short circuit connection of the first resonator element to ground, as well as the S21 isolation between antennas 503 and 503' for both the open circuit and short circuit configurations.

Figure 37B:
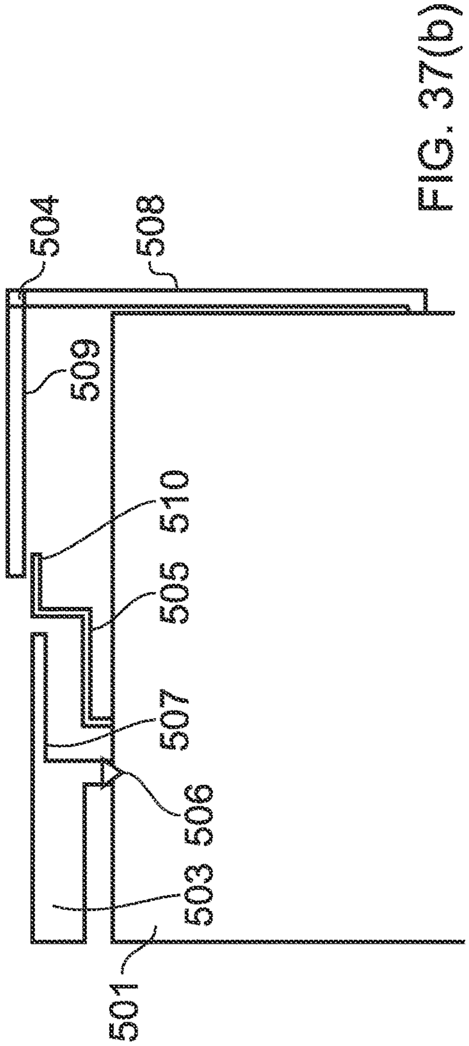
FIG. 37(*a*) is an S-parameter simulation plot for a configuration as shown in FIG. 37(*b*).
Figure 37A:
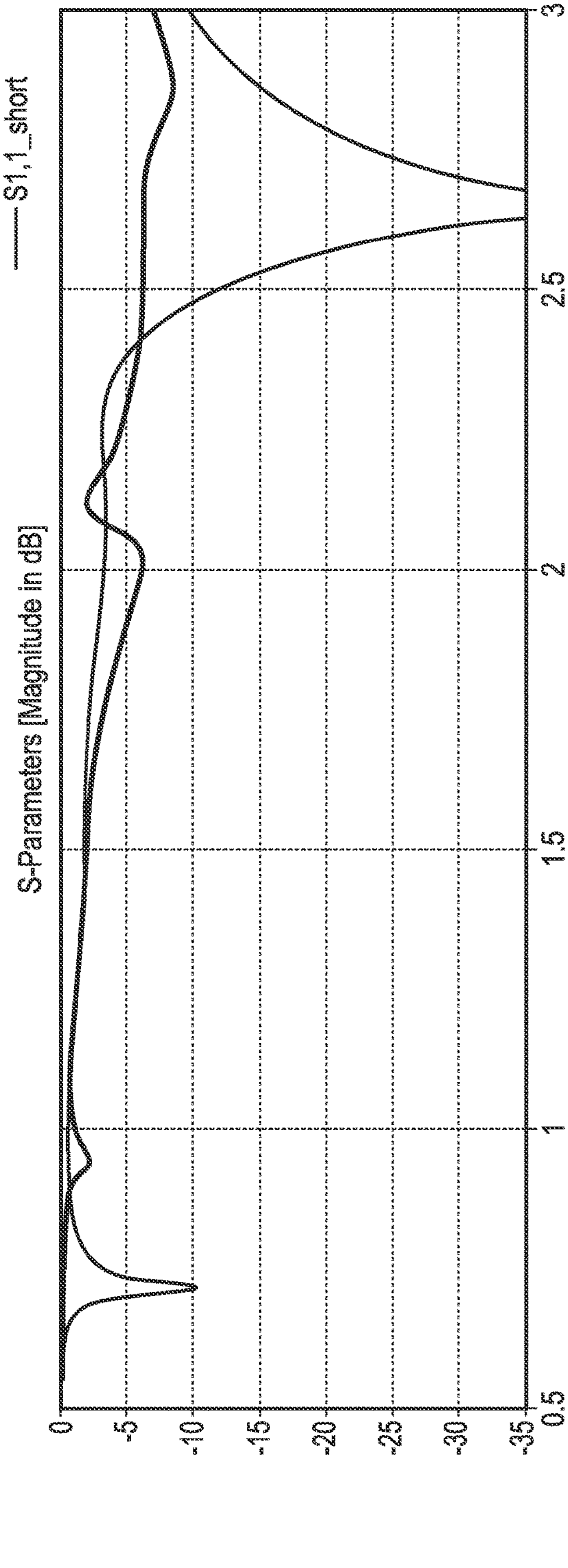

FIGS. 37(*a*) and 37(*b*) show a comparative example where the second arm 509 of the first resonator element 504 is shortened so that it does not couple strongly with the lateral portion 507 of the antenna 503. The S11 return loss plot in FIG. 37(*a*) shows that the antenna system no longer works effectively.

Figure 38B:
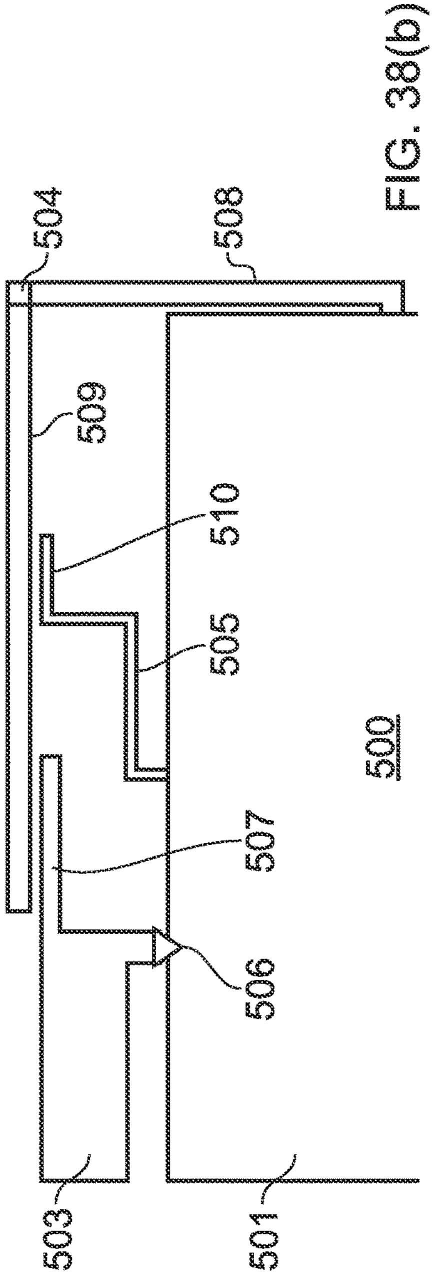
FIG. 38(*a*) is an S-parameter simulation plot for a configuration as shown in FIG. 38(*b*).
Figure 38A:
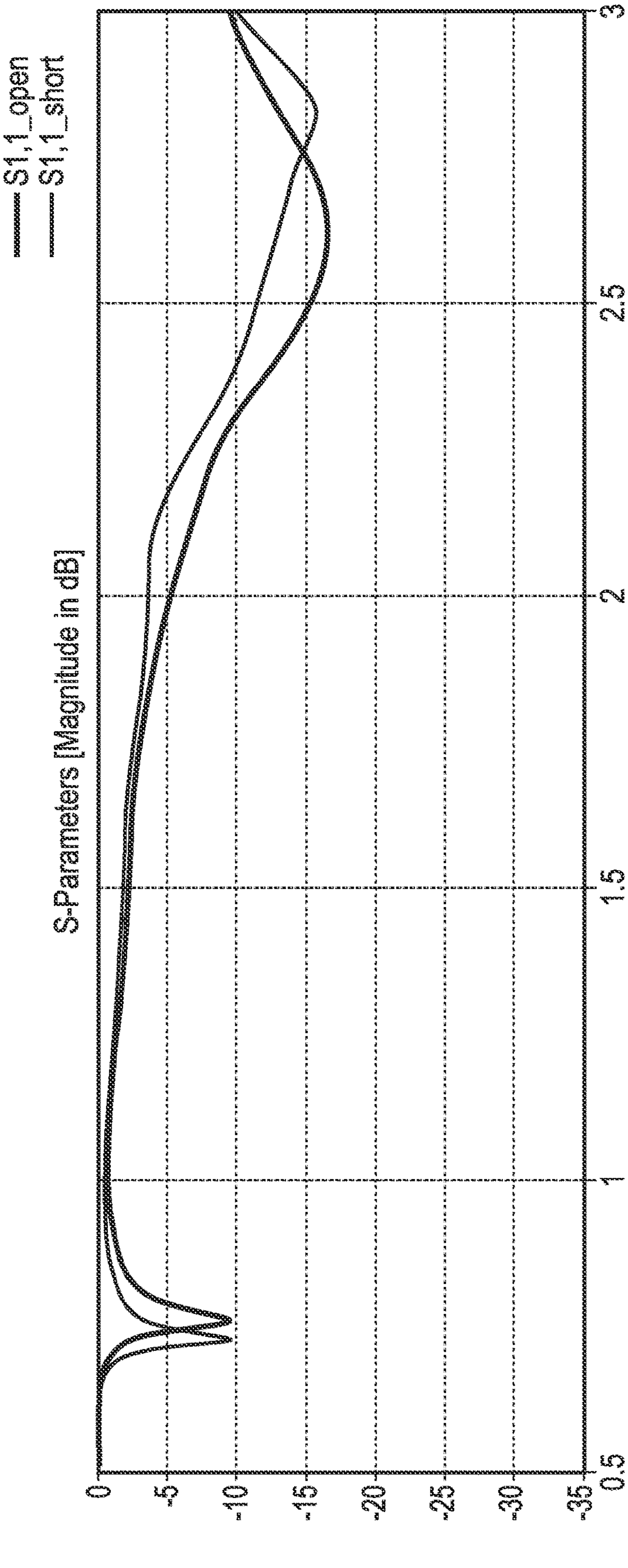

FIGS. 38(*a*) and 38(*b*) show a comparative example where the second resonator element 505 is configured so that it still couples strongly with the first resonator element 504, but less strongly (or even negligibly) with the first antenna 503. The S11 return loss plot in FIG. 38(*a*) shows that the antenna system surprisingly still works reasonably well.

Figure 39B:
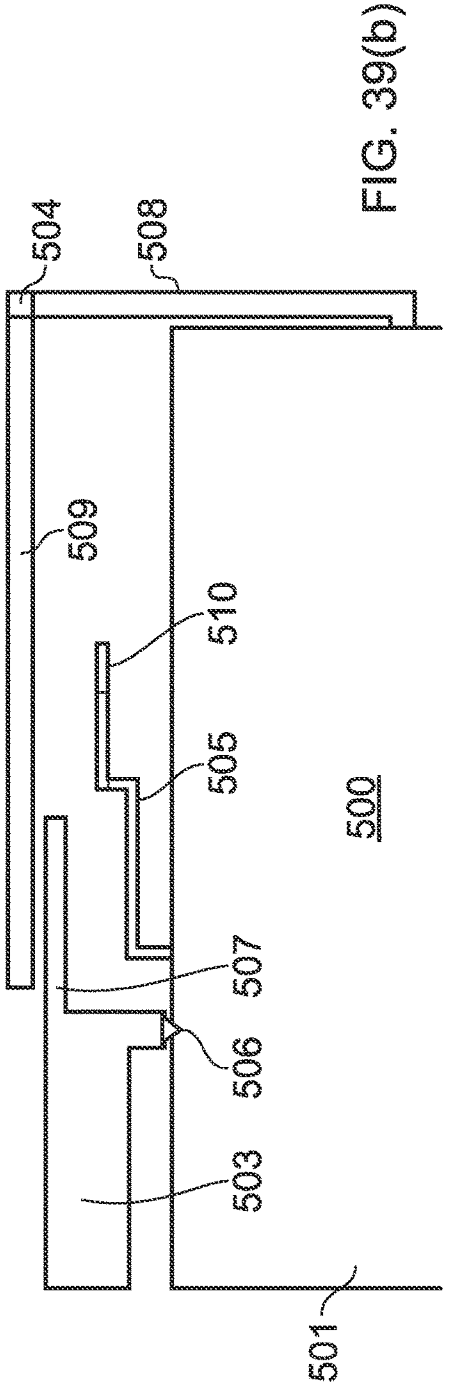
FIG. 39(*a*) is an S-parameter simulation plot for a configuration as shown in FIG. 39(*b*).
Figure 39A:
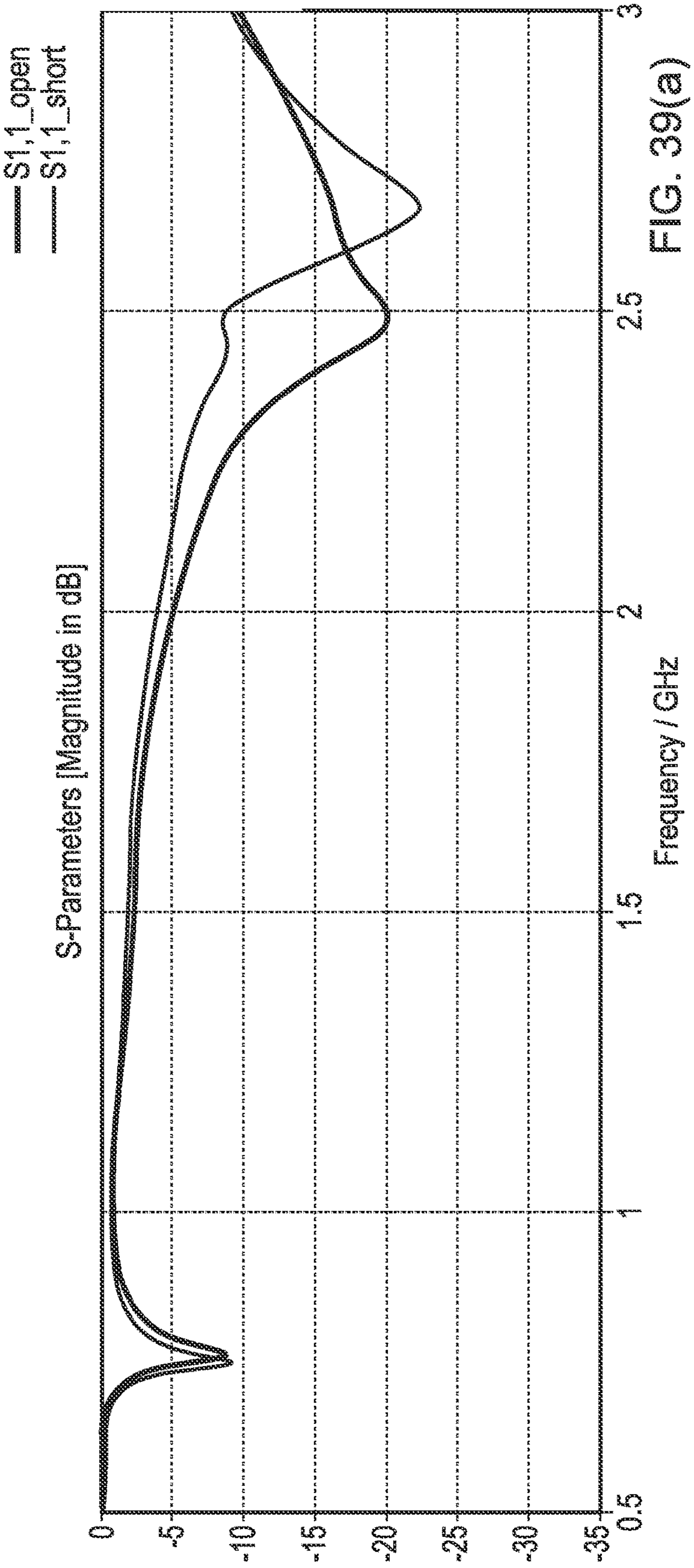

FIGS. 39(*a*) and 39(*b*) show a comparative example where the second resonator element 505 is configured so that it does not couple strongly with the first resonator element 504. The S11 return loss plot in FIG. 39(*a*) shows that the antenna system cannot be tuned effectively.

Figure 11:
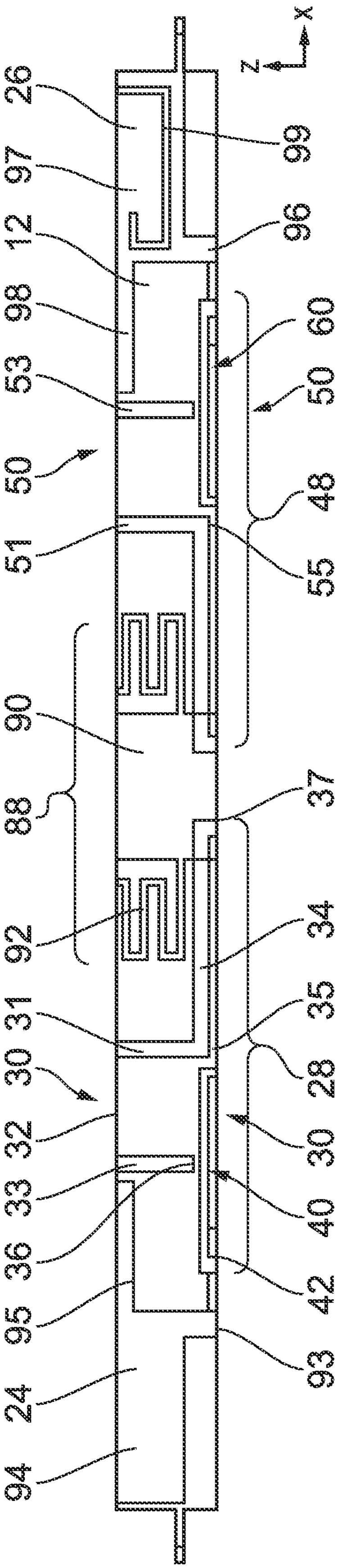
FIG. 11 is a rear view of the embodiment of FIG. 10A.
Figure 40B:
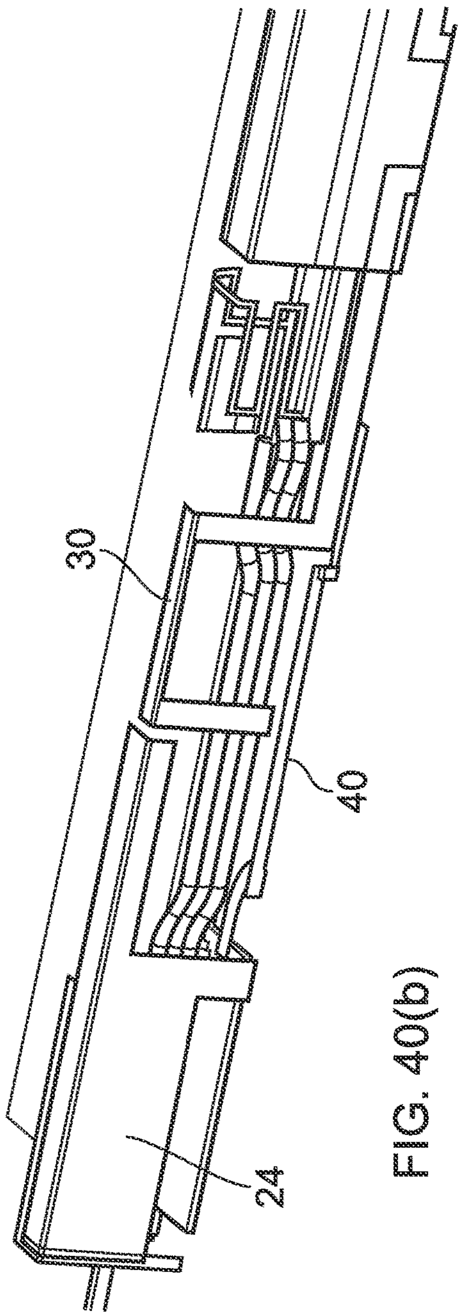
FIG. 40(*a*) is an S-parameter simulation plot for an embodiment as shown in FIG. 40(*b*), which is similar to the embodiment of FIGS. 11 and 14.
Figure 40A:
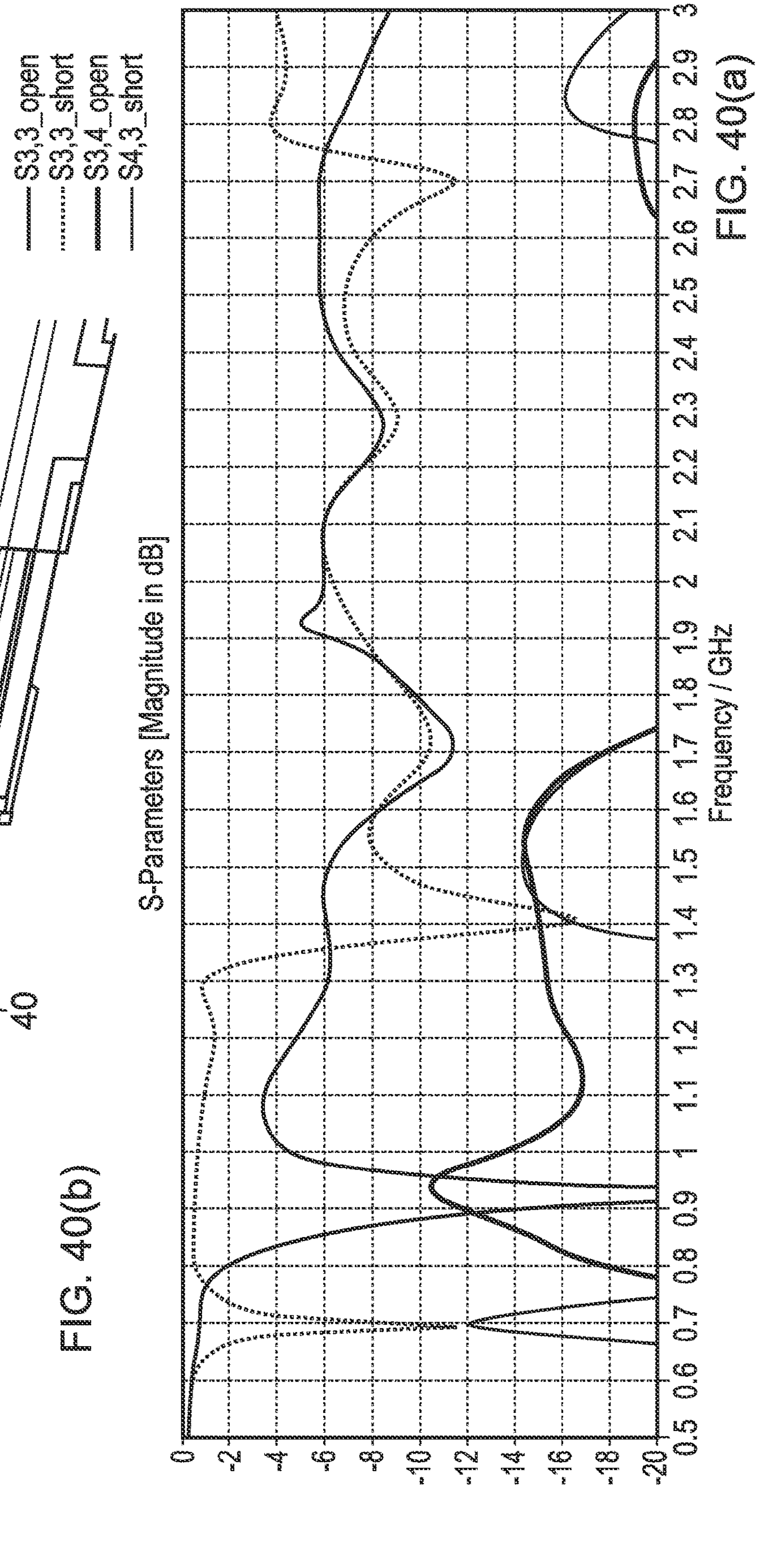

FIGS. 40(*a*) and 40(*b*) show an example corresponding to the embodiment of FIGS. 11 and 14, mounted in a hinge region of a laptop computer, with a first antenna 24, a first resonator element 30 and a second resonator element 40. The S-parameter plot in FIG. 40(*a*) shows good performance, with the low frequency band being tuneable from 700 to 960 MHz.

Figure 41B:
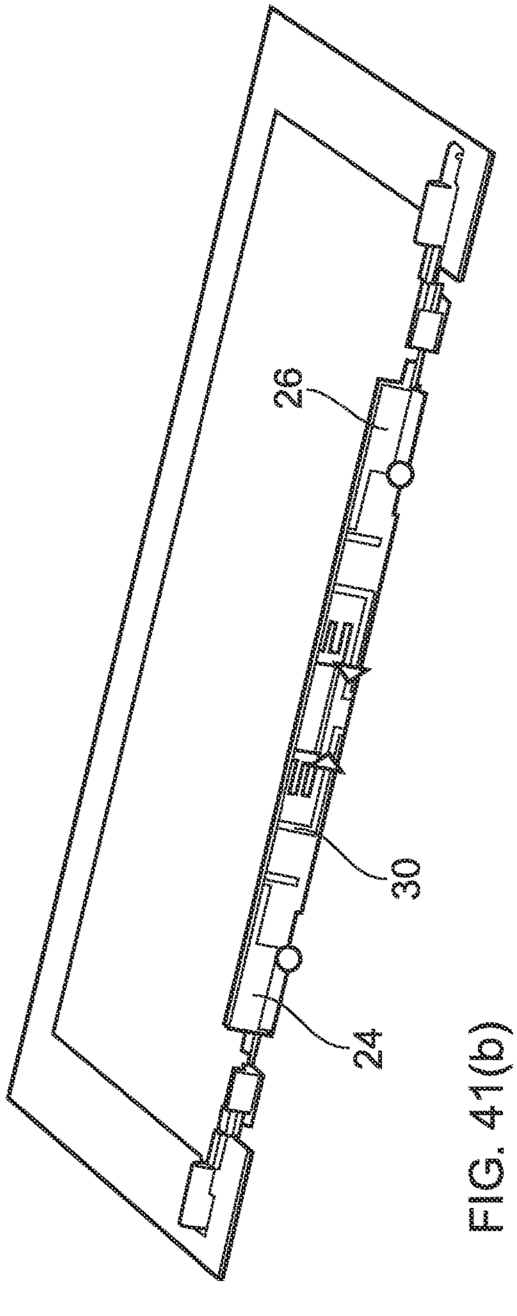
FIG. 41(*a*) is an S-parameter simulation plot for a configuration as shown in FIG. 41(*b*), which is similar to the configuration of FIG. 40(*b*) but with the second resonator element removed.
Figure 41A:
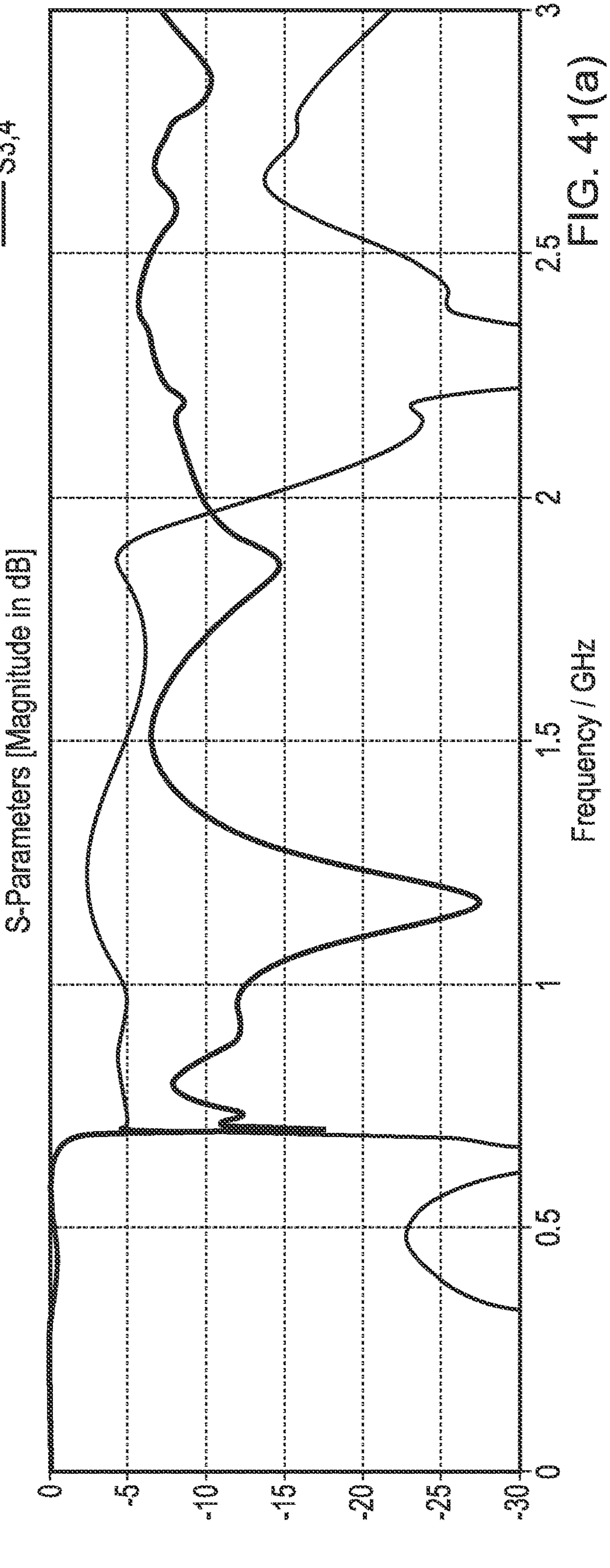

FIGS. 41(*a*) and 41(*b*) show a comparative example similar to that of FIG. 40(*b*), except with the second resonator element 40 removed. While tuning is still possible by adjusting the connection of the first resonator element 30 to ground by using an RF switch, for example an SP4T (single pole 4-throw) switch, isolation between antennas 24 and 26 is not good.

Figure 42B:
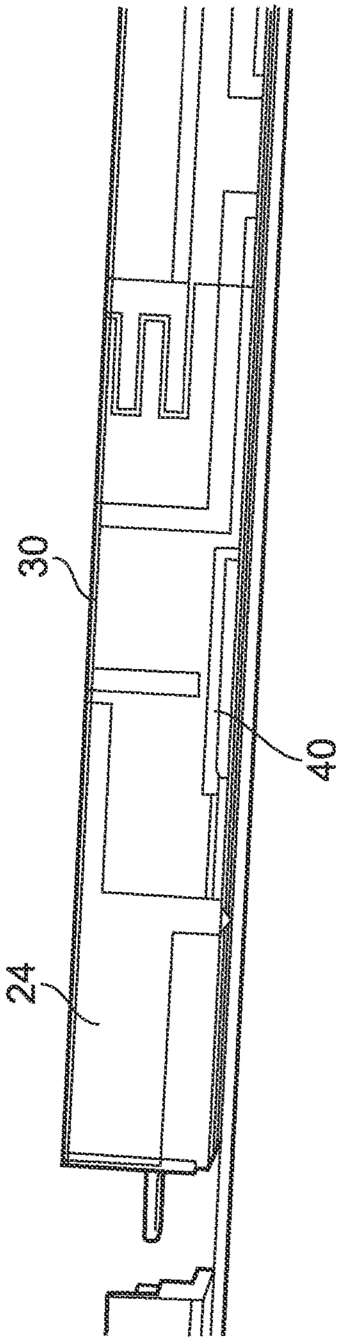
FIG. 42(*a*) is an S-parameter simulation plot for a configuration as shown in FIG. 42(*b*), which is similar to the configuration of FIG. 40(*b*) but with less coupling between the antenna and the second resonator element.
Figure 42A:
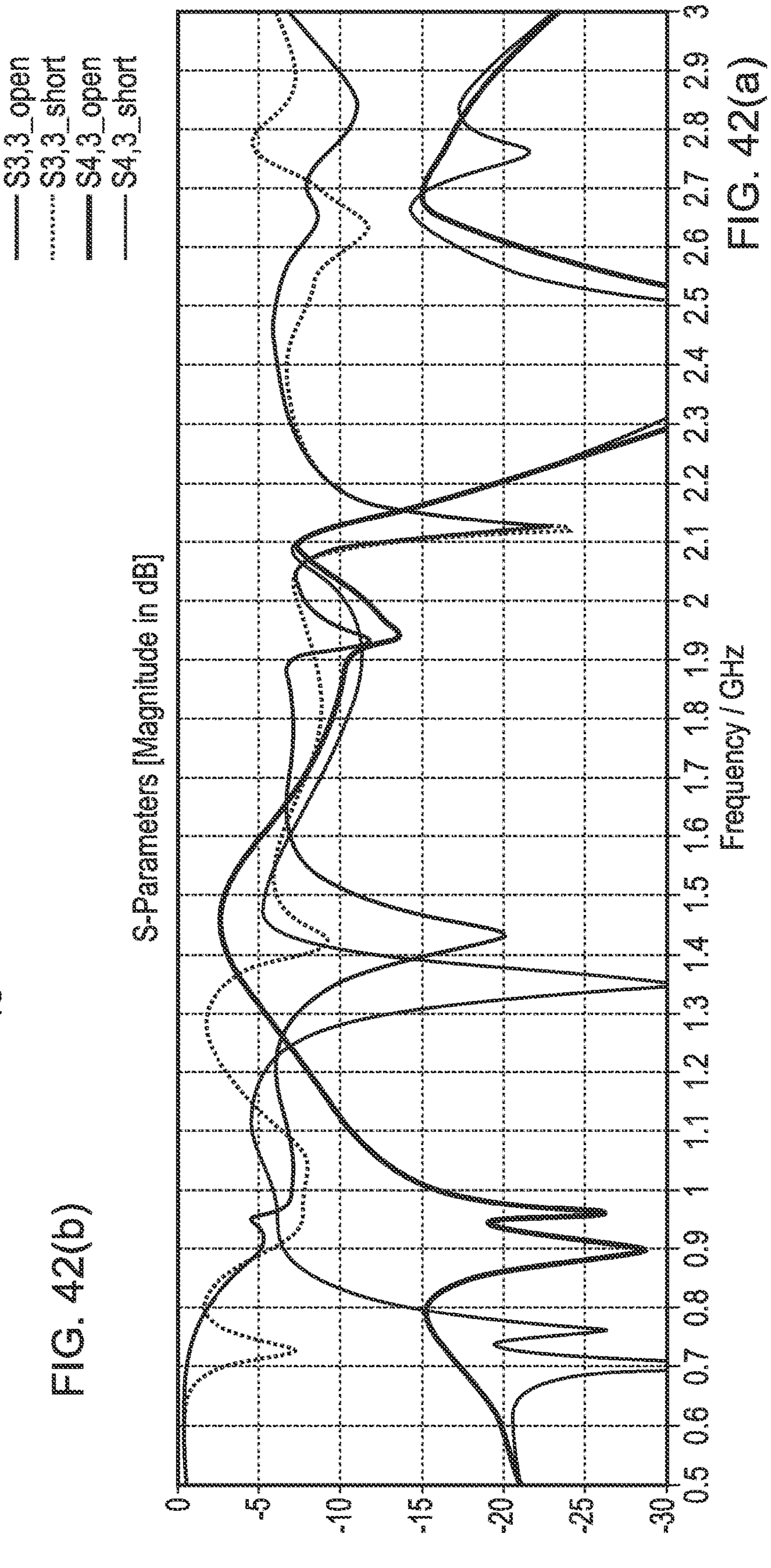

FIGS. 42(*a*) and 42(*b*) show a comparative example similar to that of FIG. 40(*b*), except with the second resonator element 40 configured so as to couple less strongly with the antenna 24. The S-parameter plot in FIG. 42(*a*) shows that the antenna system is still effective, and that the operational frequency band is shifted to higher frequencies.

Figure 43B:
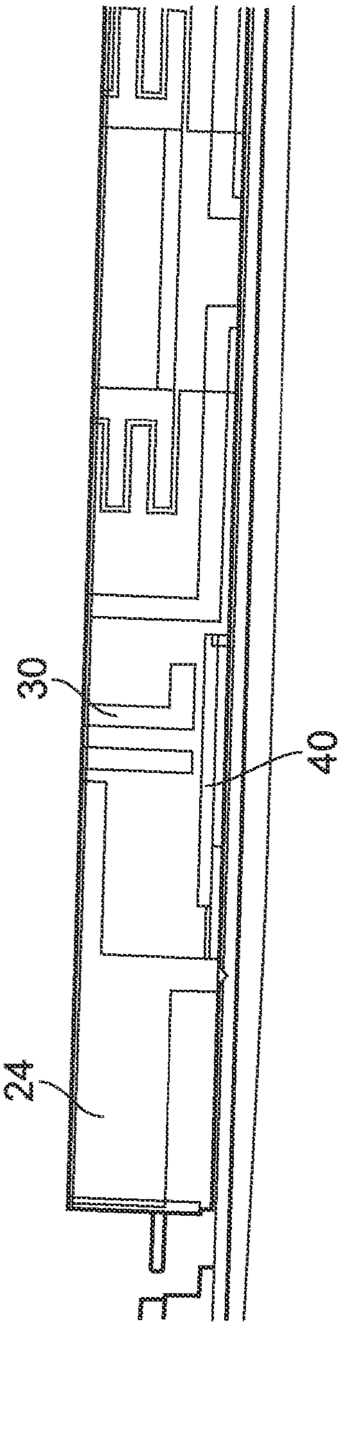
FIG. 43(*a*) is an S-parameter simulation plot for a configuration as shown in FIG. 43(*b*), which is similar to the configuration of FIG. 40(*b*) but with less coupling between the antenna and the first resonator element.
Figure 43A:
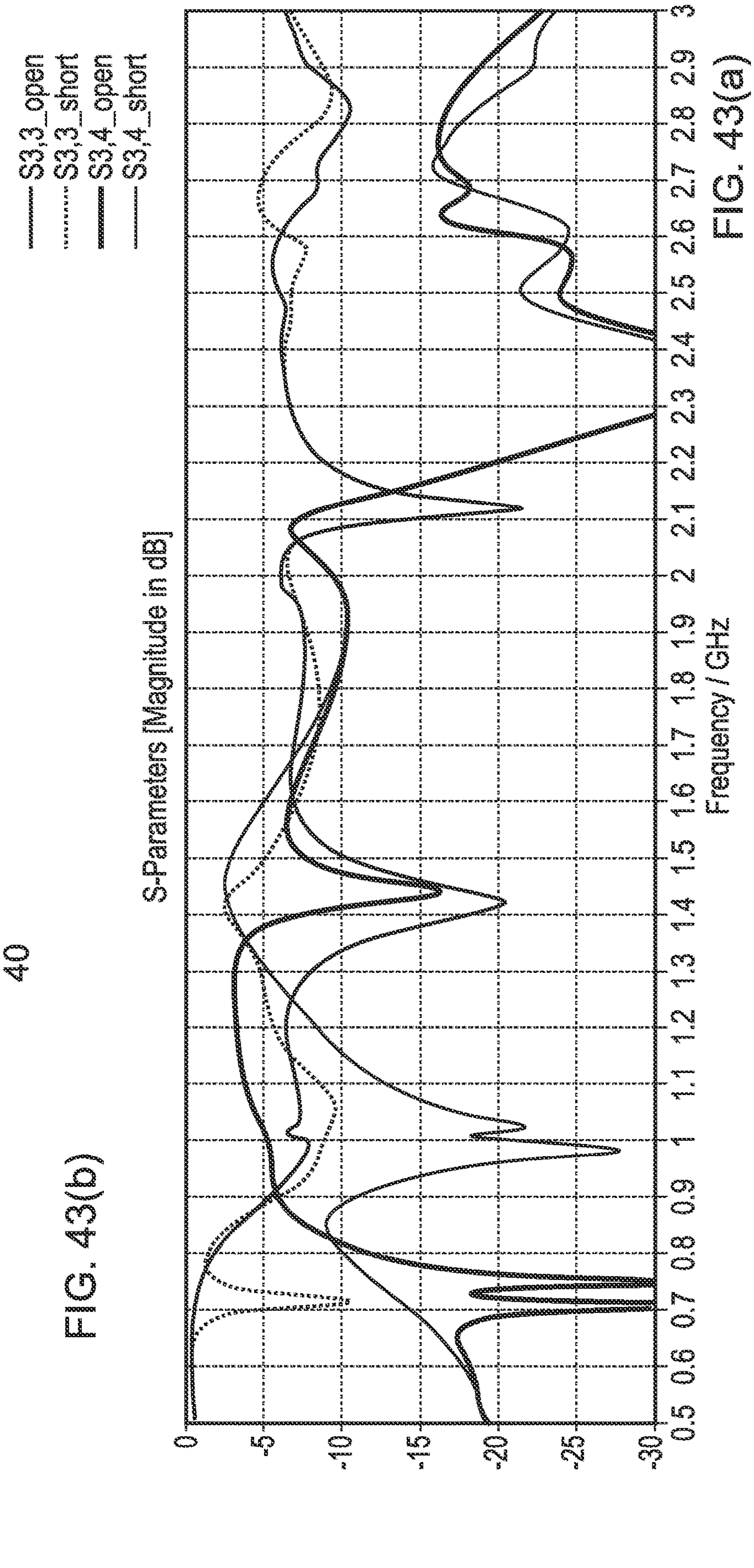

FIGS. 43(*a*) and 43(*b*) show a comparative example similar to that of FIG. 40(*b*), except with the first resonator element 30 configured so as to couple less strongly with the antenna 24. The S-parameter plot in FIG. 43(*a*) shows that the antenna system is still effective, and that the operational frequency band is shifted to higher frequencies.

Figure 44B:
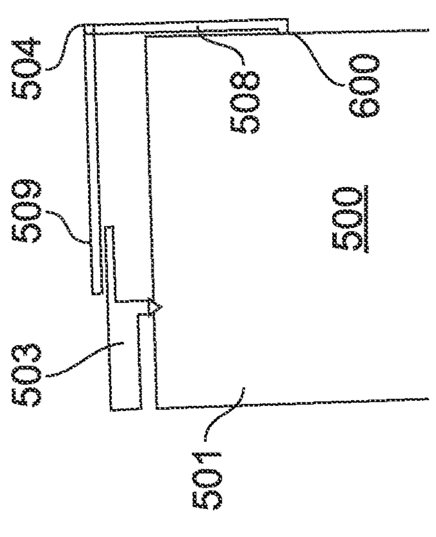
FIG. 44(*a*) is an S-parameter simulation plot for the configurations shown in FIGS. 44(*b*) and 44(*c*), which are similar to the configuration of FIGS. 30 and 31, but with the second resonator element removed.
Figure 44C:
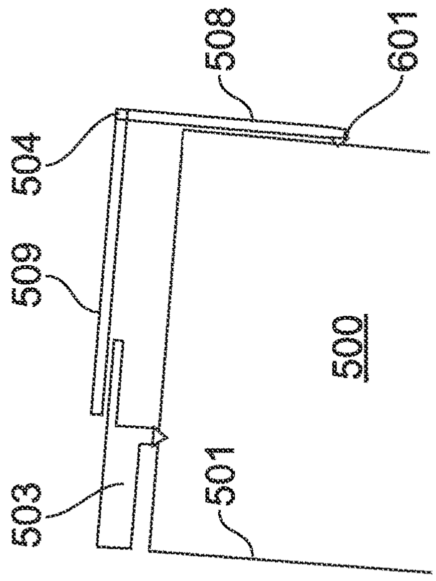
Figure 44A:
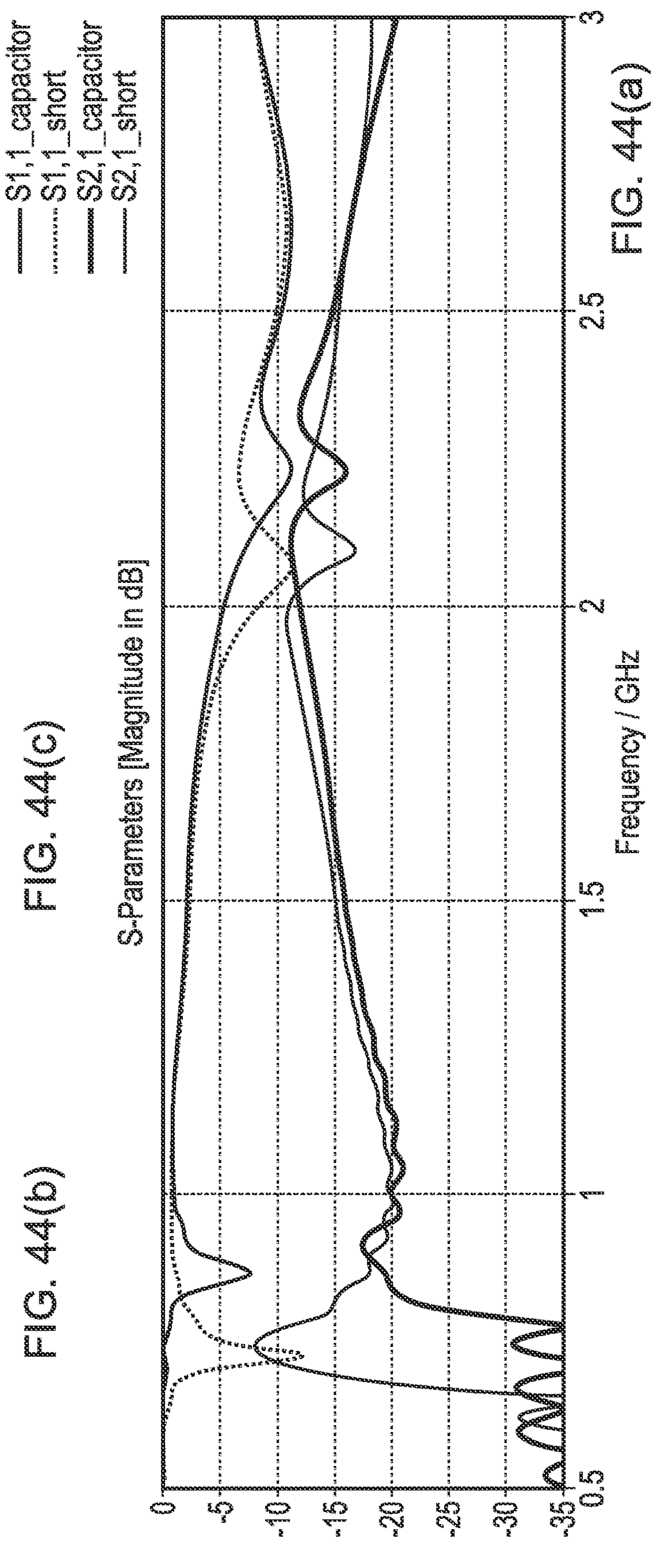

FIG. 44(*a*) shows an S-parameter plot for the variations shown in FIGS. 44(*b*) and 44(*c*). FIG. 44(*b*) is similar to the embodiment of FIGS. 30 and 31, except that the second resonator element 505 has been removed. The first arm 508 of the first resonator element 504 is connected to ground by a short circuit at 600. FIG. 44(*c*) shows the same general arrangement, except that the first arm 508 of the first resonator element 504 is connected to ground by a variable impedance at 601. An equivalent antenna system is provided at the bottom end 502 of the main PCB 500 as in FIG. 31. FIG. 44(*a*) shows the S11 return loss for the antenna 503 in both short circuit 600 and variable impedance 601 configurations, as well as the S21 isolation between the antennas 503 and 503'. Even without the second resonator element 505, the antenna system can be made to work, with tuning being possible by adjusting the variable impedance 601. It will be noted, however, that the isolation between antennas 503 and 503' is not as good as for the embodiment of FIGS. 30 and 31.

Throughout the description and claims of this specification, the words “comprise” and “contain” and variations of them mean “including but not limited to”, and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

The invention claimed is:

1. An antenna system comprising first and second antennas, the second antenna being disposed laterally from the first antenna along a longitudinal axis, and further comprising a first isolation structure disposed between the first and second antennas, the first isolation structure comprising a first resonator element having a first arm with first and second ends, the first arm connected to ground at its first end and extending across the longitudinal axis, and a lateral second arm connected to the second end of the first arm, wherein at least a portion of the first resonator element is disposed adjacent to a portion of the first antenna such that the first resonator element is strongly coupled to the first antenna, wherein the first isolation structure further comprises a second resonator element disposed relative to the first resonator element so as to couple strongly to the first resonator element, and wherein the first and second resonator elements are not directly electrically connected to each other, but are each separately connected to ground, and wherein the second resonator element comprises a lateral elongated element located between the first antenna and the first arm of the first resonator element.

2. The antenna system according to claim 1, wherein a portion of the second arm is located adjacent to and substantially parallel to a portion of the first antenna and spaced apart therefrom, such that the coupling is primarily between the portion of the second arm and the portion of the first antenna.

3. The antenna system according to claim 1, wherein the first resonator element comprises a third arm connected to the lateral second arm at an end of the lateral second arm distal from the first arm and oriented at an angle to the second arm, at least a portion of the third arm being aligned substantially parallel to a portion of the first antenna and spaced apart therefrom it, such that the coupling is primarily between the portion of the third arm and the portion of the first antenna.

4. The antenna system according to claim 1, wherein the portion of the first resonator element is located within a distance of 10 mm of the portion of the first antenna.

5. The antenna system according to claim 1, wherein the first resonator element is strongly coupled to the first antenna such that a resonant condition is created when the first antenna is excited in a first frequency band.

6. The antenna system according to claim 1, further comprising first and second spaced-apart ground planes, the first antenna and the first resonator element being located at least partly in a gap between adjacent edges of the ground planes.

7. The antenna system according to claim 1, wherein at least a portion of the second resonator element is located adjacent to a portion of the first resonator element and spaced apart therefrom, such that the strong coupling is primarily between the portion of the second resonator element and the portion of the first resonator element.

8. The antenna system according to claim 7, wherein the portion of the second resonator element is located within a distance of 10 mm of the portion of the first resonator element.

9. The antenna system according to claim 1, wherein the second resonator element is connected to ground via a short circuit or an impedance.

10. The antenna system according to claim 1, further comprising a first matching network connected to the second resonator element, the first matching network being configured to provide a selectable impedance between the second resonator element and ground.

11. The antenna system according to claim 10, wherein the selectable impedance is selectable from one or more of: an open circuit, a short circuit, a series capacitance, a series inductance, a series LC impedance and a parallel LC impedance.

12. The antenna system according to claim 1, wherein a portion of the second resonator element lies substantially parallel to and spaced apart from a portion of the first resonator element.

13. The antenna system according to claim 1, wherein the first resonator element comprises a third arm connected to the lateral second arm at an end of the lateral second arm distal from the first arm, and an end of the third arm is adjacent to a central portion of the second resonator element to achieve strong coupling between the third arm and the central portion of the second resonator element.

14. The antenna system according to claim 1, further comprising a second isolation structure located between the first isolation structure and the second antenna, the second isolation structure comprising a third resonator element having a first arm with first and second ends, the first arm connected to ground at its first end and extending across the longitudinal axis, and a lateral second arm connected to the second end of the first arm, wherein at least a portion of the third resonator element is disposed adjacent to a portion of the second antenna such that the third resonator element is strongly coupled to the second antenna.

15. The antenna system according to claim 14, wherein the second isolation structure further comprises a fourth resonator element disposed such that the fourth resonator element is strongly coupled to the third resonator element.

16. The antenna system according to claim 15, wherein the first, second, and at least one of the third and fourth resonator elements are configured to provide paths to ground for surface currents on the first, second, third and/or fourth antennas.

17. The antenna system according to claim 14, wherein the first and second isolation structures are substantially mirror images of each other.

18. The antenna system according to claim 14, further comprising a second matching network connected to the fourth resonator element, the second matching network being configured to provide a selectable impedance between the fourth resonator element and ground.

19. The antenna system according to claim 18, further comprising third and fourth antennas located between the first and second isolation structures, and a third isolation structure located between the third and fourth antennas, the third isolation structure comprising a ground plane, at least a portion of the ground plane being located between the third and fourth antennas.

20. The antenna system according to claim 19, wherein the portion of the ground plane comprising the third isolation structure takes the form of at least two ground plane extensions that project from an edge of the ground plane and extend between the third and fourth antennas.

21. The antenna system according to claim 19, wherein the ground plane comprises at least two separate ground plane elements.

22. The antenna system according to claim 21, wherein each separate ground plane element is provided with a ground plane extension that extends from an edge of its respective ground plane element, the ground plane extensions forming the third isolation structure.

23. The antenna system according to claim 19, further comprising a meander isolation structure located between the third antenna and the ground plane.

24. The antenna system according to claim 19 formed on a 3D substrate comprising a first upright face, a second upright face and an upper face joining the two upright faces, wherein the first and second antennas and the first isolation structure are provided on the first upright face and the third and fourth antennas and the third isolation structure are provided on the second upright face.

25. The antenna system according to any claim 19, wherein the third and/or fourth antennas are WLAN antennas.

26. The antenna system according to claim 14, further comprising a third antenna located between the first and second isolation structures.

27. The antenna system according to claim 1, wherein at least the first and second antennas are monopole antennas.

28. The antenna system according to claim 1, wherein the first and second antennas are LTE antennas.

29. The antenna system according to claim 1, wherein the first arm of the first resonator element is connected to ground via a selectable impedance.

* * * * *